US011071279B2

(12) United States Patent
Singh et al.

(10) Patent No.: US 11,071,279 B2
(45) Date of Patent: Jul. 27, 2021

(54) METHOD AND SYSTEM FOR TRACKING HEALTH IN ANIMAL POPULATIONS

(71) Applicant: Pixobot, Inc., Lincoln, NE (US)

(72) Inventors: Vishal Singh, Lincoln, NE (US); Brian Schupbach, Lincoln, NE (US); Andrew Uden, Lincoln, NE (US); Aaron Mathankeri, Lincoln, NE (US); Adam Sonty, Lincoln, NE (US); Alex Heine, Lincoln, NE (US); Colton Franco, Lincoln, NE (US); Paul Hoffmeyer, Walton, NE (US); Jacob Armstrong, Lincoln, NE (US); Matt Leacock, Lincoln, NE (US); Spencer Kelle, Lincoln, NE (US); Perry Howell, Lincoln, NE (US)

(73) Assignee: INTERVET INC., Madison, NJ (US)

( * ) Notice: Subject to any disclaimer, the term of this patent is extended or adjusted under 35 U.S.C. 154(b) by 280 days.

(21) Appl. No.: 15/366,920

(22) Filed: Dec. 1, 2016

(65) Prior Publication Data
US 2017/0156288 A1 Jun. 8, 2017

Related U.S. Application Data

(63) Continuation-in-part of application No. 15/212,091, filed on Jul. 15, 2016, now abandoned, which is a
(Continued)

(51) Int. Cl.
*A01K 11/00* (2006.01)
*A01K 29/00* (2006.01)

(52) U.S. Cl.
CPC .......... *A01K 11/004* (2013.01); *A01K 11/002* (2013.01); *A01K 11/008* (2013.01); *A01K 29/005* (2013.01)

(58) Field of Classification Search
CPC .. A01K 11/006; A01K 29/005; A01K 11/004; A01K 29/004; H04W 24/00;
(Continued)

(56) References Cited

U.S. PATENT DOCUMENTS

| 85,575 A | 1/1869 | Drake |
| 377,588 A | 2/1888 | Walsh, Jr. |

(Continued)

FOREIGN PATENT DOCUMENTS

| AU | 199534570 | 10/1994 |
| AU | 2003239832 | 5/2002 |

(Continued)

OTHER PUBLICATIONS

AU Office Action dated Sep. 19, 2017 for Australian Patent Application No. 2016266101.
(Continued)

*Primary Examiner* — Daniel L Cerioni
*Assistant Examiner* — Raymond P Dulman

(57) ABSTRACT

An animal health monitoring system includes a plurality of animal tag assemblies configured for being disposed on members of an animal population, each of the animal tag assemblies including one or more sensors configured to measure one or more animal characteristics of a member of the animal population. The system includes a concentrator communicatively coupled to the plurality of animal tag assemblies and configured to acquire one or more animal characteristics from the plurality of animal tag assemblies. The system includes a controller communicatively coupled to the concentrator and configured to receive the acquired one or more animal characteristics from the plurality of animal tag assemblies from the concentrator, determine a health state of one or more of the members of the animal population based on the received one or more animal
(Continued)

characteristics and report the determined health state to one or more user devices.

40 Claims, 47 Drawing Sheets

Related U.S. Application Data continuation-in-part of application No. 14/958,829, filed on Dec. 3, 2015, now abandoned, which is a continuation-in-part of application No. 14/847,930, filed on Sep. 8, 2015, now abandoned, application No. 15/366,920, which is a continuation-in-part of application No. PCT/US2015/049006, filed on Sep. 8, 2015.

(60) Provisional application No. 62/046,702, filed on Sep. 5, 2014, provisional application No. 62/110,230, filed on Jan. 30, 2015, provisional application No. 62/184,158, filed on Jun. 24, 2015, provisional application No. 62/214,568, filed on Sep. 4, 2015.

(58) Field of Classification Search
CPC ............. H04W 24/0005; H04W 24/10; H04W 24/0015; H04W 52/02
See application file for complete search history.

(56) References Cited

U.S. PATENT DOCUMENTS

| | | |
|---|---|---|
| 584,121 A | 6/1897 | Sanders |
| 818,783 A | 4/1906 | Philipi |
| 823,079 A | 6/1906 | Rais |
| 1,016,752 A | 2/1912 | Leith |
| 1,188,510 A | 6/1916 | Timson |
| 1,364,137 A | 1/1921 | Pannier |
| 1,759,400 A | 5/1930 | Hobbs |
| 1,843,314 A | 2/1932 | Berntson et al. |
| 1,863,037 A | 6/1932 | Archbold |
| 2,078,827 A | 4/1937 | Ketchum |
| 2,420,020 A | 5/1947 | Snell |
| 2,553,400 A | 5/1951 | Blair |
| 2,570,048 A | 10/1951 | Cooke et al. |
| 3,091,770 A | 6/1963 | McMurray et al. |
| 3,261,243 A | 7/1966 | Ellison |
| 3,596,541 A | 8/1971 | Bieganski |
| 3,812,859 A | 5/1974 | Murphy et al. |
| 3,884,100 A | 5/1975 | Fideldy |
| 3,981,209 A | 9/1976 | Caroff |
| 4,120,303 A | 10/1978 | Villa-Massone et al. |
| 4,121,591 A | 10/1978 | Hayes |
| 4,281,657 A | 8/1981 | Ritchey |
| 4,323,183 A | 4/1982 | Duchin |
| 4,497,321 A | 2/1985 | Fearing et al. |
| 4,516,577 A | 5/1985 | Scott et al. |
| 4,531,520 A | 7/1985 | Reggers et al. |
| 4,552,147 A | 11/1985 | Gardner |
| 4,612,877 A | 9/1986 | Hayes et al. |
| 4,666,436 A | 5/1987 | McDonald et al. |
| 4,672,966 A | 6/1987 | Haas, Jr. |
| 4,696,119 A | 9/1987 | Howe et al. |
| 4,716,899 A | 1/1988 | Huenefeld et al. |
| 4,819,639 A | 4/1989 | Gardner |
| 4,821,683 A | 4/1989 | Veldman |
| 4,878,302 A | 11/1989 | Jowsey |
| 4,943,294 A | 7/1990 | Knapp |
| 5,022,253 A | 6/1991 | Parlatore |
| 5,056,385 A | 10/1991 | Petersen |
| 5,141,514 A | 8/1992 | van Amelsfort |
| 5,154,721 A | 10/1992 | Perez |
| 5,267,464 A | 12/1993 | Cleland |
| 5,509,291 A | 4/1996 | Nilsson et al. |
| 5,651,791 A | 7/1997 | Zavlodaver et al. |
| 5,778,820 A | 7/1998 | van der Lely et al. |
| 6,007,548 A | 12/1999 | Ritchey |
| 6,016,769 A | 1/2000 | Forster |
| 6,043,748 A | 3/2000 | Touchton et al. |
| 6,053,926 A | 4/2000 | Luehrs |
| 6,095,915 A | 8/2000 | Battista et al. |
| 6,099,482 A | 8/2000 | Brune et al. |
| 6,100,804 A | 8/2000 | Brady et al. |
| 6,113,539 A | 9/2000 | Ridenour |
| 6,114,957 A | 9/2000 | Westrick et al. |
| 6,145,225 A | 11/2000 | Ritchey |
| 6,166,643 A | 12/2000 | Janning et al. |
| 6,172,640 B1 | 1/2001 | Durst et al. |
| 6,232,880 B1 | 5/2001 | Anderson et al. |
| 6,235,036 B1 | 5/2001 | Gardner et al. |
| 6,271,757 B1 | 8/2001 | Touchton et al. |
| 6,297,739 B1 | 10/2001 | Small |
| 6,310,553 B1 | 10/2001 | Dance |
| 6,402,692 B1 | 6/2002 | Morford |
| 6,497,197 B1 | 12/2002 | Huisma |
| 6,502,060 B1 | 12/2002 | Christian |
| 6,510,630 B1 | 1/2003 | Gardner |
| 6,535,131 B1 | 3/2003 | Bar-Shalom et al. |
| 6,569,092 B1 | 5/2003 | Booker |
| 6,659,039 B1 | 12/2003 | Larsen |
| 6,868,804 B1 | 3/2005 | Huisma et al. |
| 7,016,730 B2 | 3/2006 | Ternes |
| 7,046,152 B1 | 5/2006 | Peinetti et al. |
| 7,137,359 B1 | 11/2006 | Braden |
| 7,296,539 B2 | 11/2007 | Iljas |
| 7,380,518 B2 | 6/2008 | Kates |
| 7,690,141 B2 | 4/2010 | Steinfort et al. |
| 7,705,736 B1 | 4/2010 | Kedziora |
| 7,843,350 B2 | 11/2010 | Geissler et al. |
| 7,937,861 B1 | 5/2011 | Zacher |
| 8,005,624 B1 | 8/2011 | Starr |
| 8,266,990 B1 | 9/2012 | Janson |
| 8,305,220 B2 | 11/2012 | Gibson |
| 8,478,389 B1 | 7/2013 | Brockway et al. |
| 8,622,929 B2 | 1/2014 | Wilson et al. |
| 8,763,557 B2 | 7/2014 | Lipscomb et al. |
| 8,955,462 B1 | 2/2015 | Golden et al. |
| 9,215,862 B2 | 12/2015 | Bladen et al. |
| 9,370,170 B2 | 6/2016 | Downing et al. |
| 9,392,767 B2 | 7/2016 | Johnson, III et al. |
| 9,392,946 B1 | 7/2016 | Sarantos et al. |
| 9,449,487 B1 | 9/2016 | Spitalny |
| 9,648,849 B1 | 5/2017 | Vivathana |
| 9,654,925 B1 | 5/2017 | Solinsky et al. |
| 9,693,536 B1 | 7/2017 | Dana |
| 9,717,216 B1 | 8/2017 | Schlachta et al. |
| 9,743,643 B1 | 8/2017 | Kaplan et al. |
| 9,848,577 B1 | 12/2017 | Brandao et al. |
| 9,861,080 B1 | 1/2018 | Hathway et al. |
| 10,021,857 B2 | 7/2018 | Bailey et al. |
| 10,039,263 B2 | 8/2018 | Teychene et al. |
| 10,045,511 B1 | 8/2018 | Yarden et al. |
| 10,064,391 B1 | 9/2018 | Riley |
| 10,091,972 B1 | 10/2018 | Jensen et al. |
| 10,231,442 B1 | 3/2019 | Chang et al. |
| 10,242,547 B1 | 3/2019 | Struhsaker et al. |
| 10,264,762 B1 | 4/2019 | Lamb |
| 10,352,759 B1 | 7/2019 | Jensen |
| 10,446,006 B1 | 10/2019 | Johnson, Jr. et al. |
| 10,512,430 B1 | 12/2019 | Hladio |
| 10,588,295 B1 | 3/2020 | Riley |
| 10,628,756 B1 | 4/2020 | Kuper et al. |
| 10,638,726 B1 | 5/2020 | Makarychev et al. |
| 10,691,674 B2 | 6/2020 | Leong et al. |
| 2001/0027751 A1 | 10/2001 | van den Berg |
| 2002/0010390 A1 | 1/2002 | Guice et al. |
| 2002/0021219 A1 | 2/2002 | Edwards et al. |
| 2002/0091326 A1 | 7/2002 | Hashimoto et al. |
| 2002/0095828 A1 | 7/2002 | Koopman et al. |
| 2002/0154015 A1 | 10/2002 | Hixson |
| 2002/0158765 A1 | 10/2002 | Pape et al. |
| 2003/0004652 A1 | 1/2003 | Brunner et al. |
| 2003/0023517 A1 | 1/2003 | Marsh et al. |
| 2003/0028327 A1 | 2/2003 | Brunner et al. |

(56) References Cited

U.S. PATENT DOCUMENTS

| | | | |
|---|---|---|---|
| 2003/0034887 A1* | 2/2003 | Crabtree | G01S 3/54 340/539.1 |
| 2003/0062001 A1 | 4/2003 | Hakan | |
| 2003/0066491 A1 | 4/2003 | Stampe | |
| 2003/0144926 A1 | 7/2003 | Bodin et al. | |
| 2003/0146284 A1 | 8/2003 | Schmit et al. | |
| 2003/0149526 A1 | 8/2003 | Zhou et al. | |
| 2003/0177025 A1 | 9/2003 | Curkendall et al. | |
| 2003/0201931 A1 | 10/2003 | Durst et al. | |
| 2003/0208157 A1 | 11/2003 | Eidson et al. | |
| 2003/0221343 A1 | 12/2003 | Volk et al. | |
| 2003/0229452 A1 | 12/2003 | Lewis | |
| 2004/0066298 A1 | 4/2004 | Schmitt et al. | |
| 2004/0078390 A1 | 4/2004 | Saunders | |
| 2004/0118920 A1 | 6/2004 | He | |
| 2004/0123810 A1 | 7/2004 | Lorton et al. | |
| 2004/0155782 A1* | 8/2004 | Letkomiller | A01K 11/006 340/573.3 |
| 2004/0177011 A1 | 9/2004 | Ramsay et al. | |
| 2004/0201454 A1 | 10/2004 | Waterhouse et al. | |
| 2005/0010333 A1 | 1/2005 | Lorton et al. | |
| 2005/0026181 A1 | 2/2005 | Davis et al. | |
| 2005/0043630 A1* | 2/2005 | Buchert | A61B 5/14532 600/473 |
| 2005/0097997 A1 | 5/2005 | Hile | |
| 2005/0108912 A1 | 5/2005 | Bekker | |
| 2005/0115508 A1 | 6/2005 | Little | |
| 2005/0128086 A1 | 6/2005 | Brown et al. | |
| 2005/0139168 A1 | 6/2005 | Light et al. | |
| 2005/0145187 A1 | 7/2005 | Gray | |
| 2005/0273117 A1 | 12/2005 | Teychene | |
| 2005/0279287 A1 | 12/2005 | Kroeker | |
| 2005/0284381 A1 | 12/2005 | Bell et al. | |
| 2006/0011145 A1 | 1/2006 | Kates | |
| 2006/0052986 A1 | 3/2006 | Rogers et al. | |
| 2006/0064325 A1 | 3/2006 | Matsumoto et al. | |
| 2006/0087440 A1 | 4/2006 | Klein | |
| 2006/0106289 A1 | 5/2006 | Elser | |
| 2006/0117619 A1 | 6/2006 | Costantini | |
| 2006/0155172 A1 | 7/2006 | Rugg | |
| 2006/0170561 A1 | 8/2006 | Eyal | |
| 2006/0170565 A1* | 8/2006 | Husak | G06K 17/0029 340/8.1 |
| 2006/0171421 A1* | 8/2006 | Matsunaga | H04J 3/0676 370/503 |
| 2006/0173367 A1 | 8/2006 | Stuart et al. | |
| 2006/0185605 A1 | 8/2006 | Renz et al. | |
| 2006/0201436 A1 | 9/2006 | Kates | |
| 2006/0207515 A1 | 9/2006 | Palett | |
| 2006/0241521 A1 | 10/2006 | Cohen | |
| 2006/0282274 A1 | 12/2006 | Bennett | |
| 2006/0290514 A1 | 12/2006 | Sakama et al. | |
| 2007/0006494 A1 | 1/2007 | Hayes et al. | |
| 2007/0008150 A1 | 1/2007 | Hassell | |
| 2007/0008155 A1 | 1/2007 | Trost et al. | |
| 2007/0021660 A1 | 1/2007 | DeLonzor et al. | |
| 2007/0027375 A1 | 2/2007 | Melker et al. | |
| 2007/0027377 A1 | 2/2007 | DeLonzor et al. | |
| 2007/0027379 A1 | 2/2007 | Delonzor et al. | |
| 2007/0029381 A1 | 2/2007 | Braiman | |
| 2007/0044317 A1 | 3/2007 | Critelli | |
| 2007/0044732 A1 | 3/2007 | Araki et al. | |
| 2007/0062457 A1 | 3/2007 | Bates et al. | |
| 2007/0069899 A1 | 3/2007 | Shih et al. | |
| 2007/0103296 A1 | 5/2007 | Paessel et al. | |
| 2007/0149871 A1 | 6/2007 | Sarussi et al. | |
| 2007/0152825 A1 | 7/2007 | August et al. | |
| 2007/0222624 A1 | 9/2007 | Eicken et al. | |
| 2007/0255124 A1 | 11/2007 | Pologe et al. | |
| 2007/0258625 A1 | 11/2007 | Mirtsching | |
| 2007/0283791 A1 | 12/2007 | Engvall et al. | |
| 2007/0298421 A1 | 12/2007 | Jiang et al. | |
| 2008/0001815 A1 | 1/2008 | Wang et al. | |
| 2008/0004798 A1 | 1/2008 | Troxler et al. | |
| 2008/0017126 A1 | 1/2008 | Adams et al. | |
| 2008/0018481 A1 | 1/2008 | Zehavi | |
| 2008/0021352 A1 | 1/2008 | Keegan et al. | |
| 2008/0036610 A1 | 2/2008 | Hokuf et al. | |
| 2008/0047177 A1 | 2/2008 | Hilpert | |
| 2008/0055155 A1 | 3/2008 | Hensley et al. | |
| 2008/0059263 A1 | 3/2008 | Stroman et al. | |
| 2008/0061990 A1 | 3/2008 | Milnes et al. | |
| 2008/0076988 A1 | 3/2008 | Sarussi et al. | |
| 2008/0076992 A1 | 3/2008 | Hete et al. | |
| 2008/0085522 A1 | 4/2008 | Meghen et al. | |
| 2008/0097726 A1 | 4/2008 | Lorton et al. | |
| 2008/0110406 A1 | 5/2008 | Anderson et al. | |
| 2008/0146890 A1 | 6/2008 | Leboeuf et al. | |
| 2008/0173255 A1 | 7/2008 | Mainini et al. | |
| 2008/0190202 A1 | 8/2008 | Kulach et al. | |
| 2008/0190379 A1 | 8/2008 | Mainini et al. | |
| 2008/0215484 A1 | 9/2008 | Oldham | |
| 2008/0227662 A1 | 9/2008 | Stromberg et al. | |
| 2008/0228105 A1 | 9/2008 | Howell et al. | |
| 2008/0262326 A1 | 10/2008 | Hete et al. | |
| 2008/0272908 A1 | 11/2008 | Boyd | |
| 2008/0312511 A1 | 12/2008 | Osler et al. | |
| 2009/0009388 A1 | 1/2009 | Wangrud | |
| 2009/0020613 A1 | 1/2009 | Chang et al. | |
| 2009/0025651 A1 | 1/2009 | Lalor | |
| 2009/0058730 A1 | 3/2009 | Geissler et al. | |
| 2009/0094869 A1 | 4/2009 | Geissler et al. | |
| 2009/0102668 A1 | 4/2009 | Thompson et al. | |
| 2009/0115580 A1* | 5/2009 | Koerner | G01S 1/70 340/10.1 |
| 2009/0139462 A1 | 6/2009 | So | |
| 2009/0149727 A1 | 6/2009 | Truitt et al. | |
| 2009/0187392 A1 | 7/2009 | Riskey et al. | |
| 2009/0255484 A1 | 10/2009 | Muelken | |
| 2009/0312667 A1 | 12/2009 | Utsunomiya et al. | |
| 2010/0018363 A1 | 1/2010 | Chervenak et al. | |
| 2010/0030036 A1 | 2/2010 | Mottram et al. | |
| 2010/0045468 A1 | 2/2010 | Geissler | |
| 2010/0113902 A1 | 5/2010 | Hete et al. | |
| 2010/0139575 A1 | 6/2010 | Duncan et al. | |
| 2010/0160809 A1 | 6/2010 | Laurence et al. | |
| 2010/0175625 A1 | 7/2010 | Klenotiz | |
| 2010/0217102 A1 | 8/2010 | LeBoeuf et al. | |
| 2010/0250198 A1 | 9/2010 | Lorton et al. | |
| 2010/0289639 A1 | 11/2010 | Gibson et al. | |
| 2010/0302004 A1 | 12/2010 | Winstead et al. | |
| 2010/0315241 A1 | 12/2010 | Jow | |
| 2010/0321182 A1 | 12/2010 | Wangrud | |
| 2010/0321189 A1 | 12/2010 | Gibson et al. | |
| 2010/0331739 A1 | 12/2010 | Maltz et al. | |
| 2011/0018717 A1 | 1/2011 | Takahashi et al. | |
| 2011/0061605 A1 | 3/2011 | Hardi et al. | |
| 2011/0095089 A1 | 4/2011 | Kolton et al. | |
| 2011/0121356 A1 | 5/2011 | Krawinkel et al. | |
| 2011/0137185 A1 | 6/2011 | Hete et al. | |
| 2011/0152876 A1 | 6/2011 | Vandeputte | |
| 2011/0178423 A1 | 7/2011 | Hatch | |
| 2011/0203144 A1 | 8/2011 | Junek et al. | |
| 2011/0258130 A1 | 10/2011 | Grabiner et al. | |
| 2011/0272470 A1 | 11/2011 | Baba et al. | |
| 2011/0313264 A1 | 12/2011 | Hete | |
| 2012/0009943 A1 | 1/2012 | Greenberg et al. | |
| 2012/0068848 A1 | 3/2012 | Campbell et al. | |
| 2012/0089152 A1 | 4/2012 | Lynd et al. | |
| 2012/0092132 A1 | 4/2012 | Holme et al. | |
| 2012/0111286 A1 | 5/2012 | Lee et al. | |
| 2012/0112917 A1 | 5/2012 | Menachem et al. | |
| 2012/0160181 A1 | 6/2012 | So et al. | |
| 2012/0175412 A1 | 7/2012 | Grabiner et al. | |
| 2012/0204811 A1 | 8/2012 | Ryan | |
| 2012/0236690 A1 | 9/2012 | Rader et al. | |
| 2012/0291715 A1 | 11/2012 | Jiang et al. | |
| 2012/0299731 A1 | 11/2012 | Triener | |
| 2012/0326862 A1 | 12/2012 | Kwak et al. | |
| 2012/0326874 A1 | 12/2012 | Kwak et al. | |
| 2013/0006065 A1 | 1/2013 | Yanai et al. | |
| 2013/0014706 A1 | 1/2013 | Menkes | |
| 2013/0046170 A1 | 2/2013 | Haynes | |

(56) References Cited

U.S. PATENT DOCUMENTS

| | | |
|---|---|---|
| 2013/0113622 A1 | 5/2013 | Pratt et al. |
| 2013/0119142 A1 | 5/2013 | McCoy et al. |
| 2013/0175347 A1 | 7/2013 | Decaluwe et al. |
| 2013/0192526 A1 | 8/2013 | Mainini |
| 2013/0211773 A1 | 8/2013 | Loeschinger et al. |
| 2013/0222141 A1 | 8/2013 | Rhee et al. |
| 2013/0237778 A1 | 9/2013 | Rouquette et al. |
| 2013/0239904 A1 | 9/2013 | Kim et al. |
| 2013/0239907 A1 | 9/2013 | Laurence et al. |
| 2013/0265165 A1 | 10/2013 | So et al. |
| 2013/0285815 A1 | 10/2013 | Jones, II |
| 2014/0073486 A1 | 3/2014 | Ahmed et al. |
| 2014/0107434 A1 | 4/2014 | Mottram et al. |
| 2014/0122488 A1 | 5/2014 | Jung et al. |
| 2014/0123912 A1 | 5/2014 | Menkes et al. |
| 2014/0135596 A1 | 5/2014 | LeBoeuf et al. |
| 2014/0135631 A1 | 5/2014 | Brumback et al. |
| 2014/0171762 A1 | 6/2014 | LeBoeuf et al. |
| 2014/0174376 A1 | 6/2014 | Touchton et al. |
| 2014/0196673 A1 | 7/2014 | Menkes et al. |
| 2014/0230755 A1 | 8/2014 | Trenkle et al. |
| 2014/0232541 A1 | 8/2014 | Trenkle et al. |
| 2014/0253709 A1 | 9/2014 | Bresch et al. |
| 2014/0261235 A1 | 9/2014 | Rich et al. |
| 2014/0267299 A1 | 9/2014 | Couse |
| 2014/0275824 A1 | 9/2014 | Couse |
| 2014/0276089 A1 | 9/2014 | Kirenko et al. |
| 2014/0290013 A1 | 10/2014 | Eidelman et al. |
| 2014/0302783 A1 | 10/2014 | Aiuto et al. |
| 2014/0331942 A1 | 11/2014 | Sarazyn |
| 2014/0333439 A1 | 11/2014 | Downing et al. |
| 2014/0338447 A1 | 11/2014 | Sharpe et al. |
| 2014/0347184 A1 | 11/2014 | Triener |
| 2014/0352632 A1 | 12/2014 | McLaughlin |
| 2014/0368338 A1 | 12/2014 | Rettedal et al. |
| 2015/0025394 A1 | 1/2015 | Hong et al. |
| 2015/0039239 A1 | 2/2015 | Shuler et al. |
| 2015/0043402 A1* | 2/2015 | Park ............ H04W 52/0216 370/311 |
| 2015/0057963 A1 | 2/2015 | Zakharov et al. |
| 2015/0097668 A1 | 4/2015 | Toth |
| 2015/0099472 A1 | 4/2015 | Ickovic |
| 2015/0100245 A1 | 4/2015 | Huang et al. |
| 2015/0107519 A1 | 4/2015 | Rajkondawar et al. |
| 2015/0107522 A1 | 4/2015 | Lamb |
| 2015/0122893 A1 | 5/2015 | Warther |
| 2015/0128873 A1 | 5/2015 | Prescott et al. |
| 2015/0130617 A1 | 5/2015 | Triener |
| 2015/0148811 A1 | 5/2015 | Swope et al. |
| 2015/0157435 A1 | 6/2015 | Chasins et al. |
| 2015/0182322 A1 | 7/2015 | Couse et al. |
| 2015/0245592 A1 | 9/2015 | Sibbald et al. |
| 2015/0282457 A1 | 10/2015 | Yarden |
| 2015/0334994 A1 | 11/2015 | Prasad |
| 2015/0342143 A1 | 12/2015 | Stewart |
| 2015/0351885 A1 | 12/2015 | Kool et al. |
| 2015/0366166 A1 | 12/2015 | Mueller |
| 2016/0000045 A1 | 1/2016 | Funaya et al. |
| 2016/0021506 A1 | 1/2016 | Bonge, Jr. |
| 2016/0021612 A1* | 1/2016 | Matsunaga ....... H04W 74/0816 370/311 |
| 2016/0058379 A1 | 3/2016 | Menkes et al. |
| 2016/0066546 A1 | 3/2016 | Borchersen et al. |
| 2016/0100802 A1 | 4/2016 | Newman |
| 2016/0106064 A1 | 4/2016 | Bladen et al. |
| 2016/0113524 A1 | 4/2016 | Gross et al. |
| 2016/0120154 A1 | 5/2016 | Hill et al. |
| 2016/0128637 A1 | 5/2016 | LeBoeuf et al. |
| 2016/0135431 A1 | 5/2016 | Siegel |
| 2016/0148086 A1 | 5/2016 | Clarke et al. |
| 2016/0150362 A1 | 5/2016 | Shaprio et al. |
| 2016/0151013 A1 | 6/2016 | Atallah et al. |
| 2016/0165851 A1 | 6/2016 | Harty et al. |
| 2016/0165852 A1 | 6/2016 | Goldfain |
| 2016/0166761 A1 | 6/2016 | Piehl et al. |
| 2016/0198957 A1 | 7/2016 | Arditi et al. |
| 2016/0210841 A1 | 7/2016 | Huang et al. |
| 2016/0212704 A1* | 7/2016 | Matsunaga ....... H04W 52/0216 |
| 2016/0213317 A1 | 7/2016 | Richardson et al. |
| 2016/0278712 A1 | 9/2016 | Sagara et al. |
| 2016/0286757 A1 | 10/2016 | Armstrong |
| 2016/0287108 A1 | 10/2016 | Wei et al. |
| 2016/0317049 A1 | 11/2016 | LeBoeuf et al. |
| 2016/0345881 A1 | 12/2016 | Sarantos et al. |
| 2016/0360733 A1 | 12/2016 | Triener |
| 2016/0367495 A1 | 12/2016 | Miller et al. |
| 2017/0000090 A1 | 1/2017 | Hall |
| 2017/0006836 A1 | 1/2017 | Torres |
| 2017/0042119 A1 | 2/2017 | Garrity |
| 2017/0067770 A1 | 3/2017 | Sun |
| 2017/0079247 A1 | 3/2017 | Womble et al. |
| 2017/0095206 A1 | 4/2017 | Leib et al. |
| 2017/0156288 A1 | 6/2017 | Singh |
| 2017/0164905 A1 | 6/2017 | Gumiero |
| 2017/0193208 A1 | 7/2017 | Ashley et al. |
| 2017/0196203 A1 | 7/2017 | Huisma et al. |
| 2017/0202185 A1 | 7/2017 | Trumbull et al. |
| 2017/0245797 A1 | 8/2017 | Quinn |
| 2017/0258039 A1 | 9/2017 | Lauterbach |
| 2017/0272842 A1 | 9/2017 | Touma |
| 2017/0280675 A1 | 10/2017 | MacNeil et al. |
| 2017/0280688 A1 | 10/2017 | Deliou et al. |
| 2017/0310358 A1* | 10/2017 | Vijayasankar ........ H04W 4/80 |
| 2017/0318781 A1 | 11/2017 | Rollins et al. |
| 2017/0360004 A1 | 12/2017 | Carver |
| 2017/0372583 A1 | 12/2017 | Lamkin et al. |
| 2018/0000045 A1 | 1/2018 | Bianchi et al. |
| 2018/0007863 A1 | 1/2018 | Bailey et al. |
| 2018/0014512 A1 | 1/2018 | Arabani et al. |
| 2018/0055016 A1 | 3/2018 | Hsieh et al. |
| 2018/0064068 A1 | 3/2018 | McKee et al. |
| 2018/0070559 A1 | 3/2018 | So |
| 2018/0098522 A1 | 4/2018 | Steinfort |
| 2018/0110205 A1 | 4/2018 | Czarnecky et al. |
| 2018/0131074 A1 | 5/2018 | Wilkinson et al. |
| 2018/0132455 A1 | 5/2018 | Pradeep et al. |
| 2018/0206455 A1 | 7/2018 | Thiex et al. |
| 2018/0242860 A1 | 8/2018 | LeBoeuf et al. |
| 2018/0249683 A1 | 9/2018 | Borchersen et al. |
| 2018/0260976 A1 | 9/2018 | Watanabe et al. |
| 2018/0271058 A1 | 9/2018 | Valdez |
| 2018/0279582 A1 | 10/2018 | Yajima et al. |
| 2018/0288968 A1 | 10/2018 | Cisco |
| 2018/0295809 A1 | 10/2018 | Yajima et al. |
| 2018/0303425 A1 | 10/2018 | Wordham et al. |
| 2018/0310526 A1 | 11/2018 | Birch et al. |
| 2018/0325382 A1 | 11/2018 | Brandao et al. |
| 2018/0332989 A1 | 11/2018 | Chiu et al. |
| 2018/0333244 A1 | 11/2018 | Hanks et al. |
| 2019/0008118 A1 | 1/2019 | Keegan |
| 2019/0008124 A1 | 1/2019 | Komatsu et al. |
| 2019/0029226 A1 | 1/2019 | Triener |
| 2019/0053469 A1 | 2/2019 | Mardirossian |
| 2019/0053470 A1 | 2/2019 | Singh et al. |
| 2019/0059335 A1 | 2/2019 | Crider, Jr. et al. |
| 2019/0059337 A1 | 2/2019 | Robbins |
| 2019/0059741 A1 | 2/2019 | Crider, Jr. et al. |
| 2019/0069512 A1 | 3/2019 | Eriksson et al. |
| 2019/0075945 A1 | 3/2019 | Strassburger et al. |
| 2019/0082654 A1 | 3/2019 | Robbins |
| 2019/0090754 A1 | 3/2019 | Brandao et al. |
| 2019/0110433 A1 | 4/2019 | Myers |
| 2019/0110436 A1 | 4/2019 | Gardner et al. |
| 2019/0125509 A1 | 5/2019 | Hotchkin |
| 2019/0130728 A1 | 5/2019 | Struhsaker et al. |
| 2019/0133086 A1 | 5/2019 | Katz et al. |
| 2019/0159428 A1 | 5/2019 | Bolen |
| 2019/0166802 A1 | 6/2019 | Seltzer et al. |
| 2019/0183091 A1 | 6/2019 | Betts-LaCroix et al. |
| 2019/0183092 A1 | 6/2019 | Couse et al. |
| 2019/0208358 A1 | 7/2019 | de Barros Chapiewski et al. |
| 2019/0213860 A1 | 7/2019 | Shaprio et al. |
| 2019/0254599 A1 | 8/2019 | Young et al. |
| 2019/0287429 A1 | 9/2019 | Dawson et al. |

(56) References Cited

U.S. PATENT DOCUMENTS

| | | | |
|---|---|---|---|
| 2019/0290133 | A1 | 9/2019 | Crider et al. |
| 2019/0290847 | A1 | 9/2019 | Veyrent et al. |
| 2019/0298226 | A1 | 10/2019 | Filipowicz |
| 2019/0298924 | A1 | 10/2019 | Gibson et al. |
| 2019/0327939 | A1 | 10/2019 | Sharpe et al. |
| 2019/0335715 | A1 | 11/2019 | Hicks et al. |
| 2019/0350168 | A1 | 11/2019 | Shi |
| 2019/0365324 | A1 | 12/2019 | Chang |
| 2019/0373857 | A1 | 12/2019 | Leigh-Lancaster et al. |
| 2019/0380311 | A1 | 12/2019 | Crouthamel et al. |
| 2019/0385037 | A1 | 12/2019 | Robadey et al. |
| 2019/0385332 | A1 | 12/2019 | Yajima et al. |
| 2020/0015740 | A1 | 1/2020 | Alnofeli et al. |
| 2020/0037886 | A1 | 2/2020 | Greer et al. |
| 2020/0068853 | A1 | 3/2020 | Radovcic |
| 2020/0085019 | A1 | 3/2020 | Gilbert et al. |
| 2020/0100463 | A1 | 4/2020 | Rooda et al. |
| 2020/0107522 | A1 | 4/2020 | Kersey et al. |
| 2020/0110946 | A1 | 4/2020 | Kline et al. |
| 2020/0113728 | A1 | 4/2020 | Spector et al. |
| 2020/0170222 | A1 | 6/2020 | Gotts |
| 2020/0178505 | A1 | 6/2020 | Womble et al. |
| 2020/0178800 | A1 | 6/2020 | Geissler et al. |
| 2020/0205381 | A1 | 7/2020 | Wernimont et al. |
| 2020/0229391 | A1 | 7/2020 | De Groot |
| 2020/0229707 | A1 | 7/2020 | Donnelly |
| 2020/0242551 | A1 | 7/2020 | Lau et al. |
| 2020/0302004 | A1 | 9/2020 | Spencer et al. |

FOREIGN PATENT DOCUMENTS

| | | |
|---|---|---|
| AU | 2003238759 | 1/2004 |
| AU | 2004263067 | 2/2005 |
| AU | 2004305403 | 7/2005 |
| AU | 2011210083 | 8/2011 |
| AU | 2016266101 | 12/2016 |
| AU | 2017100469 | 5/2017 |
| AU | 2018220079 | 9/2018 |
| BR | 8701673 | 3/2009 |
| BR | 112012018909 | 1/2011 |
| CA | 2267812 | 10/2000 |
| CA | 2493331 | 1/2005 |
| CA | 2788153 | 8/2011 |
| CA | 2880138 | 2/2013 |
| CA | 2858905 | 10/2013 |
| CA | 2875637 | 1/2014 |
| CA | 2875578 | 12/2014 |
| CA | 2915843 | 12/2014 |
| CA | 2990620 | 12/2016 |
| CA | 2916286 | 6/2017 |
| CA | 3007296 | 6/2017 |
| CN | 1989895 | 7/2007 |
| CN | 201171316 | 12/2008 |
| CN | 101578516 | 11/2009 |
| CN | 101816290 | 9/2010 |
| CN | 101875975 | 11/2010 |
| CN | 101875976 | 11/2010 |
| CN | 102781225 | 1/2011 |
| CN | 102142116 | 8/2011 |
| CN | 102485892 | 6/2012 |
| CN | 102682322 | 9/2012 |
| CN | 203313865 | 12/2013 |
| CN | 203689049 | 2/2014 |
| CN | 203523519 | 4/2014 |
| CN | 204047531 | 8/2014 |
| CN | 204305813 | 5/2015 |
| CN | 204331349 | 5/2015 |
| CN | 105191817 | 12/2015 |
| CN | 106125648 | 11/2016 |
| CN | 106172068 | 12/2016 |
| CN | 106197675 | 12/2016 |
| CN | 106719037 | 2/2017 |
| CN | 205919898 | 2/2017 |
| CN | 106472347 | 3/2017 |
| CN | 106845598 | 6/2017 |
| CN | 206431665 | 8/2017 |
| CN | 107201409 | 9/2017 |
| CN | 207201674 | 9/2017 |
| CN | 107251851 | 10/2017 |
| CN | 107667898 | 2/2018 |
| CN | 108353810 | 2/2018 |
| CN | 207100094 | 3/2018 |
| CN | 207249710 | 4/2018 |
| CN | 108651301 | 5/2018 |
| CN | 108656996 | 5/2018 |
| CN | 108684549 | 5/2018 |
| CN | 108118096 | 6/2018 |
| CN | 108308055 | 7/2018 |
| CN | 109006541 | 8/2018 |
| CN | 109008529 | 8/2018 |
| CN | 108617533 | 10/2018 |
| CN | 108717668 | 10/2018 |
| CN | 108766586 | 11/2018 |
| CN | 109006550 | 12/2018 |
| CN | 208273869 | 12/2018 |
| CN | 109355402 | 2/2019 |
| CN | 109937904 | 3/2019 |
| CN | 109937905 | 3/2019 |
| CN | 109823691 | 5/2019 |
| CN | 110073995 | 5/2019 |
| CN | 110059781 | 7/2019 |
| CN | 110106261 | 8/2019 |
| CN | 110106262 | 8/2019 |
| CN | 110506656 | 11/2019 |
| CN | 210076292 | 2/2020 |
| DE | 633742 | 8/1936 |
| DE | 2850438 | 5/1980 |
| DE | 19629166 | 2/1997 |
| DE | 19826348 | 6/1998 |
| DE | 29906146 | 6/1999 |
| DE | 19911766 | 9/2000 |
| DE | 20018364 | 1/2001 |
| DE | 10001176 | 5/2001 |
| DE | 102004027978 | 12/2005 |
| DE | 202010008325 | 2/2012 |
| DE | 202013011075 | 1/2014 |
| DE | 202016101289 | 4/2016 |
| DK | 140001 | 11/1979 |
| EP | 55127 | 6/1982 |
| EP | 125915 | 11/1984 |
| EP | 0499428 | 8/1992 |
| EP | 513525 | 11/1992 |
| EP | 743043 | 11/1996 |
| EP | 938841 | 2/1998 |
| EP | 898449 | 3/1999 |
| EP | 1076485 | 2/2001 |
| EP | 1445723 | 8/2004 |
| EP | 1479338 | 11/2004 |
| EP | 1521208 | 4/2005 |
| EP | 1907816 | 4/2008 |
| EP | 1961294 | 8/2008 |
| EP | 2028931 | 3/2009 |
| EP | 2172878 | 4/2010 |
| EP | 2528431 | 1/2011 |
| EP | 2453733 | 5/2012 |
| EP | 2465344 | 6/2012 |
| EP | 2488237 | 8/2012 |
| EP | 2528431 | 12/2012 |
| EP | 2534945 | 12/2012 |
| EP | 2657889 | 10/2013 |
| EP | 2664234 | 11/2013 |
| EP | 2728995 | 5/2014 |
| EP | 2879615 | 6/2015 |
| EP | 2955998 | 12/2015 |
| EP | 3153098 | 4/2017 |
| EP | 3164855 | 5/2017 |
| EP | 3210531 | 8/2017 |
| EP | 3217566 | 9/2017 |
| EP | 3218865 | 9/2017 |
| EP | 3225106 | 10/2017 |
| EP | 3316680 | 5/2018 |
| EP | 3346422 | 7/2018 |
| EP | 3385886 | 10/2018 |
| EP | 3593634 | 1/2020 |

(56) References Cited

FOREIGN PATENT DOCUMENTS

| | | |
|---|---|---|
| EP | 3627856 | 3/2020 |
| EP | 3660855 | 6/2020 |
| ES | 2046912 | 2/1994 |
| ES | 2206009 | 5/2004 |
| ES | 2215152 | 10/2004 |
| ES | 1072416 | 7/2010 |
| ES | 2391341 | 11/2012 |
| ES | 1194609 | 10/2017 |
| FI | 20165318 | 6/2017 |
| FR | 2106705 | 5/1972 |
| FR | 2297565 | 8/1976 |
| FR | 2342024 | 1/1983 |
| FR | 2601848 | 1/1988 |
| FR | 2779153 | 12/1999 |
| FR | 2834521 | 7/2003 |
| FR | 2964777 | 3/2012 |
| FR | 3046332 | 1/2016 |
| FR | 3024653 | 2/2016 |
| FR | 3085249 | 9/2018 |
| GB | 588870 | 6/1947 |
| GB | 641394 | 8/1950 |
| GB | 865164 | 4/1961 |
| GB | 1072971 | 6/1967 |
| GB | 1267830 | 3/1972 |
| GB | 1415650 | 11/1975 |
| GB | 2067121 | 7/1981 |
| GB | 2055670 | 7/1983 |
| GB | 2114045 | 8/1983 |
| GB | 2125343 | 3/1984 |
| GB | 2142812 | 1/1985 |
| GB | 2392138 | 2/2004 |
| GB | 2469326 | 10/2010 |
| GB | 2554636 | 9/2016 |
| GB | 2554636 | 4/2018 |
| GB | 2570340 | 7/2019 |
| GB | 2571404 | 8/2019 |
| IN | 201103443 | 12/2011 |
| IN | 200802272 | 6/2016 |
| JP | 57173562 | 11/1982 |
| JP | 7177832 | 7/1995 |
| JP | 2001178692 | 7/2001 |
| JP | 2004292151 | 10/2004 |
| JP | 2005102959 | 4/2005 |
| JP | 5659243 | 1/2011 |
| JP | 2011067178 | 4/2011 |
| JP | 2011087657 | 5/2011 |
| JP | 2013247941 | 6/2012 |
| JP | 2017112857 | 6/2017 |
| JP | 2017002170 | 4/2018 |
| KR | 2003061157 | 7/2003 |
| KR | 2005046330 | 5/2005 |
| KR | 780449 | 11/2007 |
| KR | 20130019970 | 2/2013 |
| KR | 20130057683 | 6/2013 |
| KR | 2013138899 | 12/2013 |
| KR | 2019061805 | 11/2017 |
| KR | 101827311 | 2/2018 |
| KR | 20180035537 | 4/2018 |
| KR | 2018109451 | 10/2018 |
| KR | 20190081598 | 7/2019 |
| KR | 2019091708 | 8/2019 |
| MX | 9600754 | 2/1997 |
| MX | 356331 | 1/2011 |
| NL | 2017104 | 1/2018 |
| NL | 2019186 | 1/2019 |
| NL | 2020275 | 7/2019 |
| NZ | 198486 | 5/1986 |
| NZ | 199494 | 7/1986 |
| NZ | 203924 | 10/1986 |
| NZ | 335702 | 3/2001 |
| NZ | 507129 | 8/2002 |
| NZ | 582984 | 1/2011 |
| NZ | 101747418 | 1/2011 |
| RU | 2178711 | 1/2002 |
| RU | 2265324 | 12/2005 |
| SE | 4567 | 3/1893 |
| SE | 5549 | 4/1894 |
| SE | 123213 | 11/1948 |
| SE | 188102 | 3/1964 |
| SU | 1766336 | 10/1992 |
| WO | 1984000468 | 2/1984 |
| WO | 1991011956 | 8/1991 |
| WO | 199302549 | 2/1993 |
| WO | 199822028 | 5/1998 |
| WO | 1998039475 | 9/1998 |
| WO | 1999017658 | 4/1999 |
| WO | 2000062263 | 4/1999 |
| WO | 9945761 | 9/1999 |
| WO | 2000013393 | 3/2000 |
| WO | 2000061802 | 10/2000 |
| WO | 2001033950 | 5/2001 |
| WO | 2001087054 | 11/2001 |
| WO | 2002031629 | 4/2002 |
| WO | 2002085106 | 10/2002 |
| WO | 2003001180 | 1/2003 |
| WO | 2004092920 | 3/2003 |
| WO | 2003087765 | 10/2003 |
| WO | 2003094605 | 11/2003 |
| WO | 2004015655 | 2/2004 |
| WO | 2005104775 | 4/2004 |
| WO | 2006078943 | 1/2005 |
| WO | 2005104930 | 4/2005 |
| WO | 2005073408 | 8/2005 |
| WO | 2006021855 | 3/2006 |
| WO | 2006055737 A2 | 5/2006 |
| WO | 2006134197 | 12/2006 |
| WO | 2006135265 | 12/2006 |
| WO | 2007034211 | 3/2007 |
| WO | 2007095684 | 8/2007 |
| WO | 2007122375 | 11/2007 |
| WO | 2007145450 A1 | 12/2007 |
| WO | 2008033042 | 3/2008 |
| WO | 2008052298 | 5/2008 |
| WO | 2008075974 | 6/2008 |
| WO | 2010091686 | 12/2008 |
| WO | 2009034497 | 3/2009 |
| WO | 2009062249 | 5/2009 |
| WO | 2009076325 | 6/2009 |
| WO | 2009089215 | 7/2009 |
| WO | 2009117764 | 10/2009 |
| WO | 2009153779 | 12/2009 |
| WO | 2010008620 | 1/2010 |
| WO | 2010048753 | 5/2010 |
| WO | 2010053811 | 5/2010 |
| WO | 2010068713 | 6/2010 |
| WO | 2010140900 | 12/2010 |
| WO | 2012075480 | 12/2010 |
| WO | 2011039112 | 4/2011 |
| WO | 2011076886 | 6/2011 |
| WO | 2011154949 | 12/2011 |
| WO | 2012071670 | 6/2012 |
| WO | 2013008115 | 1/2013 |
| WO | 2013038326 | 3/2013 |
| WO | 2013082227 | 6/2013 |
| WO | 2013082227 A1 | 6/2013 |
| WO | 2015001537 | 7/2013 |
| WO | 2013118121 | 8/2013 |
| WO | 2015024050 | 8/2013 |
| WO | 2013179020 | 12/2013 |
| WO | 2013190423 | 12/2013 |
| WO | 2014020463 | 2/2014 |
| WO | 2014095759 | 6/2014 |
| WO | 2014107766 | 7/2014 |
| WO | 2014118788 | 8/2014 |
| WO | 2014125250 | 8/2014 |
| WO | 2016027271 | 8/2014 |
| WO | 2014140148 | 9/2014 |
| WO | 2014141084 | 9/2014 |
| WO | 2014194383 | 12/2014 |
| WO | 2014197631 | 12/2014 |
| WO | 2014199363 | 12/2014 |
| WO | 2015009167 | 1/2015 |
| WO | 2015030832 | 3/2015 |
| WO | 2015055709 | 4/2015 |

(56) References Cited

FOREIGN PATENT DOCUMENTS

| | | |
|---|---|---|
| WO | 2015086338 | 6/2015 |
| WO | 2016207844 | 6/2015 |
| WO | 2015107354 | 7/2015 |
| WO | 2017001717 | 7/2015 |
| WO | 2017031532 | 8/2015 |
| WO | 2015140486 | 9/2015 |
| WO | 2015158787 | 10/2015 |
| WO | 2015175686 | 11/2015 |
| WO | 2015176027 | 11/2015 |
| WO | 2015197385 | 12/2015 |
| WO | 2016037190 | 3/2016 |
| WO | 2017149049 | 3/2016 |
| WO | 2016053104 | 4/2016 |
| WO | 2016108187 | 7/2016 |
| WO | 2016166748 | 10/2016 |
| WO | 2017001538 | 1/2017 |
| WO | 2017027551 | 2/2017 |
| WO | 2017037479 | 3/2017 |
| WO | 2017066813 | 4/2017 |
| WO | 2017089289 | 6/2017 |
| WO | 2017096256 | 6/2017 |
| WO | 2017121834 | 7/2017 |
| WO | 2018006965 | 1/2018 |
| WO | 2018011736 | 1/2018 |
| WO | 2018019742 | 2/2018 |
| WO | 2020022543 | 7/2018 |
| WO | 2018172976 | 9/2018 |
| WO | 2020060248 | 9/2018 |
| WO | 2018203203 | 11/2018 |
| WO | 2019009717 | 1/2019 |
| WO | 2019025138 | 2/2019 |
| WO | 2019046216 | 3/2019 |
| WO | 2019058752 | 3/2019 |
| WO | 2019071222 | 4/2019 |
| WO | 2019132803 | 7/2019 |
| WO | 2019207561 | 10/2019 |
| WO | 2019235942 | 12/2019 |
| WO | 2019245978 | 12/2019 |
| WO | 2020003310 | 1/2020 |
| WO | 2020096528 | 5/2020 |
| WO | 2020140013 | 7/2020 |

OTHER PUBLICATIONS

International Search Report and Written Opinion dated Feb. 3, 2017 for PCT/US2016/064761.
International Search Report and Written Opinion dated Dec. 21, 2018 for PCT/US2018/047707.
Office Action dated Mar. 6, 2020 for AU Application No. 2018260961.
Examination Report dated Mar. 5, 2020 for Australian Application No. 2018220079.
Christian Pahl, Eberhard Hartung, Anne Grothmann, Katrin Mahlkow-Nerge, Angelika Haeussermann, Rumination activity of dairy cows in the 24 hours before and after calving, Journal of Dairy Science, vol. 97, Issue 11, 2014, pp. 6935-6941.
Steensels, Machteld; Maltz, Ephraim; Bahr, Claudia; Berckmans, Daniel; Antler, Aharon; et al., Towards practical application of sensors for monitoring animal health: The effect of post-calving health problems on rumination duration, activity and milk yield, The Journal of Dairy Research; Cambridge vol. 84, Iss. 2, (May 2017): 132-138.
Clark, C., Lyons, N., Millapan, L., Talukder, S., Cronin, G., Kerrisk, K., & Garcia, S. (2015), Rumination and activity levels as predictors of calving for dairy cows, Animal, 9(4), 691-695.
K. Koyama, T. Koyama, M. Sugimoto, N. Kusakari, R. Miura, K. Yoshioka, M. Hirako, Prediction of calving time in Holstein dairy cows by monitoring the ventral tail base surface temperature, The Veterinary Journal, vol. 240, 2018, pp. 1-5, ISSN 1090-0233.
L. Calamari, N. Soriani, G. Panella, F. Petrera, A. Minuti, E. Trevisi, Rumination time around calving: An early signal to detect cows at greater risk of disease, Journal of Dairy Science, vol. 97, Issue 6, 2014, pp. 3635-3647, ISSN 0022-0302.
S. Benaissa, F.A.M. Tuyttens, D. Plets, J. Trogh, L. Martens, L. Vandaele, W. Joseph, B. Sonck, Calving and estrus detection in dairy cattle using a combination of indoor localization and accelerometer sensors, Computers and Electronics in Agriculture, vol. 168, 2020, 105153, ISSN 0168-1699.
N. Soriani, E. Trevisi, L. Calamari, Relationships between rumination time, metabolic conditions, and health status in dairy cows during the transition period, Journal of Animal Science, vol. 90, Issue 12, Dec. 2012, pp. 4544-4554.
The role of sensors, big data and machine learning in modern animal farming; Suresh Neethirajan; Received Jun. 2, 2020; Received in revised form Jun. 30, 2020; Accepted Jul. 3, 2020 Sensing and Bio-Sensing Research 29 (2020) 100367 2214-1804/ © 2020 The Author. Published by Elsevier B.V.
A Review on Determination of Computer Aid Diagnosis and/or Risk Factors Using Data Mining Methods in Veterinary Field Pinar Cihan, Erhan Gökçe, Oya Kalipsiz; Tekirdağ Namik Kemal University, Çorlu Faculty of Engineering, Department of Computer Engineering, Tekirdağ, Turkey. 2019.
Big Data Analytics and Precision Animal Agriculture Symposium: Data to decisions B. J. White, D. E. Amrine, and R. L. Larson Beef Cattle Institute, Kansas State University, Manhattan, KS; © The Author(s) 2018. Published by Oxford University Press on behalf of American Society of Animal Science.
Gasteiner, J.; Boswerger, B.; Guggenberger, T., Practical use of a novel ruminal sensor on dairy farms, Praktische Tierarzt 2012 vol. 93 No. 8 pp. 730 . . . 739 ref.45.

* cited by examiner

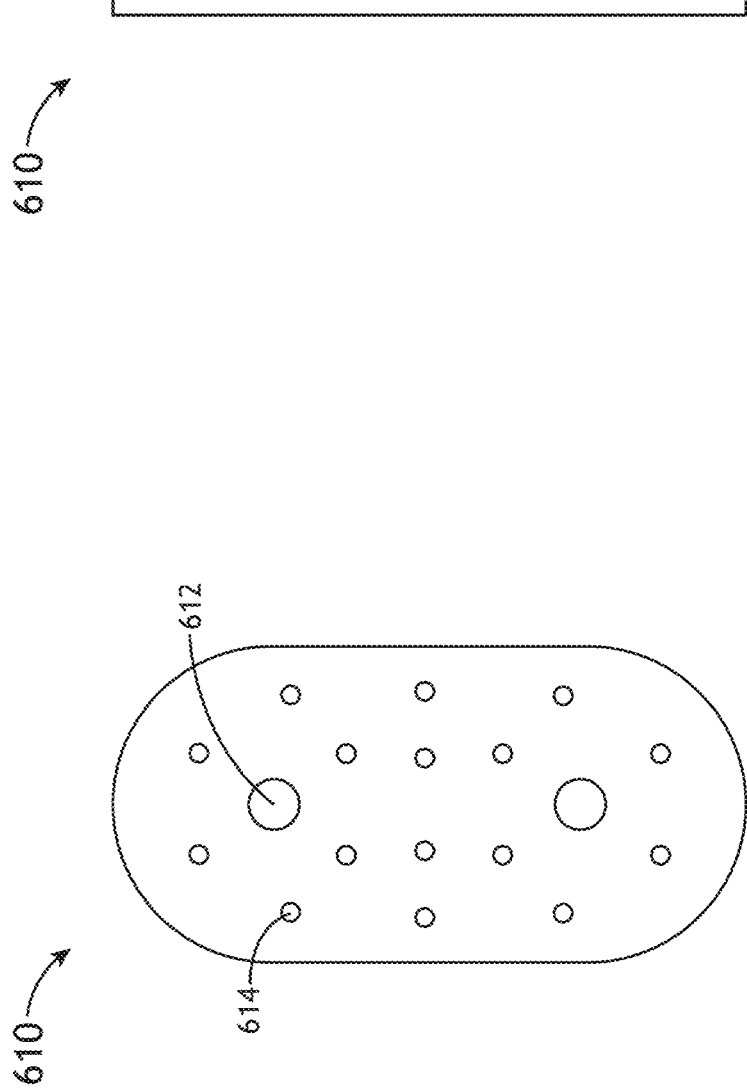

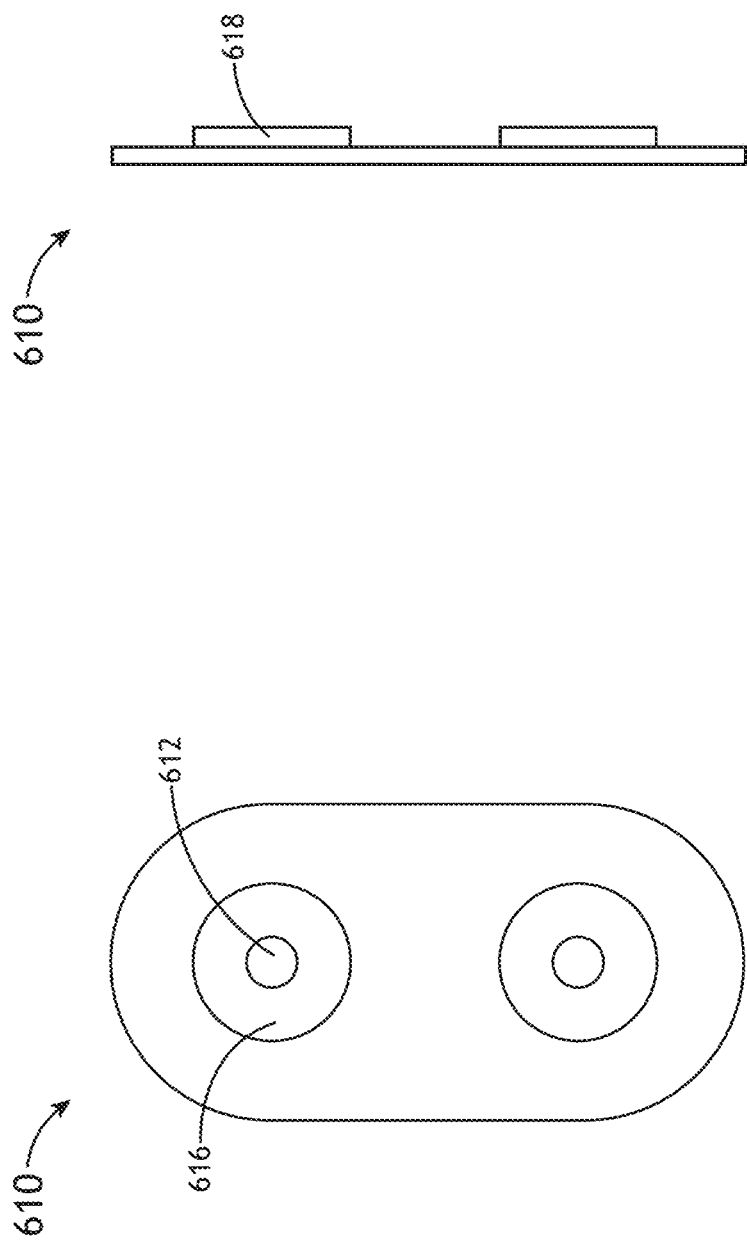

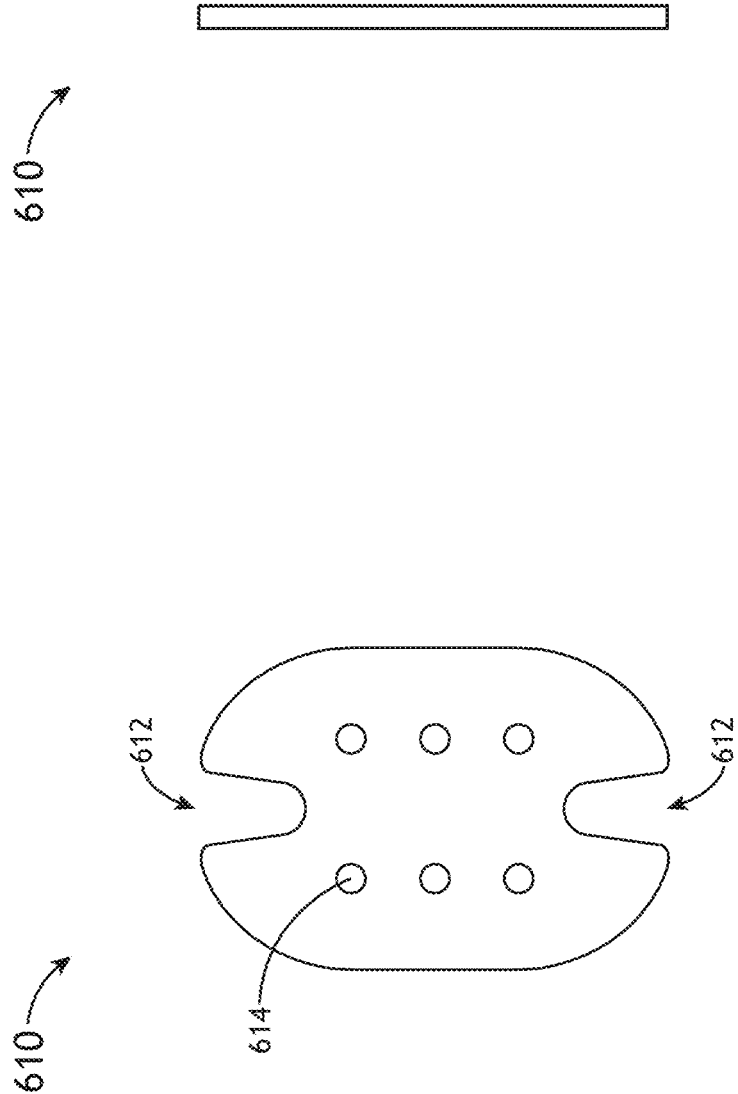

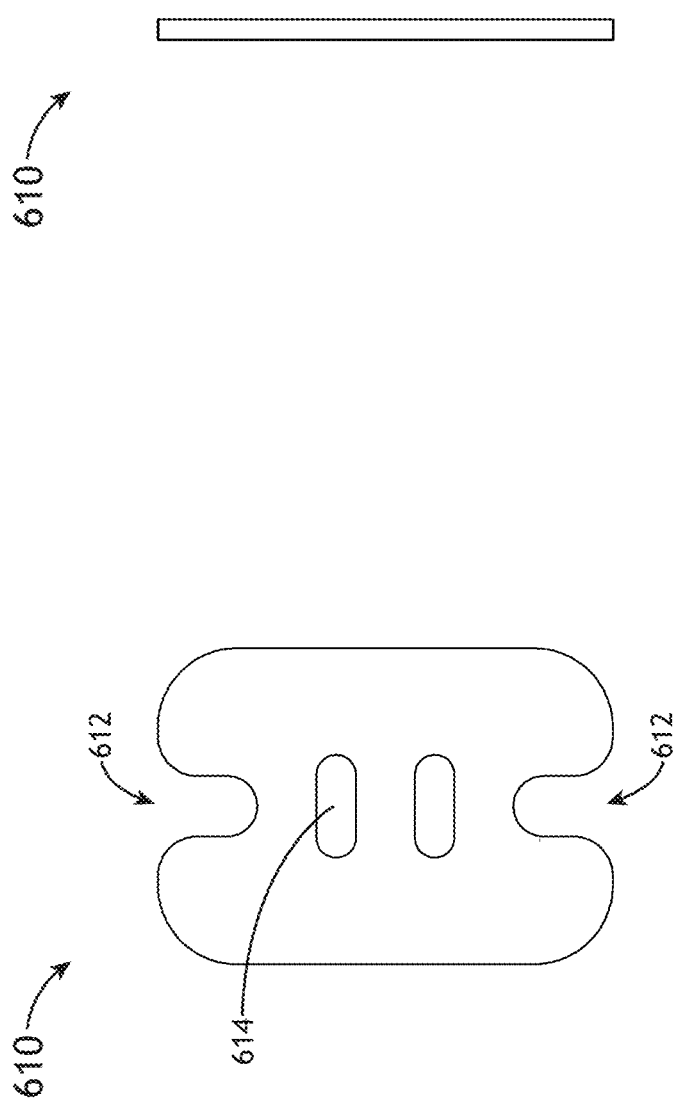

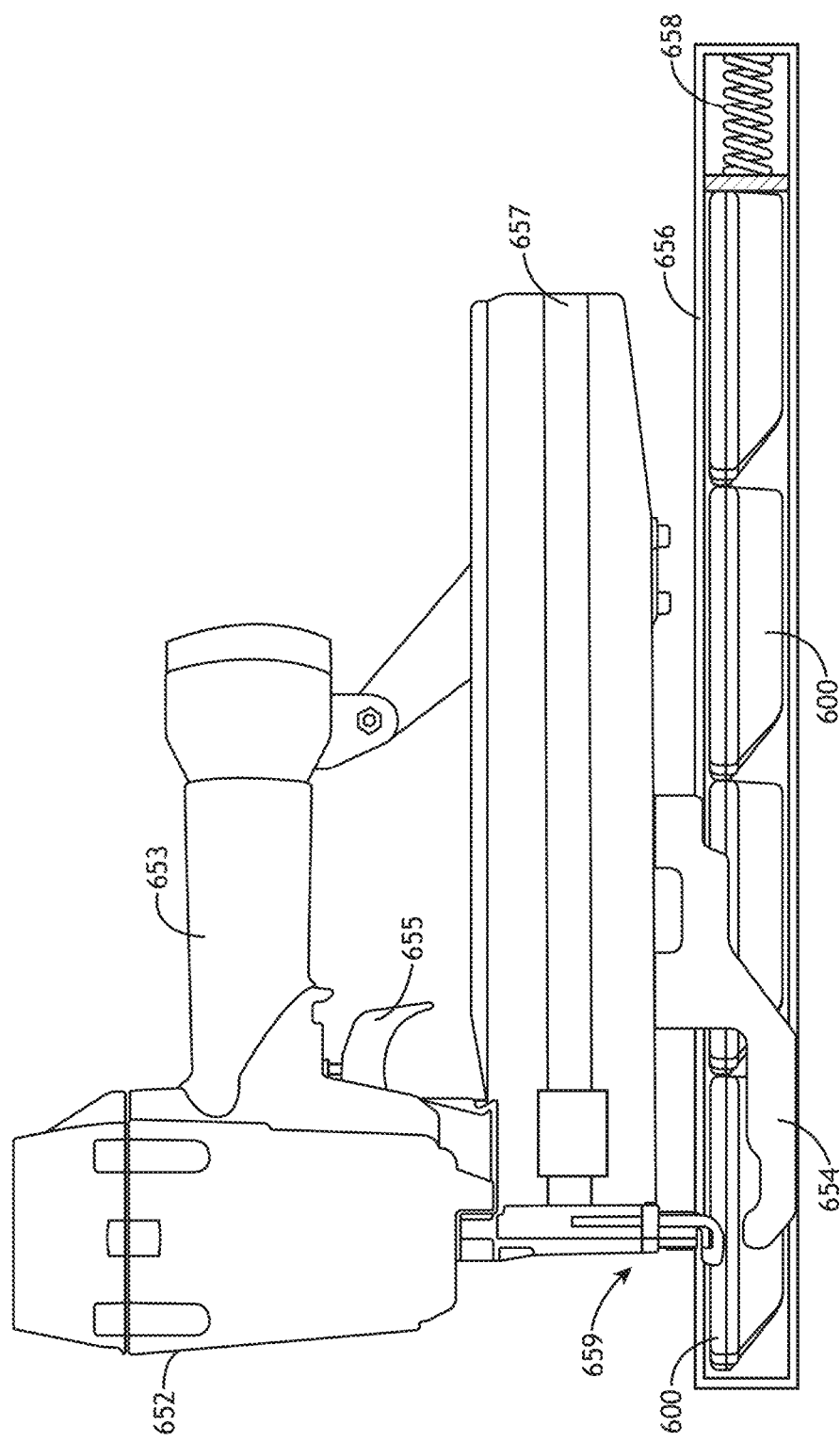

METHOD AND SYSTEM FOR TRACKING HEALTH IN ANIMAL POPULATIONS

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

Related Applications

The present application constitute a continuation-in-part application of United States Non-Provisional Patent Application entitled METHOD AND SYSTEM FOR TRACKING HEALTH IN ANIMAL POPULATIONS, naming Vishal Singh as inventor, filed Jul. 15, 2016, application Ser. No. 15/212,091, which constitutes a continuation-in-part application of United States Non-Provisional Patent Application entitled METHOD AND SYSTEM FOR TRACKING HEALTH IN ANIMAL POPULATIONS, naming Vishal Singh as inventor, filed Dec. 3, 2015, application Ser. No. 14/958,829, which constitutes a continuation-in-part application of United States Non-Provisional Patent Application entitled METHOD AND SYSTEM FOR TRACKING HEALTH IN ANIMAL POPULATIONS, naming Vishal Singh as inventor, filed Sep. 8, 2015, application Ser. No. 14/847,930, which constitutes a non-provisional patent application of the following United States Provisional Patent Applications: METHOD AND SYSTEM FOR TRACKING BIOMETRIC AND ANIMAL BEHAVIOR IN ANIMAL POPULATIONS, naming Vishal Singh as inventor, filed Sep. 5, 2014, application Ser. No. 62/046,702; METHOD AND SYSTEM FOR TRACKING HEALTH IN ANIMAL POPULATIONS, naming Vishal Singh as inventor, filed Jan. 30, 2015, application Ser. No. 62/110,230; METHOD AND SYSTEM FOR TRACKING HEALTH IN ANIMAL POPULATIONS, naming Vishal Singh as inventor, filed Jun. 24, 2015, application Ser. No. 62/184,158; and METHOD AND SYSTEM FOR DATA TRANSFER IN A TAGGED ANIMAL POPULATION, naming Vishal Singh, Paul Hoffmeyer and Spencer Keller as inventors, filed Sep. 4, 2015, application Ser. No. 62/214,568.

The present application also constitutes a continuation-in-part application of PCT/US15/49006 entitled METHOD AND SYSTEM FOR TRACKING HEALTH IN ANIMAL POPULATIONS, naming Vishal Singh as inventor, filed Sep. 8, 2015.

Each of the above-listed applications is incorporated herein by reference in the entirety.

TECHNICAL FIELD

The present invention generally relates to animal health tracking, and, in particular, to the tracking of physiological and/or behavioral parameters of multiple animals in an animal population.

BACKGROUND

Identifying and treating illness in early stages of livestock development can aid in reducing herd disease outbreak, and reduce herd loss and the need for culling. There are a variety of illnesses from which confined cattle commonly suffer. Diseases of the respiratory system are a major cause of illness and death in cattle. One such illness includes Bovine Respiratory Disease Complex (BRD), which often turns into severe and/or fatal bacterial pneumonia. It is further noted that major viruses such as Infectious Bovine Rhinotracheitis (IBR), parainfluenza virus, syncytial virus, and bovine virus are often a precursor to BRD. Antibiotics are often not effective, especially when treated in later stages of the illness. As such, early detection of the disease is critical in minimizing herd loss. Currently, the most common identification of sickness is via rectal temperature and visual cues, which often occur well beyond early onset of symptoms, such as fever, of the given illness. As such, it would be advantageous to provide a system and method that provides illness identification and/or diagnosis that cures the deficiencies of prior approaches identified above.

SUMMARY

A system for monitoring one or more characteristics in an animal population is disclosed, in accordance with an embodiment of the present disclosure. In one illustrative embodiment, the system includes a plurality of animal tag assemblies, each animal tag assembly configured for being disposed on a member of the animal population, each of the animal tag assemblies including one or more sensors configured to measure one or more animal characteristics of the member of the animal population. In another illustrative embodiment, the system includes a concentrator communicatively coupled to the plurality of animal tag assemblies and configured to acquire one or more animal characteristics from the plurality of animal tag assemblies. In another illustrative embodiment, the system includes a controller communicatively coupled to the concentrator, wherein the controller includes one or more processors configured to execute a set of program instructions stored in memory and configured to cause the controller to: receive the acquired one or more animal characteristics from the plurality of animal tag assemblies from the concentrator; determine a health state of one or more of the members of the animal population based on the received one or more animal characteristics; and report the determined health state to one or more user devices.

A system for monitoring one or more characteristics in an animal population is disclosed, in accordance with another embodiment of the present disclosure.

In one illustrative embodiment, the system includes a plurality of animal tag assemblies, each animal tag assembly configured for being disposed on a member of the animal population, each of the animal tag assemblies including at least one of a temperature sensor, an accelerometer, a magnetometer or gyroscope. In another illustrative embodiment, the system includes a concentrator communicatively coupled to the plurality of animal tag assemblies and configured to acquire readout data from at least one of the temperature sensor, the accelerometer, the magnetometer or the gyroscope. In another illustrative embodiment, the system includes a controller communicatively coupled to the concentrator, wherein the controller includes one or more processors configured to execute a set of program instructions stored in memory and configured to cause the controller to: receive the acquired readout data from the at least one of the temperature sensor, the accelerometer, the magnetometer or the gyroscope from the concentrator; determine a health state of one or more of the members of the animal population based on the received readout data from at least one of the temperature sensor, the accelerometer, the magnetometer or the gyroscope; and report the determined health state to one or more user devices An animal tag assembly for monitoring one or more characteristics in an animal population is disclosed, in accordance with an embodiment of the present disclosure. In one illustrative embodiment, the tag assembly includes an animal tag body. In another illustrative embodiment, the tag assembly includes a first temperature sensor disposed on the animal tag body. In another illustrative embodiment, the tag assembly includes a second temperature sensor disposed on the animal tag body. In another illustrative embodiment, the first temperature sensor and the second temperature sensor are configured to acquire a differential temperature measurement of an internal ear cavity of a member of the animal population. In another illustrative embodiment, the animal tag body includes two or more connection pass-throughs for coupling the animal tag assembly to the member of the animal population.

An animal tag assembly for monitoring one or more characteristics in an animal population is disclosed, in accordance with an embodiment of the present disclosure. In one illustrative embodiment, the tag assembly includes an animal tag body. In another illustrative embodiment, the tag assembly includes one or more temperature sensors disposed on the animal tag body. In another illustrative embodiment, the animal tag body is configured for placement on the inner portion of an ear of a member of the animal population so as to acquire a temperature measurement of an internal ear cavity of the member of the animal population. In another illustrative embodiment, the tag assembly includes a backing layer configured for placement on an outer surface of the ear of the member of the animal population. In another illustrative embodiment, the animal tag body and the backing layer include two or more connection pass-throughs for coupling the animal tag assembly and the backing layer to the member of the animal population.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Figure 1A:
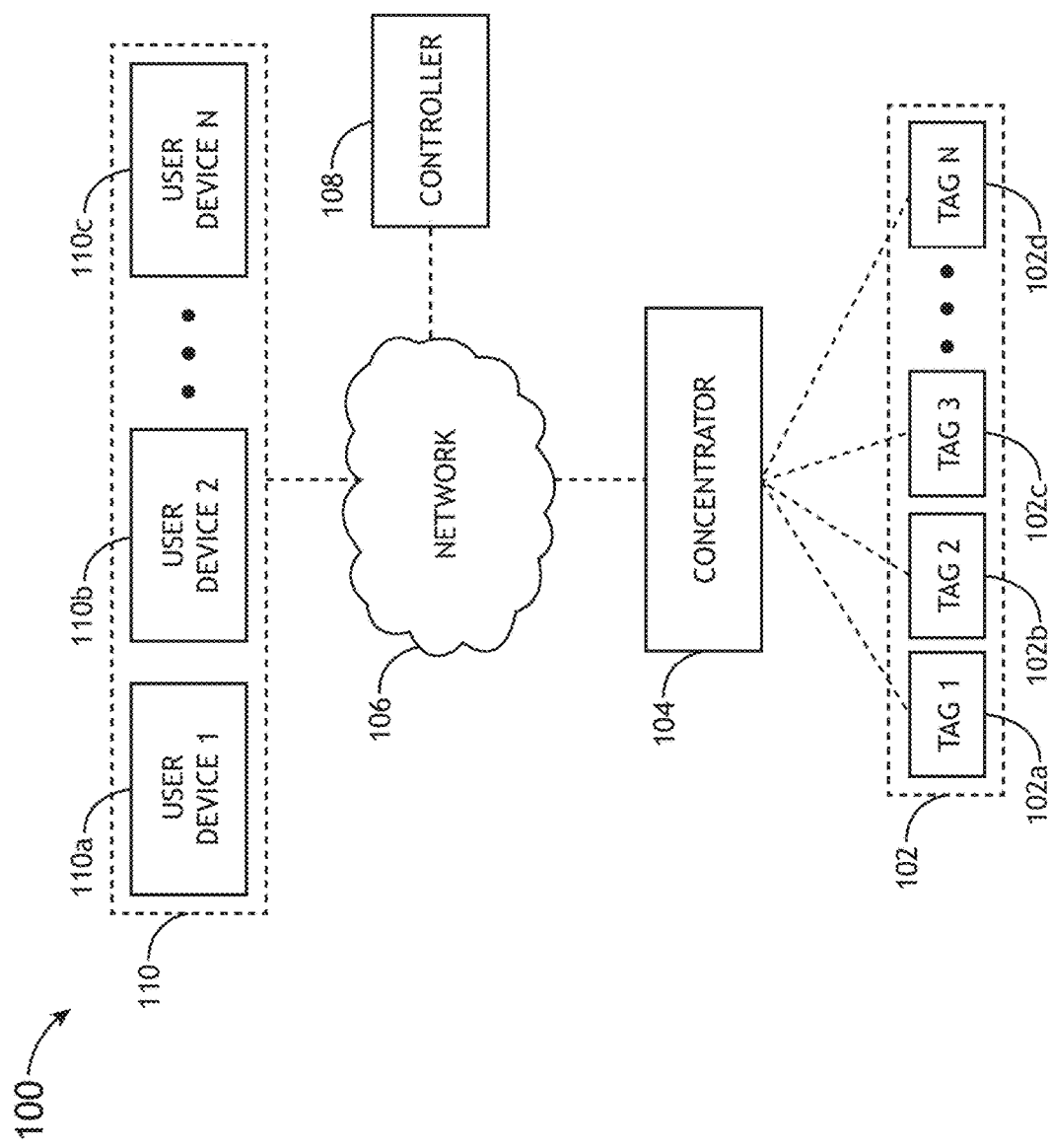
FIGS. 1A-1D illustrate a system for monitoring one or more characteristics of one or more members of an animal population, in accordance with one or more embodiments of the present disclosure.

Reference will now be made in detail to the subject matter disclosed, which is illustrated in the accompanying drawings.

Referring generally to FIGS. 1A through 7B, a method and system for tracking physiological or behavioral parameters of animals in an animal population are described in accordance with the present disclosure.

Embodiments of the present disclosure are directed to one or more systems and methods for tracking, analyzing and diagnosing the health of an individual animal or an animal population. Embodiments of the present disclosure may acquire a variety of metrics from an animal (or from animals) to assist in early diagnosis and analysis of the health of an animal population (e.g., cattle herd). For example, the present disclosure may be utilized to monitor and diagnose the health of an animal herd (e.g., cattle, swine, and the like) in a commercial feedlot setting. The on-animal devices of the present disclosure may communicate wirelessly with users (e.g., feedlot managers, pen riders and etc.) the likelihood of illness of one or more members of the given animal population, which provides for early treatment and reduced herd loss. The on-animal sensors and analysis routines of the present disclosure will allow for monitoring of a variety of animal characteristics (e.g., physiological and behavior), patterns, weather data and etc., alerting pen riders and feedlot managers of early signs of illness. The early detection of illness in an animal population may also assist in optimizing weight gain rates, reducing the use of antibiotics, allowing for biosecurity and proactive outbreak procedures, and reducing labor and manpower usage.

Embodiments of the present disclosure may include animal characteristics measurement and/or tracking, such as, but not limited to, head tilt tracking, activity tracking, nutrient uptake tracking (e.g., position and/or proximity sensing). In addition, embodiments of the present disclosure may include physiological metric measurement and/or tracking, such as, but not limited to, temperature measurement and/or tracking. Embodiments of the present disclosure may provide for individual and herd trend analysis with predictive modeling. Embodiments of the present disclosure may allow producers to monitor animal and herd trends through historical and predictive data, allowing for proactive measures to increase production.

FIGS. 1A-1D illustrate a system 100 for monitoring one or more characteristics of one or more members of an animal population, in accordance with one embodiment of the present disclosure. The system 100 may monitor the health of one or more animals via the tracking of physiological and/or behavioral characteristics of one or more animals in a given animal population.

In one embodiment, the system 100 includes one or more tag assemblies 102. For example, the system 100 may include, but is not limited to, a set of animal tag assemblies 102a-102d disposed on members of at least a portion of an animal population. For instance, the system 100 may include, but is not limited to, tag 102a for monitoring one or more characteristics of a first animal, tag 102b for monitoring one or more characteristics of a second animal, tag 102c for monitoring one or more characteristics of a third animal, and a tag 102d for monitoring one or more characteristics of an Nth animal.

In another embodiment, the system 100 includes a concentrator 104 (or network of concentrators) that is communicatively couplable to the set of tag assemblies 102a-102d. For example, the concentrator 104 may be, but is not required to be, communicatively coupled (e.g., wirelessly coupled using a selected communication protocol) to the one or more tag assemblies 102 such that the data acquired via the one or more tag assemblies 102a-102d is collected from the one or more tag assemblies 102a-102d. It is noted herein that the terms "concentrator" is used interchangeably with "receiver" and/or "base station" throughout the present disclosure.

In another embodiment, the concentrator 104 is also communicatively coupled to a controller 108 via a network 106. For example, the controller 108 may include, but is not limited to, one or more servers. For instance, the controller 108 may include, but is not limited to, a remote server coupled to the concentrator 104 via network 106.

In another embodiment, one or more user devices 110 are communicatively coupled to the controller 108. In one embodiment, the one or more user devices 110 are indirectly coupled to the controller 108 via the network 106. It is noted herein that the system 100 may allow for any number of user devices to communicate with the controller 108. For example, the system 100 may provide for communication between a first user device 110a, a second user device 110b, and up to an including an Nth user device 110c and controller 108 via network 106. It is further noted that the one or more user devices 110a-110c may include any user device known in the art. For example, the one or more user devices 110a-110c may include, but are not limited to, a desktop computer, a tablet computer, a mobile phone (e.g., smartphone), or a wearable device (e.g., smartwatch and the like). In another embodiment, the one or more user interfaces 110 are directly coupled (not shown) to the controller 108.

In another embodiment, one or more user devices 110 are communicatively coupled to the concentrator 104. In one embodiment, the one or more user devices 110 are indirectly coupled to the concentrator 104 via the network 106. In one embodiment, the one or more user devices 110 are directly coupled (not shown) to the concentrator 104.

The network 106 may include any wireless and/or wireline network protocol known in the art. For example, the network 106 may include, but is not limited to, an internet or an intranet (e.g., LAN, WLAN and the like).

Figure 1B:
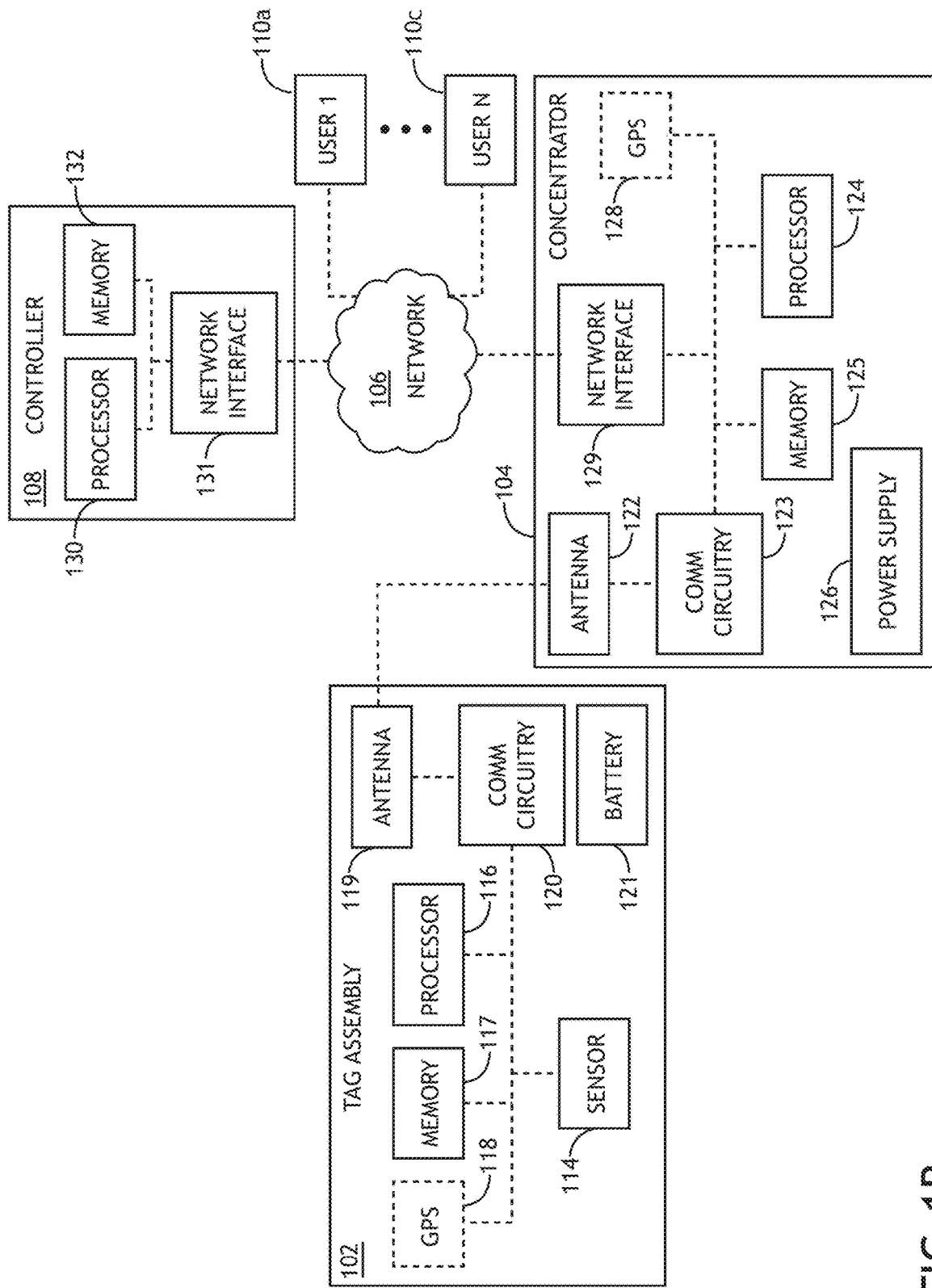

Referring now to FIG. 1B, in one embodiment, one or more of the tag assemblies 102 includes one or more sensors 114. The one or more sensors 114 may include any sensor known in the art capable of measuring one or more physiological and/or behavioral characteristics of an animal. For example, the one or more sensors 114 may include, but are not limited to, a temperature probe (e.g., IR temperature sensor, thermocouple, thermistor and the like), a heart rate monitor (e.g., optical heart monitor), an accelerometer, a magnetometer, a gyroscope, an inertial measurement unit, or a location sensor. It is noted herein that the one or more sensors 114 may be configured to monitor a wide range of physiological and/or behavioral characteristics including, but not limited to, the frequency and/or duration of chewing, a range of motion (e.g. range of head motion), body movements, posture, the amount of activity (e.g., number of steps or distance traveled in a selected amount of time), the frequency and duration of trips to a feed and/or water source. It is further noted herein that the absolute value as well as the relative value of any measurement may be monitored. For example, a change in any one or more physiological and/or behavioral characteristics may indicate a change in health of the given animal. By way of another example, a deviation in any one or more physiological and/or behavioral characteristics of a given animal from a group of other animals of the animal population may indicate a deviation in health of the given animal from the rest of the animal population. In this regard, the one or more sensors 114 of the tag assemblies 102 may be used to identify an outlier of the animal population.

In another embodiment, the tag assembly 102 includes a memory 117 and a processor 116. In this regard, any of the one or more physiological and/or behavioral characteristics measured by the one or more sensors 114 may be permanently or temporarily stored in memory 117. In another embodiment, when the given tag assembly 102 is interrogated by the concentrator 104, the processor 116 may direct the communication circuitry 120 and antenna 119 of the tag assembly 102 to transmit all or a portion of the stored one or more physiological and/or behavioral characteristics to the concentrator 104.

It is noted herein that the communication circuitry 120 may alternately be referred to as a "data radio". The memory 117 may include any memory type known in the art. For example, the memory 117 may include, but is not limited to, an Electrically Erasable Programmable Read Only Memory (EEPROM) device. The processor 124 may include, but is not limited to, a microcontroller unit (MCU). It is noted herein that the communication circuitry 120 and the antenna 119 may be configured to operate in any frequency band known in the art. In one embodiment, the communication circuitry 120 and the antenna 119 are configured to operate in a Radio Frequency (RF) band. In one embodiment, the communication circuitry 120 and the antenna 119 are configured to operate in a selected band (e.g., band between 902 MHz and 928 MHz). It is noted herein that the antenna 119 may be of any type known in the art, including, but not limited to, an embedded antenna or an external antenna.

In another embodiment, the tag assembly 102 includes one or more GPS chips 118 suitable for measuring the location of the given tag assembly 102. In some embodiments, the GPS chip 118 is configured to generate a timestamp corresponding to a time of data acquisition. It is noted herein that the GPS chip 118 may be used to measure one or more characteristics of a given animal through the tracking of position of the given animal. It is recognized herein that relative position of the tag assembly 102 may be deduced in a variety of ways without the need of a GPS chip, which will be discussed further herein.

In another embodiment, the tag assembly 102 includes a power supply for powering any one of the various components of the tag assembly 102. For example, the tag assembly 102 includes one or more batteries 121, one or more power generating devices (e.g., piezoelectric device, photovoltaic cell and the like) and/or a combination of one or more batteries and power generating devices. It is noted herein that the tag assembly 102 may utilize any battery technology known in the art.

In one embodiment, as shown in FIG. 1B, the concentrator 104 is powered by a power supply 126. It is noted herein that the power supply 126 may include any power supply known in the art including, but not limited to, a battery or a transformer configured to convert AC power to DC power. In one embodiment, the concentrator 104 includes one or more processors 116 and memory 125. The memory 125 may include, but is not limited to, EEPROM memory. The processor 124 may include, but is not limited to, a MCU.

In one embodiment, the one or more tag assemblies 102 are communicatively coupled to the concentrator 104 via a local communication link. For example, the one or more tag assemblies 102 may be coupled to the concentrator 104 via a local wireless communication link. For instance, the concentrator 104 may include, but is not limited to, communication circuitry 123 coupled to an antenna 122. Further, the communication circuitry 123 and the antenna 122 may be configured to wirelessly communicate with the communication circuitry 120 and antenna 119 of one or more tag assemblies 102. In one embodiment, the communication circuitry 120 may include a radio frequency (RF) module suitable for transmitting one or more signals to the communication circuitry 123 of the concentrator 104. The communication circuitry 120 and 123 may be compatible with any wireless protocol known in the art, such as, but not limited to, BLUETOOTH, LOW ENERGY BLUETOOTH, WIFI, RFID and the like. In this regard, any of the one or more physiological and/or behavioral characteristics measured by the one or more tag assemblies 102 may be transmitted from the one or more tag assemblies 102, received by the concentrator 104 and then stored, permanently or temporarily, in memory 125 of the concentrator 104.

In one embodiment, the concentrator 104 includes one or more GPS chips 128 configured to determine the location of the concentrator 104. In some embodiments, the GPS chip 128 is configured to generate a timestamp corresponding to a data acquisition time.

In one embodiment, the concentrator 104 includes network interface circuitry 129 communicatively coupled to the controller 108 (e.g., server) via network 106. It is noted herein that network interface circuitry 129 may be configured to communicate with the controller 108 using any network protocol known in the art including, but not limited to, Ethernet, WiFi, or a cellular communication network. It is further noted that multiple network protocols may be utilized. In one embodiment, network interface circuitry 129 is configured to communicate via Ethernet. In another embodiment, network interface circuitry 129 is configured to communicate via WiFi. In another embodiment, network interface circuitry 129 is configured to communicate via a cellular communication network. In some embodiments, the concentrator 104 includes multiple network interfaces 135.

It is noted herein that one or more of the data analysis routines of the present disclosure may be performed using the one or more processors 116 (and program instructions) on-board the concentrator 104. In another embodiment, the one or more processors 116 may direct network interface circuitry 129 to transmit the one or more physiological and/or behavioral characteristics to the controller 108 for data analysis.

In another embodiment, the controller 108 (or another controller) may include one or more processors 130 and memory 132. In this regard, the controller 108 may receive the one or more physiological and/or behavioral characteristics from the concentrator 104 (via signal from network 106) and apply one or more of the various analysis routines of the present disclosure. For example, the controller 108 may include network interface circuitry 131 for interfacing with network 106. In this regard, memory 132 may maintain any set of program instructions required to implement data analysis routines for determining a state of health of one or more animals based on the received one or more physiological and/or behavioral characteristics.

It is noted herein that the controller 108 may be configured to perform one or more tasks associated with data collected by the one or more tag assemblies 102. For example, the controller 108 may be configured to store data and/or to generate one or more statistics relevant to the interpretation of the data. It is noted herein that one or more of the data analysis routines of the present disclosure may be performed using one or more processors 116 (and program instructions) on-board the controller 108 configured to perform data analysis. In one embodiment, the controller 108 is configured to store health monitoring data collected by the one or more tag assemblies 102. In another embodiment, the controller 108 is configured to generate a relative risk level for each of the animals in the animal population according to one or more statistical metrics calculated using data collected by the one or more tag assemblies 102. In some embodiments, the controller 108 includes multiple redundant devices. For example, the controller 108 may include a third party server.

In another embodiment, the controller 108 may serve one or more results of the health state determination to the one or more user devices 112a, 112b via network 106. For example, the controller 108, upon identifying an animal displaying characteristics indicative of an illness (or injury), may transmit an indication to the one or more user devices 112a, 112b. In addition, one or more users, via the one or more user devices 112a, 112b, may request the particular type(s) of physiological and/or behavioral characteristics that the controller 108 should use for determining a health state in one or more animals of the population, as described further herein.

It is further noted herein that the one or more user devices 112a, 112b may be configured to display one or more statistical metrics (e.g., an information set) calculated using data collected by the one or more tag assemblies 102 and/or raw data collected by the one or more tag assemblies 102. The one or more statistical metrics may be calculated using one or more processors 130 on-board the controller 108 or using one or more processors 116 on-board the concentrator 104. In some embodiments, the one or more user devices 112a, 112b are configured to display the same information (e.g. to provide access to data from multiple locations).

The one or more processors 116, 124, 130 of tag assembly 102, concentrator 104 and controller 108 may include any one or more processing elements known in the art. In this sense, the one or more processors 116, 124, 130 may include any microprocessor-type device configured to execute software algorithms and/or instructions. In one embodiment, the one or more processors 116, 124, 130 may consist of a MCU configured to execute a program configured to operate the components of system 100, as described throughout the present disclosure. In general, the term "processor" may be broadly defined to encompass any device having one or more processing or logic elements, which execute program instructions from a non-transitory memory medium (e.g., memory 117, 125, 132). Moreover, different subsystems of the system 100 may include processor or logic elements suitable for carrying out at least a portion of the steps described throughout the present disclosure. Therefore, the above description should not be interpreted as a limitation on the present invention but merely an illustration.

The memory 117, 125 and 132 of tag assembly 102, concentrator 104 and controller 108 may include any storage medium known in the art suitable for storing program instructions executable by the associated one or more processors. For example, the memory 117, 125 and 132 may include a non-transitory memory medium. For instance, the memory 117, 125 and 132 may include, but is not limited to, a read-only memory, a random access memory, a magnetic or optical memory device (e.g., disk), a magnetic tape, a solid state drive, EEPROM and the like. In another embodiment, the memory 117, 125 and 132 are configured to store one or more results from the one or more tag assemblies 102 and/or the output of the various steps described herein.

Figure 1C:
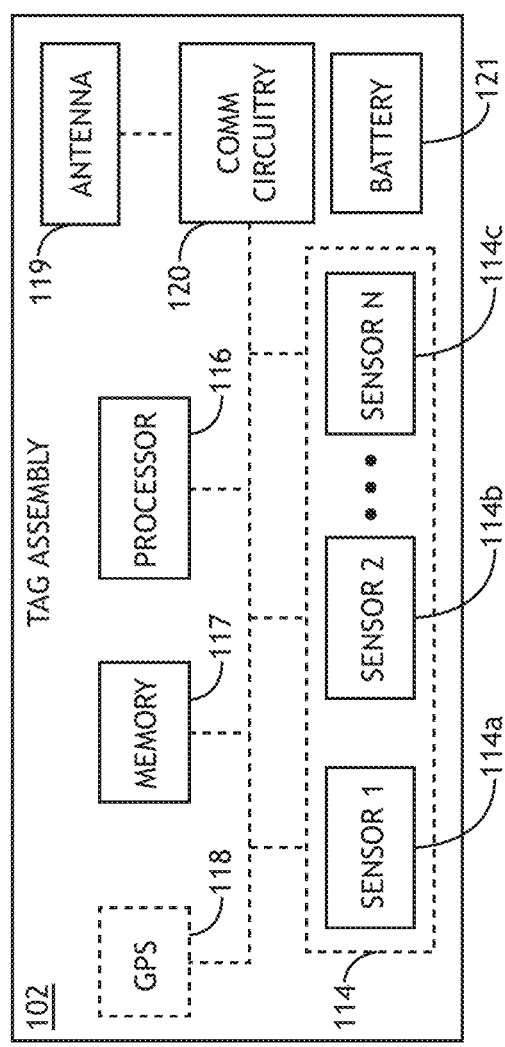

Referring now to FIG. 1C, in one embodiment, a tag assembly 102 includes multiple sensors 114. For example, the tag assembly 102 may include, but is not limited to, a first sensor 114a, a second sensor 114b and up to and including an Nth sensor 114c. In this regard, sensors 114a-114c may include any two or more sensors known in the art capable of measuring one or more physiological and/or behavioral characteristics of an animal. For example, the two or more sensors 114s1-114c may include, but are not limited to, two or more of the following: a temperature probe, a heart rate monitor, an accelerometer, a magnetometer, a gyroscope, an inertial measurement unit, a location sensor or the like.

In one embodiment, the one or more sensors 114 of the tag assembly 102 may measure one or more physiological characteristics. For example, one or more sensors 114 may include a thermal probe (e.g., thermocouple) for measuring the temperature of an animal with which the given tag assembly 102 is disposed. In this regard, temperature data of given animal may be measured and tracked as a function of time. By way of another example, one or more sensors 114 may include a heart monitor for measuring the heart rate of an animal with which the given tag assembly 102 is disposed. In this regard, heart rate data of given animal may be measured and tracked as a function of time.

In another embodiment, the system 100 may measure one or more behavioral characteristics. In one embodiment, the one or more behavioral characteristics measured by the one or more sensors 114 of the tag assemblies 102 may include, but are not limited, one or more animal posture characteristics. In one embodiment, an animal posture characteristic may include, but is not limited to, head tilt, body lean, gait or the like. For example, head tilt may be determined for a given animal by measuring the relative position (e.g., height of head relative to an initial head position) associated with a given tag assembly 102 in order to deduce the height of the animal's head, and, thus, the tilt of the animals head and/or neck. The head tilt measurement may consist of a relative head tilt measurement. For example, the relative head tilt measurement may include comparing a measured head tilt value to one or more head tilt values (or statistically aggregated head title values (e.g., average)) of a portion of the animal population. By way of another example, the relative head tilt measurement may include comparing a measured head tilt value to initial head tilt value (or a time-averaged value) of the same animal. By way of another example, the one or more sensors 114 of a given tag assembly 102 may include an accelerometer, magnetometer and/or gyroscope (or a consolidated IMU) suitable for measuring the head tilt of a given animal.

In another embodiment, the one or more behavioral characteristics measured by the one or more sensors 114 of the tag assemblies 102 may include, but are not limited, one or more position (or movement) characteristics of one or more animals. In one embodiment, the one or more position (or movement) characteristics may include, but are not limited to, the number of steps taken by the animal over a selected time period. For example, at least one of the sensors 114 on-board the tag assembly 102 associated with a given animal may include an accelerometer, such as a three-axis accelerometer, configured to measure motion data associated with the given animal. By way of another example, the sensors 114 may be configured as a motion sensor (e.g., nine-axis motion sensor) equipped with an accelerometer, gyroscope and/or magnetometer (or consolidated IMU).

In another embodiment, once the motion data is collected by the one or more tag assemblies 102, the processor and programming instructions of the concentrator 104 or the controller 108 may convert this motion data to "animal steps" based on a pre-programmed algorithm, which relates motion data to steps. In another embodiment, the motion data captured by the one or more sensors 114 may be converted to the distance traveled by an animal over a selected time period or average speed of the animal over a selected time period. In another embodiment, as noted previously herein, one or more sensors 114 of the tag assembly 102 of a given animal may include a GPS chip 118. In this regard, a GPS-enabled tag assembly 102 may be used to directly measure the location and movement of a given animal of an animal heard.

In another embodiment, once the one or more tag assemblies 102 of the system 100 collect physiological data and/or behavioral data associated with the respective animals, the one or more tag assemblies 102 may transmit all or some of this data to the concentrators 104. In turn, the concentrator 104 may transmit all or some of the received physiological data and/or behavior data to controller 108 (or another controller) for analysis, as described throughout the present disclosure.

Figure 1D:
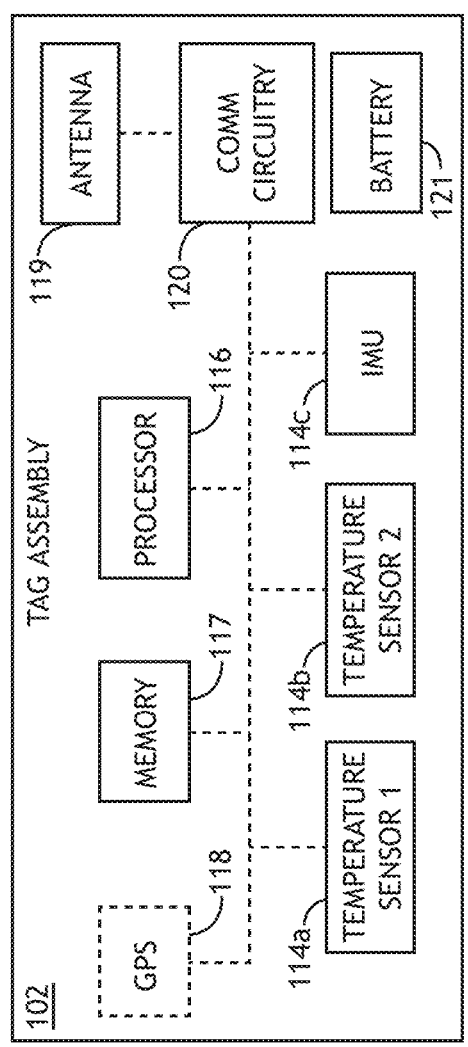

Referring now to FIG. 1D, in one embodiment, the tag assembly 102 includes one or more temperature sensors, such as, but not limited to, a first temperature sensor 114a and a second temperature sensor 114b. In another embodiment, the tag assembly 102 includes an inertial measurement unit (IMU) 122c for monitoring orientation, direction, tilt and/or movement of the tag assembly 102. For example, the IMU 122c may include, but is not limited to, an accelerometer, a magnetometer, and a gyroscope.

It is noted herein that a temperature sensor, such as the first temperature sensor 114a and/or the second temperature sensor 114a, may include any temperature sensor known in the art. For example, the first temperature sensor 114a and/or the second temperature sensor 114b may include, but are not limited to, a thermopile detector, an infrared sensor, or a resistive temperature device. It is further noted that a first temperature sensor 114a and/or a second temperature sensor 114b may detect multiple temperatures simultaneously, such as, but not limited to, the temperature of a proximate object (e.g. a portion of an ear) and the ambient temperature. In one embodiment, two temperature sensors 114a and 114b may measure a differential temperature between a proximate object (e.g., ear canal) and the ambient environment. In another embodiment, multiple temperature sensors are configured to measure multiple differential temperatures between multiple locations of an animal and the ambient environment.

Figure 1E:
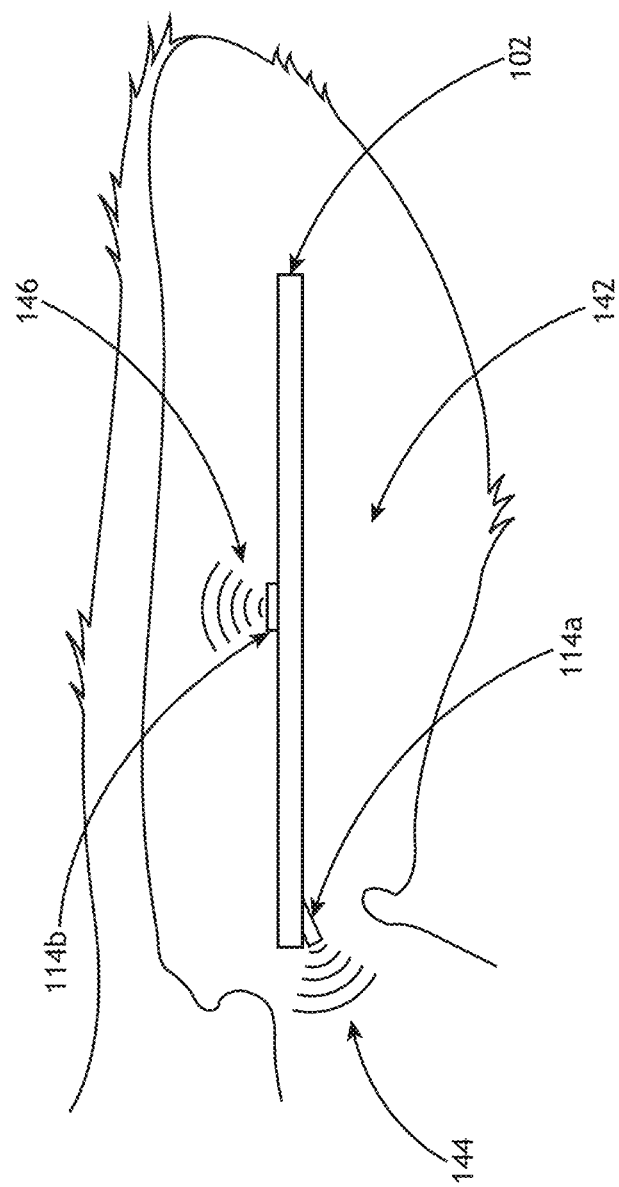
FIG. 1E illustrates a simplified schematic view of a tag assembly equipped with two temperature probes, in accordance with one or more embodiments of the present disclosure.

In another embodiment, each of two temperature sensors 114a and 114b may simultaneously measure two temperatures such that the tag assembly 102, as a whole, simultaneously measures four temperatures. FIG. 1E illustrates a simplified schematic view of tag assembly 102 equipped with two temperature probes 114a, 114b and disposed within the ear of an animal. In one embodiment, a tag 102 is positioned in the ear 142 of an animal (e.g. a cow) such that first temperature sensor 114a simultaneously measures a first temperature and a second temperature, while a second temperature sensor 114b simultaneously measures a third temperature and a fourth temperature. In one embodiment, the first temperature includes a temperature of a portion of the inner ear 1444, which may be referred to as an inner ear temperature (IET). The second temperature includes an ambient temperature of the ear canal, which may be referred to as an Ambient Temperature Near Canal (ANC). The third temperature includes a temperature of a portion of the ear surface 146, which may be referred to as an Ear Surface Temperature (EST). The fourth temperature includes an ambient temperature near a printed circuit board (PCB) associated with the tag 102. The fourth temperature may be referred to as an Ambient Temperature near PCB Surface (APCB). It is noted herein that ambient temperatures (e.g. the second and fourth temperatures) may be used to calibrate the IET and EST temperature measurements. It is further noted that at extreme temperatures, such as high or low temperatures, the IET and EST temperatures may have offsets that may introduce errors when analyzed using a data analysis algorithm. By way of example, an offset associated with the IET and/or the EST may cause a data analysis algorithm to issue a false warning. By way of another example, an offset associated with the IET and/or the EST may cause a data analysis algorithm to not issue a warning when a warning is appropriate. It is noted herein that ambient temperature measurements (e.g. the ANC and/or the APCB) may be used to adjust the IET and/or EST temperatures to generate an adjusted temperature, which serves to compensate for environmental circumstances and aids in reducing or eliminating the frequency of false positives or missed temperature deviations. By way of example, an adjusted temperature may be calculated using the equation:

$$\text{Adjusted Temp} = A \times \text{IET} + B \times \text{EST} + C \times (\text{ANC} + \text{APCB})$$

where A, B, and C are weighting constants. In some embodiments, the value of weighting constant A is greater than the value of weighting constant B. In other embodiments, the values of one or more of the weighting constants A, B, or C may be acquired from a calibration table. For example, the IET may provide the basis function for the temperature estimate and may be weighted highest in the above equation. Further, the EST component may be weighted slightly below the IET. In addition, both ANC and APCB may be used to calibrate the IET and EST measurements.

In one embodiment, a tag assembly 102 includes an indicator (not shown). It is noted herein that the indicator may be configured to generate audio or visual signals. By way example, an indicator may include an audio generation device (e.g. a buzzer) to facilitate the location of a tag assembly 102. By way of another example, an indicator may include one or more light emitting diodes (LEDs) configured to visually display the status of an animal via the state of the LED (e.g. on, off, or flashing).

Figure 1F:
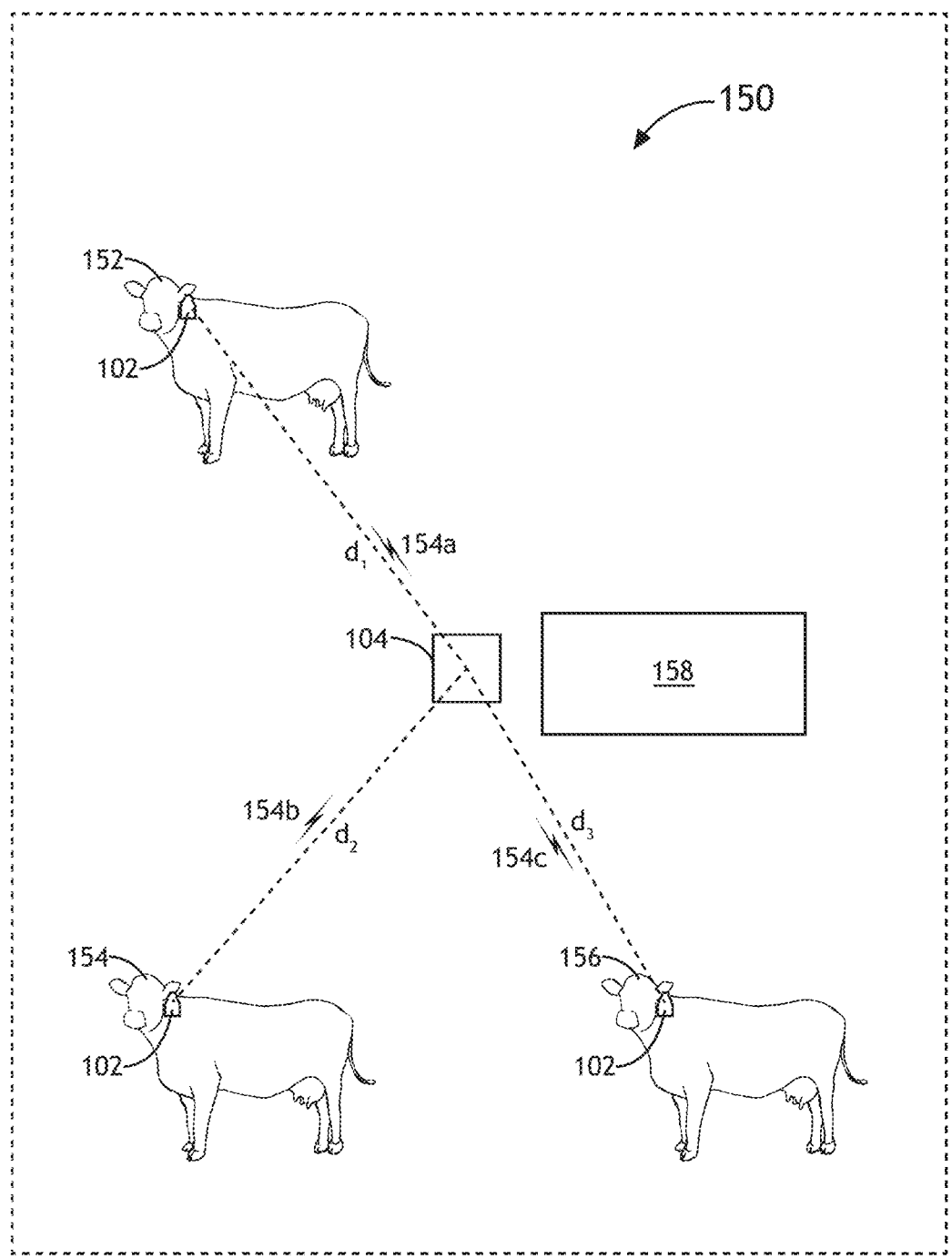
FIGS. 1F-1G illustrate the implementation of concentrator and a set of tag assemblies disposed on animals in a given animal population, in accordance with one or more embodiments of the present disclosure.
Figure 1G:
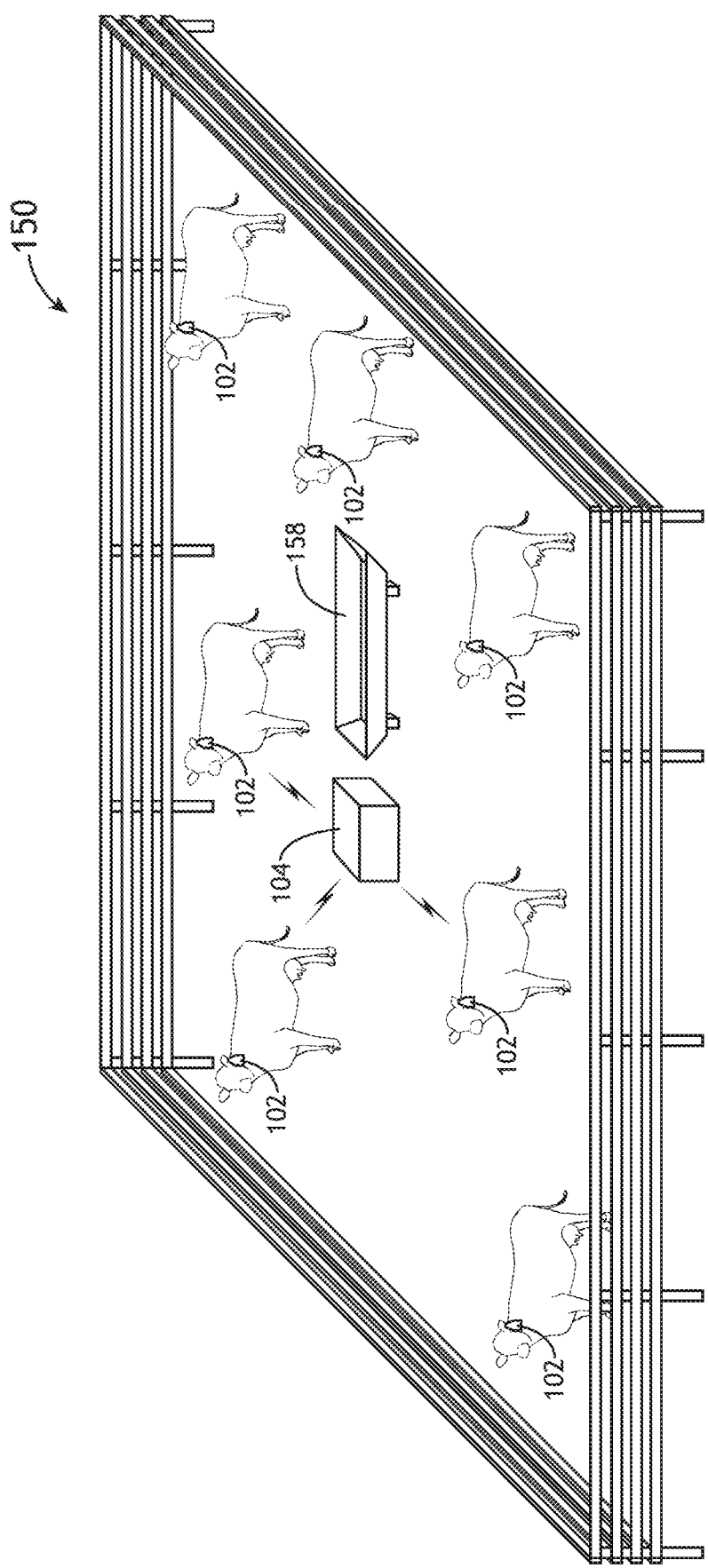

FIGS. 1F-1G illustrate the implementation of concentrator 104 and a set of tag assemblies 102 disposed on animals 152, 154 and 156 in a given animal population 150, in accordance with one embodiment of the present disclosure. In one embodiment, the system 100 may monitor a position characteristic between a nutrient source 158 and one or more animals 152, 154, 156 (and so on). The nutrient source 158 may include any nutrient source known in the art, such as, but not limited to, a feed source (e.g., grain), a water source, a mineral source (e.g., salt lick) and the like.

In one embodiment, one or more concentrators 104 may be placed proximate to the nutrient source 158. The system 100 may monitor one or more position characteristics (e.g., distance, position, direction, and the like) between the tag assemblies 102 attached to one or more animals 152-156 and the concentrator 104 (or concentrators). In this regard, the system 100 may measure and/or track a position characteristic between one or more animals 152-156 and the nutrient source 158 based on the known spatial relationship between the given concentrator 104 (or concentrators) and the nutrient source 158. In one embodiment, the system 100 may measure and/or track the position characteristic between the tag assembly 102 and the concentrator 104 using an RF signal, transmitted from the communication circuitry 120 of a given tag assembly 102 and the communication circuitry 123 of the concentrator 104. For example, one or more program instructions may be used to determine a given position characteristic, such as distance, proximity (e.g., proximity to nutrient source 158), position (e.g., position in feed lot), signal direction and the like, between the communication circuitry 120 of a given tag assembly 102 and the communication circuitry 123 of the concentrator 104 based on one or more characteristics of a signal (e.g., signal 154a, 154b or 154c) as measured by the concentrator 104.

In one embodiment, a distance of one or more animals 152-156 from the nutrient source 158 may be deduced by measuring signal strength of the RF signal (e.g., signal 154a, 154b, or 154c) emanating from one or more tag assemblies 102. For example, as shown in FIG. 1C, a distance $d_1$ of a first animal 152 from the nutrient source 158 may be deduced by measuring a signal strength of the RF signal 154a emanating from the tag assembly 102 associated with the first animal 152. Further, a distance $d_2$ of a second animal 154 from the nutrient source 158 may be deduced by measuring signal strength of the RF signal 154*b* emanating from the tag assembly 102 associated with the second animal 154. In addition, a distance $d_3$ of a third animal 156 from the nutrient source 158 may be deduced by measuring signal strength of the RF signal 154*c* emanating from the tag assembly 102 associated with the third animal 156. In this manner, the distance away from the nutrient source 158 may be deduced for N number of animals in the given animal population 150.

Further, the frequency with which the one or more animals 152-156 utilize the nutrient source 158 may be determined through monitoring the distance of the one or more animals 152-156 from the nutrient source 158 as a function of time. In addition, the use of multiple concentrators 104, each positioned at different nutrient sources 158, may allow the system 100 to monitor feeding frequency, watering frequency and the like for the one or more animals 152-156.

Figure 1H:
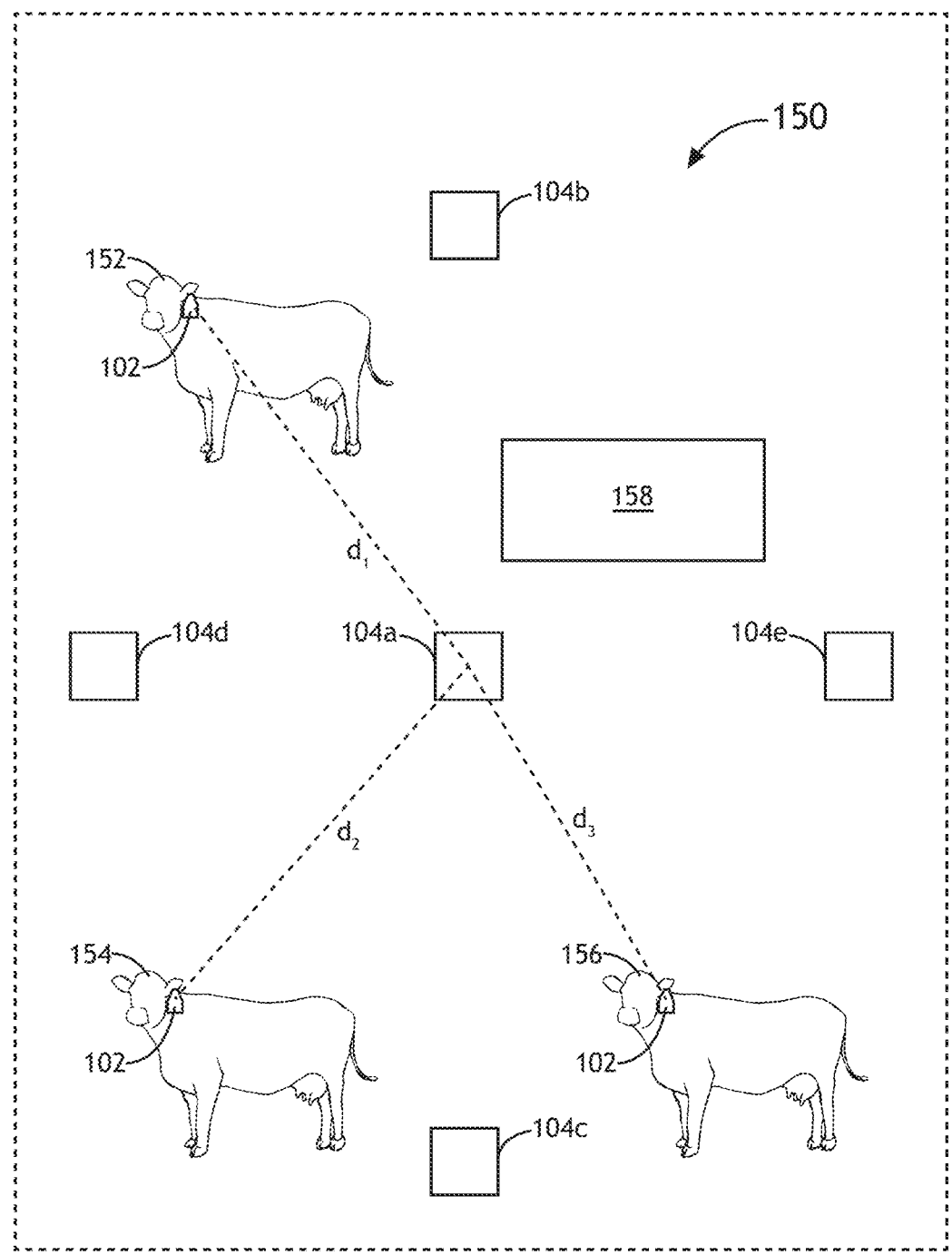
FIG. 1H illustrates the implementation of multiple concentrators and a set of tag assemblies disposed on animals in a given animal population, in accordance with one or more embodiments of the present disclosure.
Figure 1I:
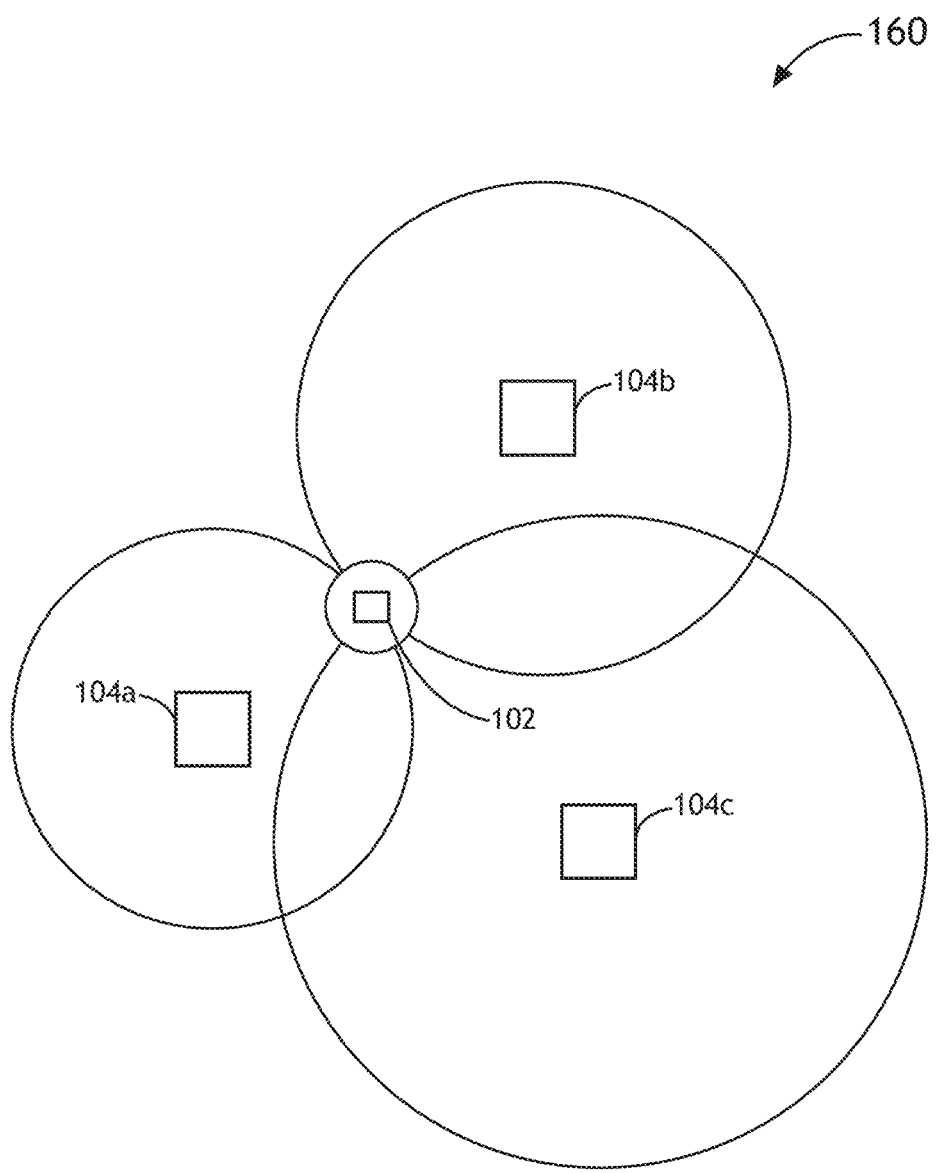
FIG. 1I illustrates a conceptual view of the determination of location of a given tag assembly, in accordance with one or more embodiments of the present disclosure.

FIG. 1H illustrates the implementation of multiple concentrators 104*a*-104*d* and a set of tag assemblies 102 disposed on animals 152, 154, 156 in a given animal population 150, in accordance with one embodiment of the present disclosure. In one embodiment, the concentrators 104*a*-104*e* may be positioned about a given feeding area or a region where the animals reside (e.g., feedlot). For example, multiple concentrators 104*a*-104*e*, each equipped with an antenna (e.g., omnidirectional or directional antenna), may be distributed about a given feedlot (in the case of cattle). In this regard, signal strength associated with a particular tag assembly 102 may be measured by multiple concentrators (e.g., concentrators 104*a*, 104*b*, 104*c*, 104*d* and/or 104*e*), each at different known locations. It is noted that the relative positions between the concentrator is known and can be easily measured. Such a configuration allows for a determination (or estimation) of position of a particular tag assembly 102 through a position algorithm, which estimates position based on the signal strength of the particular tag assembly at two or more of the concentrators 104*a*-104*e* and the known positions of the concentrators 104*a*-104*e*. For example, a radio triangulation procedure may be used to estimate the position of a tag assembly based on the interaction of the tag assembly 102 with three or more concentrators 104*a*-104*e*. FIG. 1I illustrates a conceptual view 160 of the determination of location of a given tag assembly 102 based on such a radio triangulation procedure.

Figure 1J:
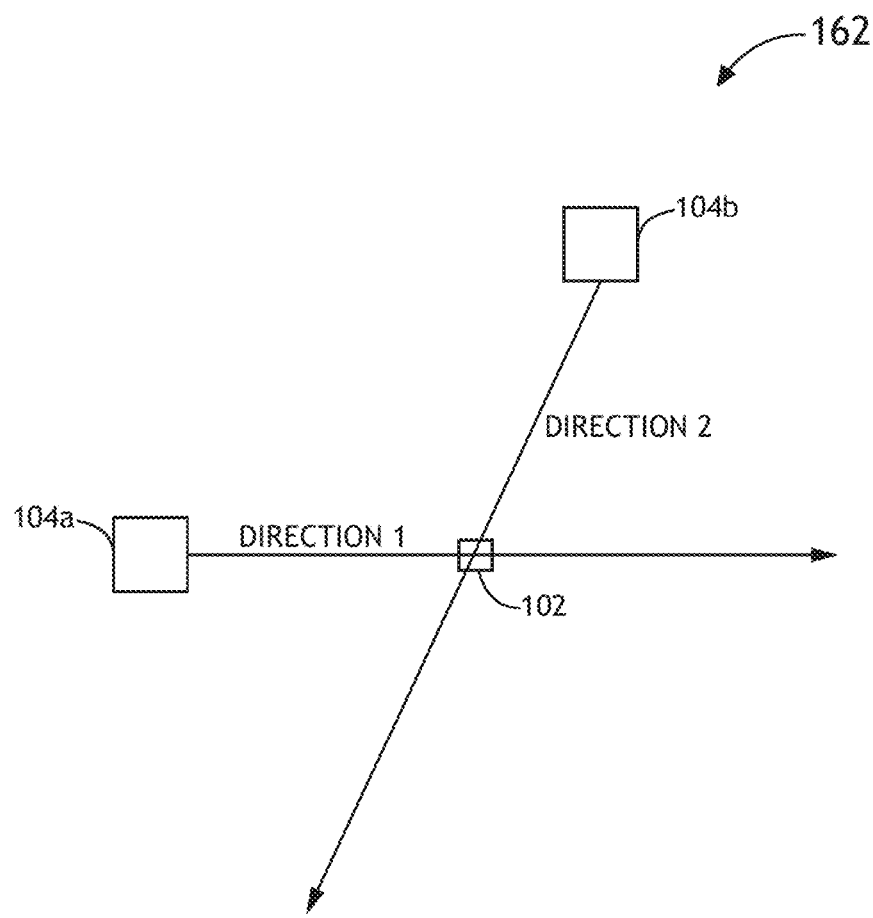
FIG. 1J illustrates a conceptual view of the determination of location of a given tag assembly, in accordance with one or more embodiments of the present disclosure.

In another embodiment, one or more concentrators 104 may be equipped with a directional antenna. In this regard, the distance and direction of one or more animals 152-156 may be determined. Such a configuration may allow for a single concentrator 104 to monitor nutrient uptake frequency at multiple nutrient sources 158. For example, the use of a directional antenna may allow a single concentrator 104 to monitor feeding frequency, watering frequency and the like for the one or more animals 152-156. In another embodiment, multiple concentrators 104 may be equipped with a directional antenna. Based on the direction of signal detection of a given tag assembly 102 by two or more concentrators, the system 100 may determine an approximate position of the tag assembly 102 (e.g., location at which the directional vectors intersect). FIG. 1J illustrates a conceptual view 170 of the determination of location of a given tag assembly 102 using two or more concentrators 104*a*, 104*b* equipped with a direction antenna. As shown in FIG. 1J, the approximate position of the particular tag assembly corresponds to the position where the direction vector between the first concentrator 104*a* and the tag assembly 102 intersects with the direction vector between the second concentrator 104*b* and the tag assembly 102.

It is further noted herein that the system 100 may include multiple concentrators 104, where each concentrator is coupled to a different set of tag assemblies 102. In one embodiment, a first concentrator 104 is coupled to a first set of tag assemblies 102. In another embodiment, a second concentrator 104 is coupled to a second set of tag assemblies 102. It is further noted herein that a concentrator 104 may be coupled to one or more tag assemblies 102 according to any network topology known in the art including, but not limited to, star and mesh topologies. In one embodiment, a concentrator 104 is configured as a hub of a star network topology, with one or more tag assemblies 104 communicatively coupled to the concentrator 104 via point-to-point connections. In another embodiment, one or more repeaters (not shown) are placed between a concentrator 104 and one or more tag assemblies 102 in order to increase the allowable range of the one or more tag assemblies 102.

In one embodiment, utilizing the signal information associated with a given tag assembly 102, a nutrient uptake frequency may be determined. In turn, the nutrient uptake frequency may be recorded in memory 125 of the concentrator 104 and/or transmitted to the controller 108 for future use.

In another embodiment, in the context of the signal strength based techniques described above, the distance traveled and/or the average speed of a given animal may be measured by tracking the position data of a given tag assembly 102 as function of time.

In another embodiment, as previously noted, the concentrator 104 may transmit all or some of the received physiological and/or behavioral data to controller 108 (or another controller). For example, the concentrator 104 may transmit all or some of the received physiological and/or behavioral data to controller 108 (or another controller) via network 106. In one embodiment, once received by the controller 108, the program instructions of the controller 108 may determine a health state of the one or more animals based on the physiological data (e.g., temperature, heart rate and etc.) and/or behavioral data (e.g., head tilt, feeding frequency, amount of movement (e.g., steps) and etc.). For example, upon collecting one or more physiological and/or behavioral characteristics, the one or more concentrators 104 may transmit (e.g., wirelessly or wireline) the collected information to controller 108 (or another controller) via a network (e.g., internet, intranet and the like). In another embodiment, the one or more processors 130 of the controller 108, via a set of program instructions (e.g., maintained in memory 132), may carry out a number of data processing steps on the data to determine a health state of one or more animals of the animal population.

In one embodiment, the measured animal characteristics are compared to a known standard set of characteristics. For example, a database (not shown) may be maintained in memory 132 of the controller 108 (or any other memory accessible by the controller 108) and structured to relate one or more animal characteristics to a particular health state. For instance, any one or more of the physiological characteristics and/or behavioral characteristics may be correlated to known health states of studied animals. After a series of trial-and-error measurements are performed, the database may be constructed and stored in memory 132. In one embodiment, the database may correlate a single characteristic to a particular health state. For example, the controller 108 may utilize the stored database to correlate head tilt to the health state of an animal. For instance, a head tilt above a certain angle may be associated with a "healthy" animal, while head tilt below a certain angle may be associated with an "unhealthy" animal. Further, the average time the head tilt is above/below a particular threshold may be used to determine the health state of the animal. It is recognized that any of the measured characteristics described previously herein may be utilized in a single variable context to determine the health state of an animal. In this regard, the controller 108 may identify an unhealthy animal, or a potentially unhealthy animal. In the event of an unhealthy, or a potentially unhealthy, the animal is identified and the controller 108 may notify a user via user devices 112a or 112b that the animal is unhealthy or potentially unhealthy.

In another embodiment, the database may correlate multiple characteristics to a particular health state. For example, the controller 108 may utilize the stored database to correlate multiple physiological and/or behavior characteristics to a particular health state of an animal. In this regard, the database may reflect a multi-variable relationship between the health state of an animal and two or more physiological and/or behavior characteristics. For example, the multi-variable database may be constructed to relate the health state of one or more animals to two or more of temperature, heart rate, head tilt, feeding frequency, amount of movement (e.g., steps) and etc. For instance, a first head tilt value, a first temperature value and a first feeding frequency value may be associated with a "healthy" animal, while a second head tilt value, a second temperature value and a second feeding frequency value may be associated with an "unhealthy" animal. It is recognized that any of the measured characteristics described previously herein may be utilized in a multi-variable context to determine the health state of an animal. Again, in the event an unhealthy, or a potentially unhealthy, animal is identified, the controller 108 may notify a user via user devices 112a or 112b that the animal is unhealthy or potentially unhealthy.

In another embodiment, an unhealthy animal is identified via a differential comparison of measured characteristics for a first animal to measured characteristics associated with one or more other members of the animal population. For example, one or more measured physiological and/or behavior characteristics for a first animal may be compared to one or more measured physiological and/or behavior characteristics for at least a second animal or an average of two or more animals. In this regard, outlier characteristics displayed by a given animal may be identified by directly comparing the measured characteristics of the given animal to the same type of measured characteristics for other members of the same population. This approach is particularly advantageous as it may serve to eliminate systematic errors and conditions, such as, but not limited to, weather, feeding conditions, watering conditions, events that may disrupt herd feeding patterns and the like. It is recognized herein that the animals may be statistically binned into like sub-sets for the purposes of comparison. For instance, animals may be limited to comparison with animals of the same or similar age or weight. In another instance, animals may be limited to comparison with animals of the same sex. In another instance, animals may be limited to comparison with animals located in the same spatial region of the general animal holding area at a particular time of the day (in order to eliminate systematic affects such as sunlight and etc.).

It is further recognized that the behavior may be averaged over a selected time period prior to comparison. In the event any one or more of the measured characteristics deviates (by a selected threshold) from that of the other animal(s), the controller 108 may notify a user that the deviant animal is unhealthy or potentially unhealthy.

In another embodiment, an unhealthy animal is identified by monitoring the one or more measured characteristics of the animal as a function of time and/or location. For example, one or more measured physiological and/or behavior characteristics for an animal may be monitored as a function of time. In this regard, physiological and/or behavior characteristics measured at a first time instance (or across a first time interval) may compared to one or more measured physiological and/or behavior characteristics at a second time instance (or across a second time interval) (and a third time instance, a fourth time instance and so on). In this regard, the controller 108 may identify an unhealthy animal, or a potentially unhealthy animal, by observing deviations in the animal's behavior as a function of time. In the event any one or more of the measured characteristics exceeds a selected threshold, the controller 108 may notify a user that the animal is unhealthy or potentially unhealthy. This approach is particularly healthy in cases where a given animal, while in a healthy state, displays physiological and/or behavioral characteristics that deviates from other members of the herd.

It is further noted that the controller 108 may identify an unhealthy animal using any combination of the analysis approaches set forth above. For example, an unhealthy animal may be identified through implementation of any of the following: a preloaded database, comparison to other members of the population and/or monitoring a single animal as a function of time or location.

In one embodiment, the controller 108 (or controllers) may receive instructions from a user device (e.g., user device 112a or user device 112b). In this regard, a user may select what comparisons he/she wants the controller 108 to perform. Then, the controller may transmit those results to the user. In another embodiment, the system 100 may include a mobile device separate from a first user device. In this regard, the results, or a sub-set of the results, may be delivered to another user remotely. For example, simplified data outputs may be transmitted to the additional user (e.g., smartphone or tablet user).

Figure 1K:
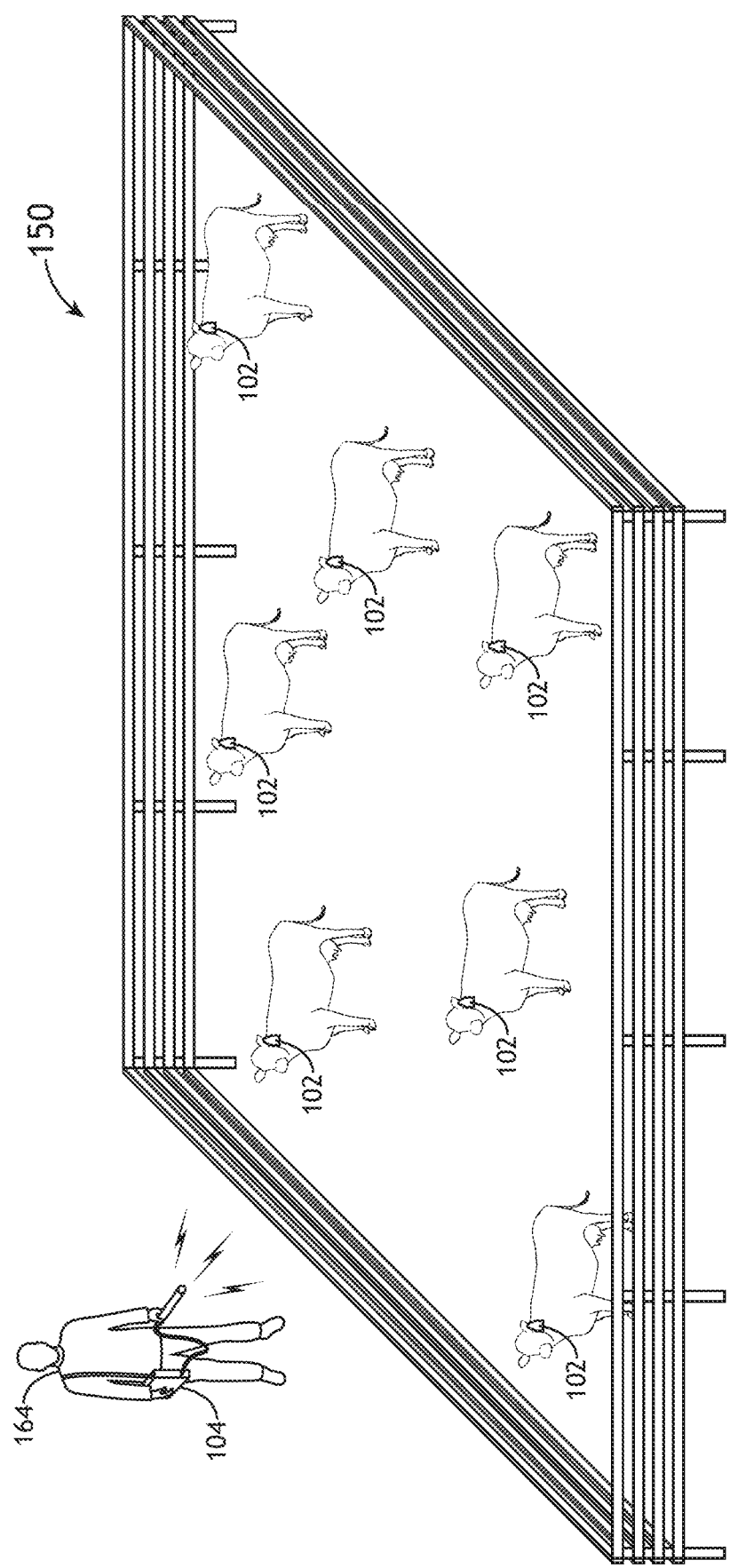
FIGS. 1K-1L illustrate a mobile concentrator, in accordance with one or more embodiments of the present disclosure.
Figure 1L:
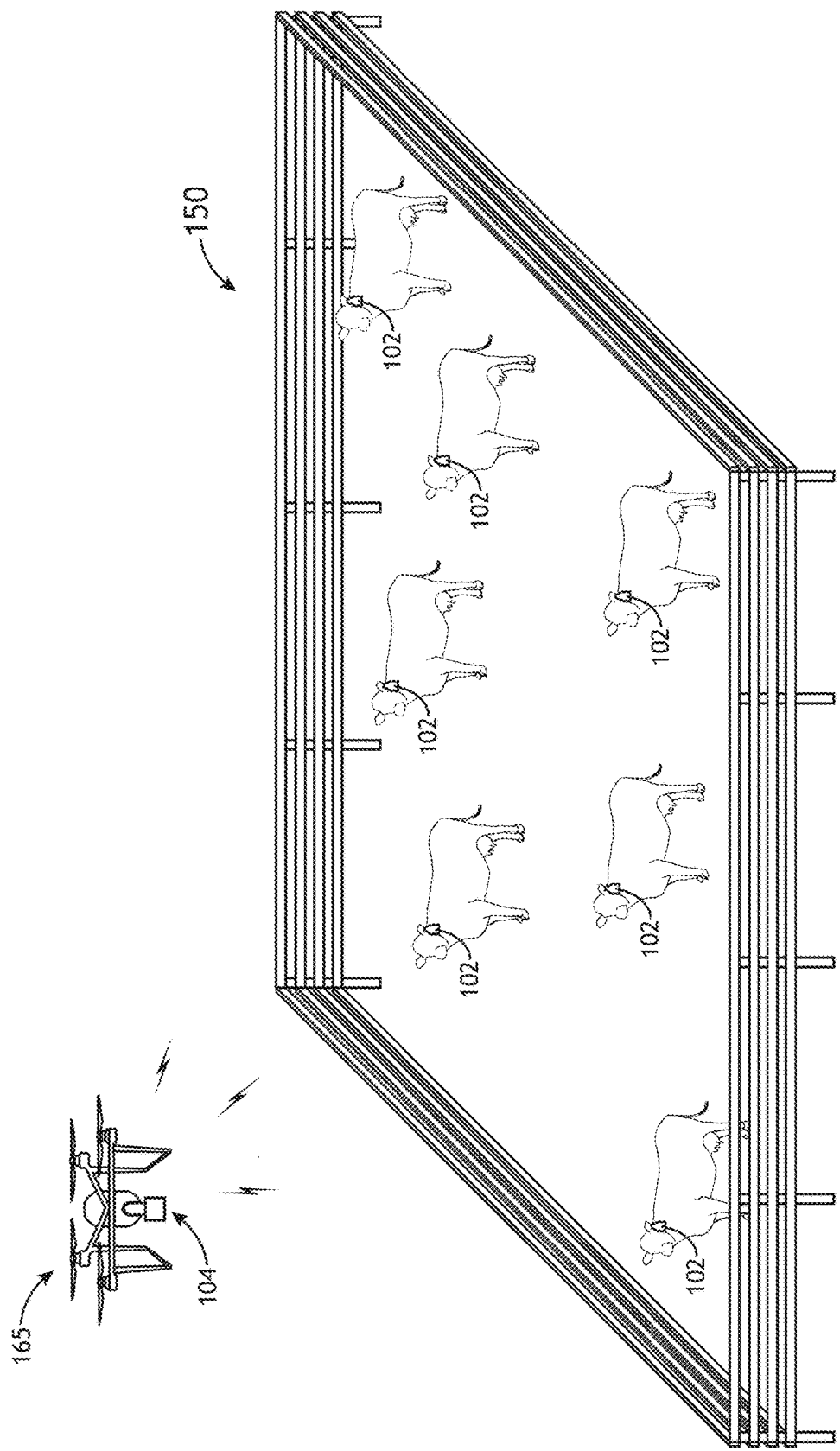

FIGS. 1K and 1L illustrate a mobile concentrator 104, in accordance with one or more embodiments of the present disclosure. In one embodiment, as shown in FIG. 1K, the concentrator 104 is user-carried. For example, a user 164 may carry the concentrator 104 and selectively interrogate the tag assemblies 102 of the various animals of an animal population 150. This embodiment may be particularly useful in the context where physiological and/or behavioral characteristic data are stored on board the tag assembly 102. In another embodiment, as shown in FIG. 1L, the concentrator is drone-mounted. For example, the concentrator 104 may be mounted to a drone 165. In this regard, the drone 165 may selectively interrogate the tag assemblies 102 of the various animals of the animal population. Such a configuration would allow for a single concentrator to service multiple feed lot pens.

It is further noted that the present disclosure is not limited to the above examples and is not limited to tracking physiological and/or behavioral characteristics of cattle. It is noted that the present disclosure may be extended to a wide variety of environments, such as, but not limited to tracking and predicting health states in pigs, horses, sheep, pets (e.g., dogs, cats and etc.), zoo animals and etc. Further, the present disclosure may further be used to track and/or predict health states in humans, such as children in a daycare, athletes on a sports team or patients in a hospital facility.

Referring again to FIGS. 1A-1D, it is noted that communication between a concentrator 104 and one or more tags 102 may include half-duplex and/or full-duplex communication systems. In one embodiment, a communication system between a tag 102 and a concentrator 104 includes a half-duplex communication system. In another embodiment, a communication system between a tag 102 and a concentrator 104 includes a Medium Access Control (MAC) layer. In another embodiment, the MAC is time slotted. In one embodiment, the communication data rate between a concentrator 104 and one or more tags 102 is between 1,000 and 100,0000 bits/sec. For example, the communication date rate may be, but it not limited to, 57,600 bits/sec, which provides a data period of approximately 6.6 milliseconds. It is noted herein that the data rate of 57,600 bits/sec is not intended as limiting and other data rates may be used within the scope of the present disclosure.

In one embodiment, the MAC includes a global data period of a selected length that defines the frequency of data collection. For example, the global data period may have a length of 3 seconds. It is noted herein that this data period is not limiting and that longer or shorter data periods may be used within the scope of the present disclosure. It is further noted that data need not be collected by a concentrator 104 during each data period; this configuration may be useful, for example, in order to manage power consumption and extend battery life. In one embodiment, the global data period is divided into a selected number of slots. For example, the global data period may be divided into 120 time slots. In another embodiment, the width of each time slot within a data packet is a selected time period. For example, the time period may be 25 milliseconds. In another embodiment, the 120 time slots are further divided into 1 beacon time slot, 9 provisioning time slots, and 110 data collection time slots. In this way, data from tags 102 may be collected from a single concentrator 104. It is noted herein that the specific values of the width of the time slots and the number of time slots within a global data period is not limiting. It is further noted that choosing a time slot width larger than the data rate period (e.g. a 25 millisecond time slot width in relation to a data period of 6.6 milliseconds) enables time guard banding. In this regard, the local clocks of a concentrator 104 and one or more tags 102 may run fast or slow relative to each other with minimal synchronization error.

In another embodiment, a data packet transmitted during a global data period comprises 48 bytes and consists of the following components: a preamble of 8 bytes, a sync word of 4 bytes, a payload size of 1 byte, a payload of up to 33 bytes, and a cyclic redundancy check (CRC) of 2 bytes. It is noted herein that the contents and structure of the data packet are not limiting and other data packets with different contents and/or structure may be used within the scope of the present disclosure.

It is noted herein that the purpose of a beacon signal is to provide a mechanism for synchronizing the concentrator 104 with one or more tags 102 such that each tag 102 may properly transmit data in a designated time slot. In one embodiment, the one or more processors 116 of a tag (e.g. 102a) direct the data radio (e.g. the communication circuitry 120) to turn on only when a beacon signal is expected in order to conserve power. If a beacon is received, the timing circuitry (not shown) of the tag 102 is synchronized to the beacon signal such that the timing of the remaining time slots are synchronized between the collector 104 and the tag 102.

Figure 1M:
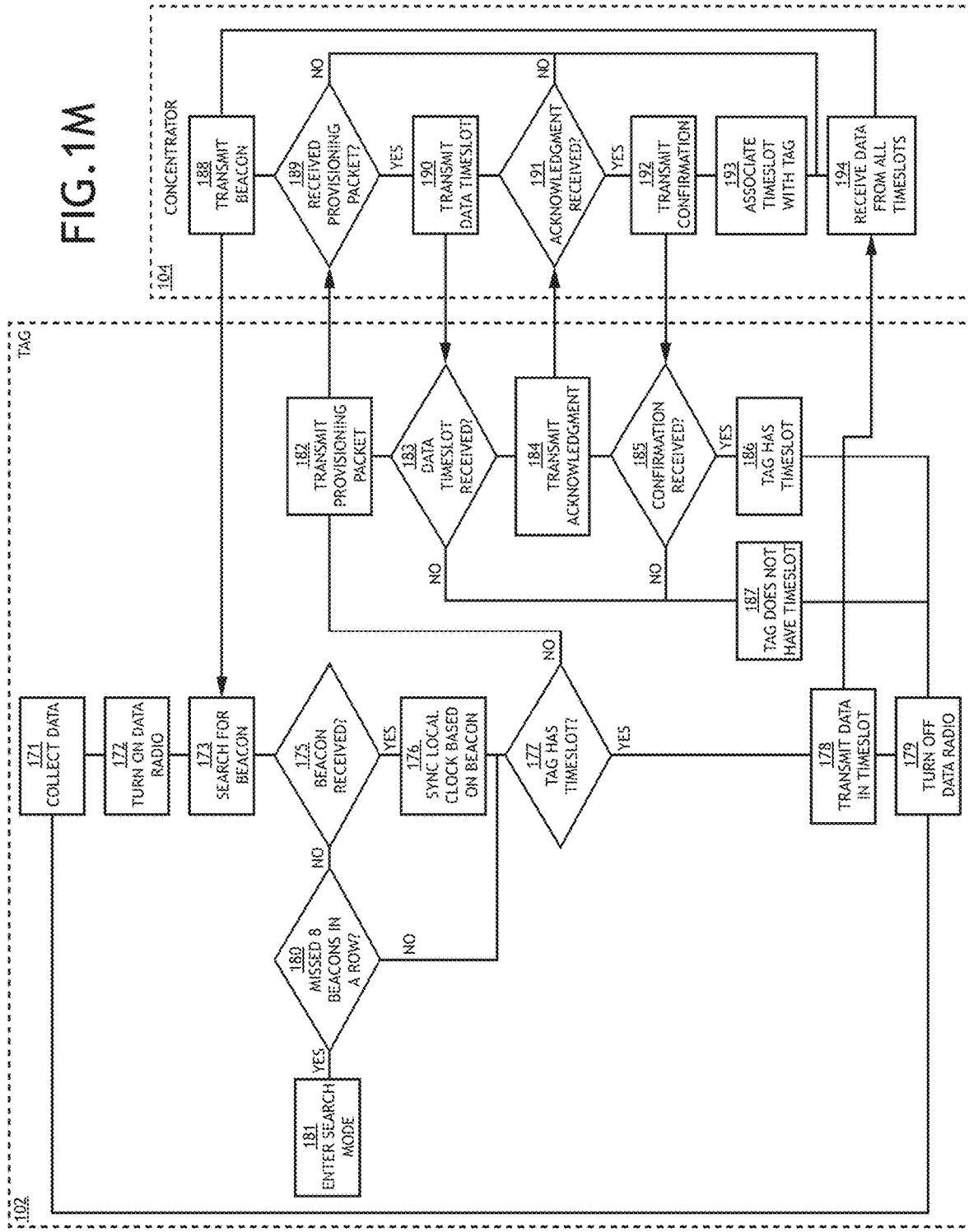
FIG. 1M illustrates a flow diagram depicting a communication protocol between a tag and a concentrator, in accordance with one or more embodiments of the present disclosure

FIG. 1M illustrates a flow diagram depicting a communication protocol between a tag 102 and a concentrator 104, in accordance with one or more embodiments of the present disclosure.

In one embodiment, the logical flow the tag 102 and the logical flow of the concentrator 104 are independent, which is to say that each element contains separate timing circuitry (not shown).

In one embodiment, a tag 102 collects data 171 from one or more sensors 114. In one embodiment, the one or more processors 116 of a tag (e.g. 102a) direct the data radio (e.g. the communication circuitry 126) to turn on 172 only when a beacon signal is expected to be transmitted from the concentrator 104 in order to conserve power. The tag 102 will then search 173 for a beacon signal. If a beacon signal is not found 175, the tag 102 will continue to search 180 for a beacon signal for up to 8 global data periods (or any other selected number of global data periods). If no beacon signal is found 175 within 8 global data periods 180, the tag 102 enters a search mode 181. In the search mode, the one or more processors 116 direct the data radio to toggle on and off every 4 seconds (or any other selected time period) such that the tag 102 searches for a beacon signal when the data radio is on. It is noted herein that one purpose of the search mode is to conserve power while searching for a beacon signal. It is further noted herein that the specific values of 8 global data periods required to enter the search mode and a toggle time of 4 seconds are not intended to be limiting and are provided merely for illustrative purposes.

In another embodiment, if a beacon signal is received 175 by a tag 102, the local clock will be synchronized 176 to the beacon signal. In one embodiment, if a tag 102 does not have an assigned timeslot 177, then a provisioning packet is transmitted 182 to the concentrator 104 in one of the provisioning timeslots. It is noted herein that the specific provisioning time slot may be chosen either at random or may be fixed for a given tag 102. If the concentrator 104 receives a provisioning packet 189 in one of the provisioning time slots, the concentrator 104 transmits a data timeslot to the tag 102. If the tag 102 properly receives the transmitted data timeslot, the tag 102 transmits an acknowledgement signal 184. If the acknowledgement signal is properly received 191 by the concentrator 104, a final confirmation signal is transmitted 192 to the tag 102 in order to confirm 185 the timeslot for the tag 102. The concentrator 104 then associates 19 the allotted time slot with the tag 102. It is noted herein that the association of a timeslot with a tag 102 may be accomplished using any method known in the art including, but not limited to, storage of the serial number of the tag 102 or the use of another identification number. If any of the steps associated with the assignment of a timeslot to a tag 102 fails (e.g., steps 182, 189, 190, 183, 184, 191, 192, or 185), the tag 102 does not have an assigned timeslot 232 and the tag will transmit a provisioning packet 182 on the next global data period. It is noted herein that the steps associated with the assignment of a timeslot to a tag 102 (e.g., steps 182, 189, 190, 183, 184, 191, 192, or 185) are not intended to be limiting. By way of non-limiting example, any of steps 182, 189, 190, 183, 184, 191, 192, or 185 may be omitted. Alternatively, by way of non-limiting example, additional communication signals (not shown) may be utilized to ensure proper assignment of a timeslot to a tag 102.

In another embodiment, if a tag 102 has an assigned timeslot 177, the tag 102 transmits health data 178 to the concentrator 104 during the appropriate timeslot. The one or more processors 116 of the tag 102 then direct the data radio to turn off 179 for the remainder of the global data period.

During this time, the concentrator 104 receives data from all timeslots 194. At the start of the next data period, the concentrator repeats the process, beginning with the transmission of a beacon signal 188. It is noted herein that the tag may monitor health data using the one or more sensors 114 continuously throughout the communication cycle.

It is noted herein that if a concentrator 104 loses a listing of assigned time slots associated with one or more tags 102 (e.g., upon reboot), the one or more tags 102 may continue to send data during a previously assigned time slot. The concentrator 104 will then rebuild a listing of assigned time slots associated with the one or more tags 102 according to order of received data in the data time slots. It is further noted that this procedure may be carried out in order to prevent all of the one or more tags 102 from simultaneously transmitting provisioning packets 182, which may lead to assignment errors.

Figure 2A:
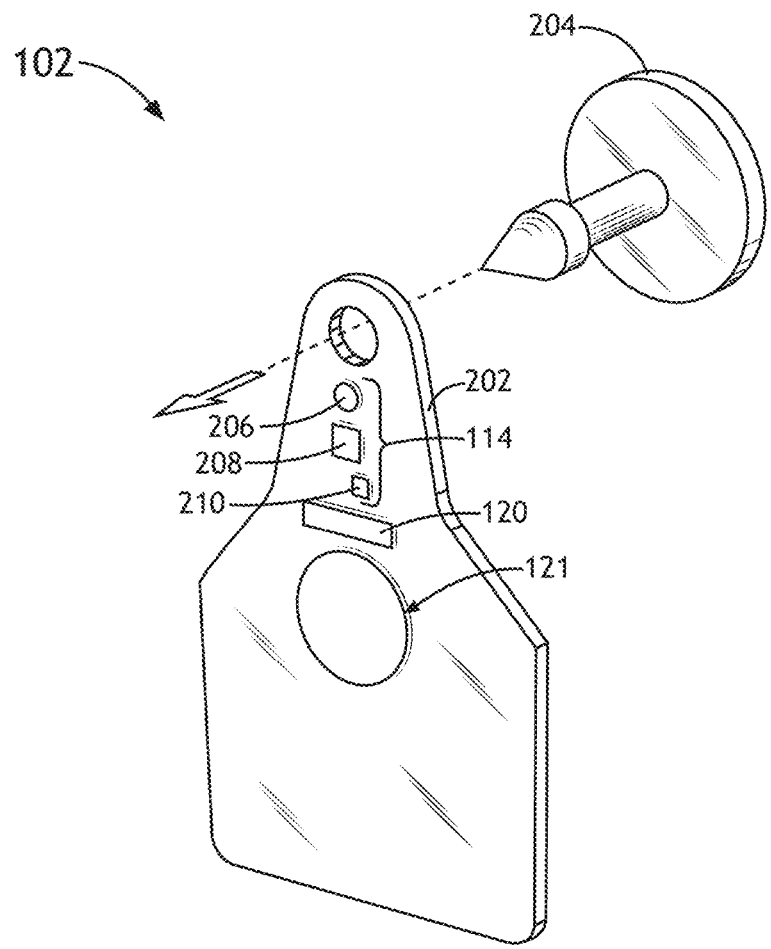
FIGS. 2A-2C illustrate a series of schematic views of a tag assembly, in accordance with one or more embodiments of the present disclosure.
Figure 2B:
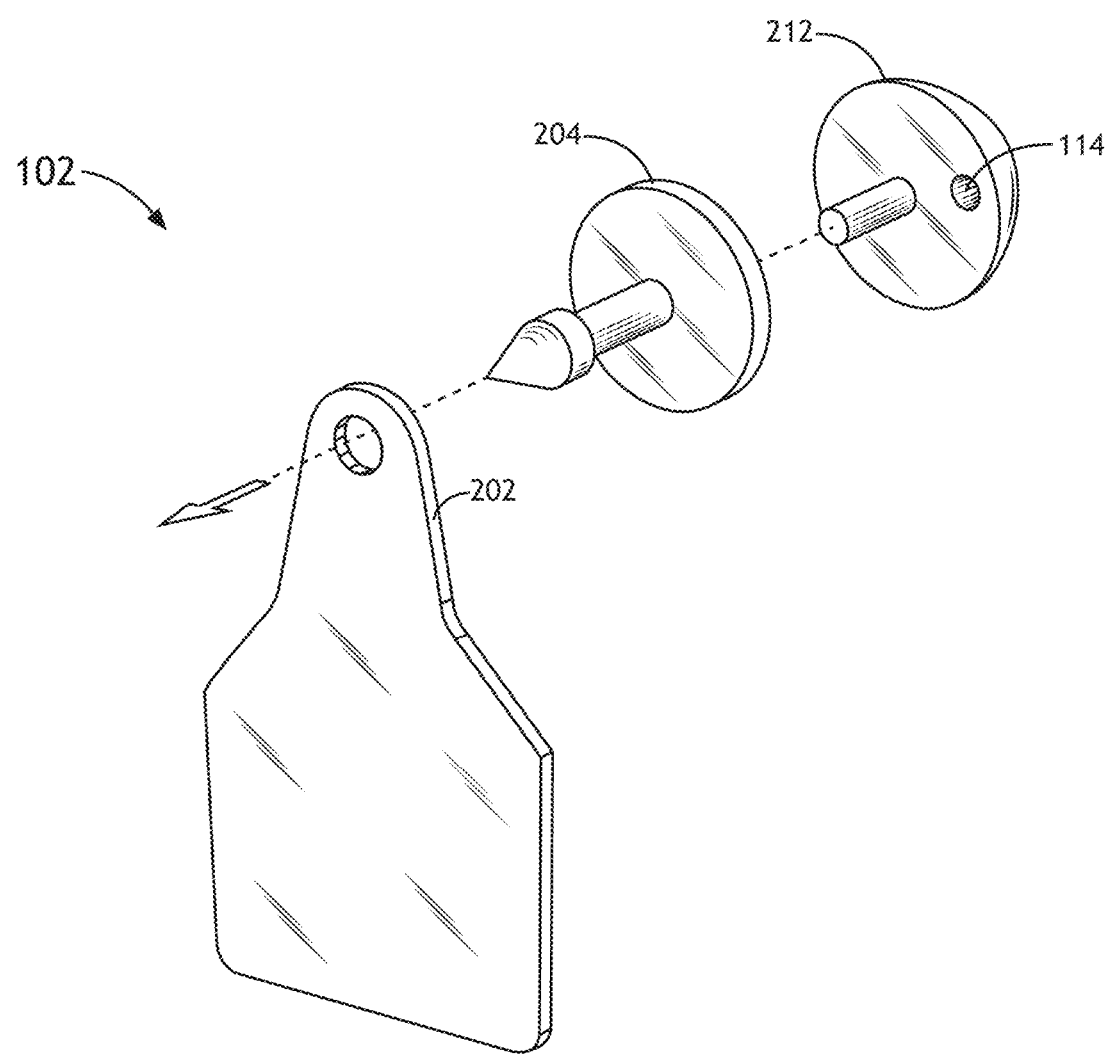
Figure 2C:
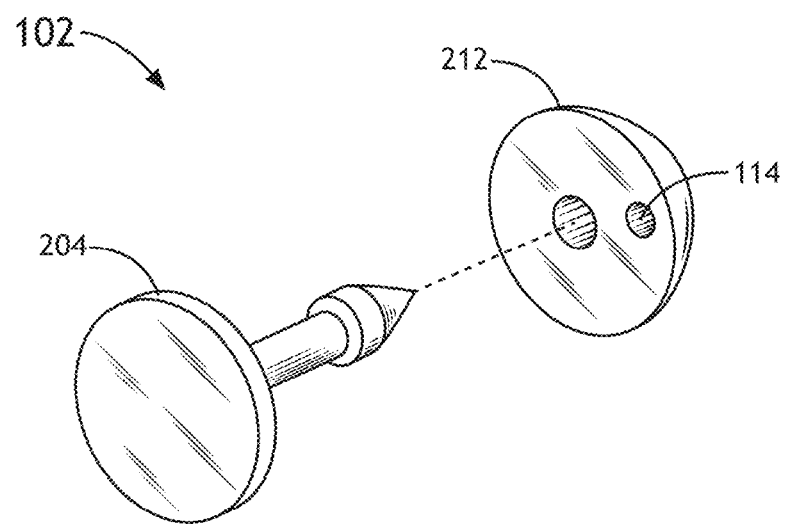

FIGS. 2A-2C illustrate a series of schematic views of tag assembly 102, in accordance with one or more embodiments of the present disclosure. Referring now to FIG. 2A, the tag assembly 102 may include a tag body 202. It is recognized herein that the tag body 202 may take on the general shape of passive ear tags known in the art. However, the tag body 202 of the present disclosure may be further functionalized with the components of the tag assembly 102, described previously herein. For example, as shown in FIG. 2A, the components of the tag assembly 102 may be disposed on one or more surfaces of the tag body 202 or encased within the outer surfaces of the tag body. In one embodiment, one or more sensors 114 are disposed on a first surface (e.g., front surface in FIG. 2A) of the tag body 202. The one or more sensors 114 may include any of the sensors described throughout the present disclosure.

In one embodiment, the one or more sensors 114 may include one or more temperature probes 206 (e.g., thermopile, IR sensor, RTD and the like). The one or more temperature probe 206 may be positioned on the tag body 202 such that it resides in close proximity with a portion of the tagged animal so that temperature measurements are satisfactorily accurate.

In another embodiment, the one or more sensors 114 may include one or more accelerometers 208 (e.g., three-axis accelerometer). In another embodiment, the one or more sensors 114 may include one or more magnetometers 210. In another embodiment, the one or more sensors 114 may include a IMU.

In another embodiment, the communication circuitry 120 of the tag assembly 102 may be disposed on a first surface (e.g., front surface in FIG. 2A) of the tag body 202. The communication circuitry 120 may include any communication circuitry known in the art of mobile communication. For example, the communication circuitry 120 may include, but is not limited to, a RF module (e.g., LEBT module). In another embodiment, the one or more batteries 121 of the tag assembly 102 may be disposed on the first surface (e.g., front surface in FIG. 2A) of the tag body 202.

It is further noted that the arrangement of the sensors 114, communication circuitry 120 and battery 121 is provided merely for illustrative purposes. It is recognized that the components may be arranged in any number of configurations. For example, a portion of the components may be disposed on a first surface of the tag body, while a second portion of the components may be disposed on a second surface of the tag body 202.

In another embodiment, the tag body 202 of the tag assembly 102 may be secured to a portion of the animal (e.g., ear of the animal) using the tag connector 204. In another embodiment, as shown in FIG. 2B, one or more sensors 114, communication circuitry and/or the battery 121 may be disposed on an independent sensor unit 212. In one embodiment, the sensor unit 212 may be coupled to the backside portion of the tag connector 204.

In another embodiment, the tag assembly 102 need not include the tag body 202. For example, as shown in FIG. 2C, the tag assembly 102 includes a sensor unit 212, which may be coupled directly to a portion of the animal (e.g., ear) using the connector 204. Again, one or more sensors 114, communication circuitry and/or the battery 121 may be disposed on an independent sensor unit 212. Such a configuration may be particularly advantageous when close contact between one or more of the sensors (e.g., temperature probe) and an ear portion of the animal is desired. As shown in FIG. 2C, direction contact can be made between the sensor 114 (e.g., temperature probe) of the sensor unit 212 and a portion of the ear of the animal.

Figure 2D:
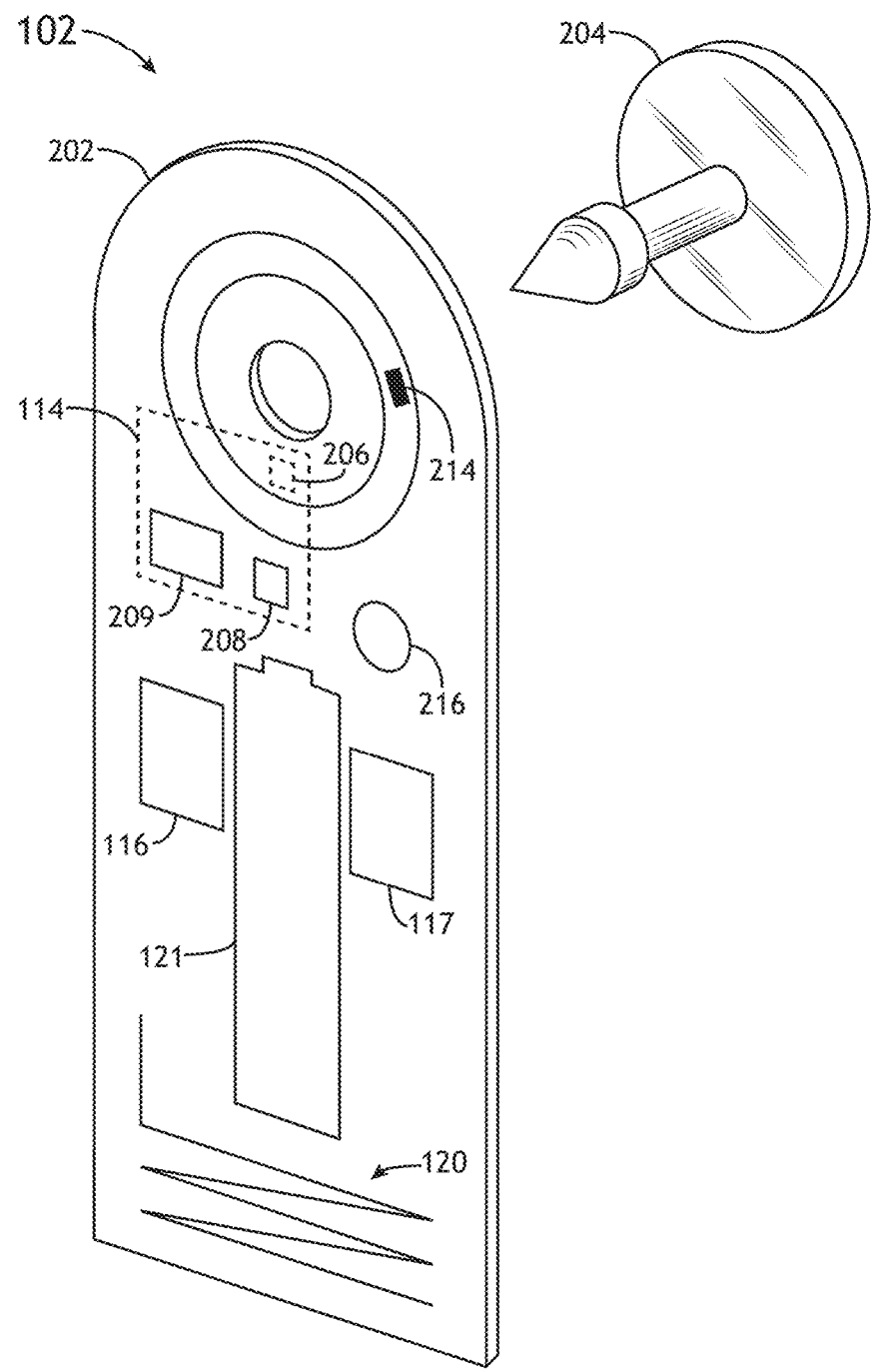
FIG. 2D illustrates a schematic view of a tag assembly, in accordance with one or more additional embodiments of the present disclosure.

FIG. 2D illustrates a schematic view of tag assembly 102, in accordance with one or more additional embodiments of the present disclosure. In this embodiment, the tag assembly 102 includes an elongated tag body 202 that when attached to an ear of an animal with the tag connector 204 may hang from the ear of the animal. For example, the ear of the animal (not shown in FIG. 2D) may be situated between the tag body 202 an the base of the ear connector 204 once the tag connector 204 is pushed through the ear of the animal and coupled to the receiving hole of the tag body 202.

In this embodiment, one or more sensors 114 are disposed on one or more surfaces of the tag body or within (all or a portion) of the volume of the tag body. For instance, the various sensors 114 may be molded within a plastic tag body. In another embodiment, a portion of the one or more sensors may be exposed in order to enhance measurements of one or more parameters.

The one or more sensors 114, as discussed previously herein, may include any sensor technology known in the art for measuring physiological and/or behavioral parameters. For example, the one or more sensors 114 may include, but are not limited to, a temperature sensor (e.g., IR temperature sensor, thermocouple, thermistor and the like), a heart rate monitor (e.g., optical heart monitor), an accelerometer, a magnetometer, a gyroscope, an inertial measurement unit, a location sensor, a chemical sensor and the like. In the embodiment depicted in FIG. 2D, the one or more sensors 114 include a temperature sensor 206, an accelerometer 208, and a gyroscope 209. It is noted that the tag assembly of FIG. 2D is not limited to this set of sensors, which are depicted merely for illustrative purposes. Any of the various sensor technologies described throughout the present disclosure may be implemented in the context of the tag 102 of FIG. 2D.

In the case of the temperature sensor 206, the temperature sensor 206 may be integrated into the tag body 202 of the tag 102 such that it is exposed at the surface of the tag facing the connect 204. Such a configuration provides for adequate contact to the animal's ear (in the case a thermistor or thermocouple bases temperature sensor) and/or line of sight (in the case of an IR-based temperature sensor).

In another embodiment, the tag 102 may be equipped with one or more processors 116 and memory 117. In another embodiment, the tag 102 may be equipped with communication circuitry 120 (e.g., antenna) for communicating with the concentrator 104.

In one embodiment, the one or more sensors 114 sensors may collect data associated with the animal's movements, activity, and/or temperature. Data may be stored in memory 117. In another embodiment, the data may be processed or pre-process on the tag 102 via the one or more processors 116. In another embodiment, the raw data or processed/pre-process data is transmitted to from the tag 102 to the concentrator 104 via the communication circuitry 120. As discussed previously herein, the concentrator 104, or base station, may be communicatively coupled to a secure cloud (i.e., server), where the various data results can be analyzed and decisions can be made about the state of the tagged animal. An indicator indicative of a particular decision related to the tagged animal may then be transmitted to one or more user devise 110a-110c so that that user may take action in regard to the animal.

In another embodiment, the tag 102 includes one or more indicators. For example, the tag 102 may include one or more LEDs 216. In this regard, one or more signals indicative of the state of the tagged animal may be transmitted back to the tag 102 on the given animal from the concentrator 104. In one embodiment, based on the state of health of the animal, the LED may be activated. For example, the tag 102 may be programmed to activate the LED when one or more parameters falls below a selected threshold. In this regard, the LED may be activated when the animal is in need of attention. By way of another example, the LED may be activated when the animal is deemed in good health. Alternatively, different colors of LED may be used for different health states (e.g., green for satisfactory health condition, red for less-than-satisfactory health condition).

In another embodiment, feedback from the concentrator 104/controller 108 to the tag 102 may update the sampling conditions of the given tag 102. For example, in a situation where the given animal is in a poor or stressed health state, the concentrator 104/controller 108 may direct the tag 102 to increase the sampling rate or change the parameters that are sampled.

In another embodiment, diagnostic decisions may be made by users/manager themselves based on the measured parameters, such as, but not limited to, movement, activity, and/or temperature.

In another embodiment, the tag 102 is equipped with one or more RFID devices. In this regard, a particular animal may be identified utilizing an RFID reader. For example, the RFID may include, but is not limited to, a low frequency passive RFID device. By way of another example, the RFID may include, but is not limited to, an active RFID device.

In another embodiment, the tag 102 may be equipped with one or more communication lines (not shown) for communicatively connecting the various components of the tag 102 to each other and/or to the communication circuitry 120.

In another embodiment, the tag 102 includes one or more power supplies. The one or more power supplies may include one or more batteries 121. The one or more batteries 121 may include one or more rechargeable batteries. In one embodiment, one or more rechargeable batteries may be sealed within the tag 102 and recharged via recharging circuitry. In one embodiment, the recharging circuitry may include conductive charging circuitry. In this embodiment, the tag 102 may include an electrical charging port, which may be electrically coupled to an external charger for power transfer. In another embodiment, the recharging circuitry may include inductive charging circuitry. In this embodiment, the tag 102 may include one or more inductive coils, which may be inductively coupled to one or more external inductive coils for power transfer.

While the battery 121 of FIG. 2D is depicted as a commercially available battery, this configuration should not be interpreted as a limitation on the scope of the present disclosure. It is recognized herein that the battery 121 may include a customized battery formed to have a shape that is contoured to the shape of the particular tag. For example, the battery 121 may take on a flat planar shape so as to fit to the profile of the tag depicted in FIG. 2D.

In another embodiment, the tag 102 may be equipped with one or more power lines (not shown) for electrically connecting the various components of the tag 102 to the power supply 121.

Figure 3A:
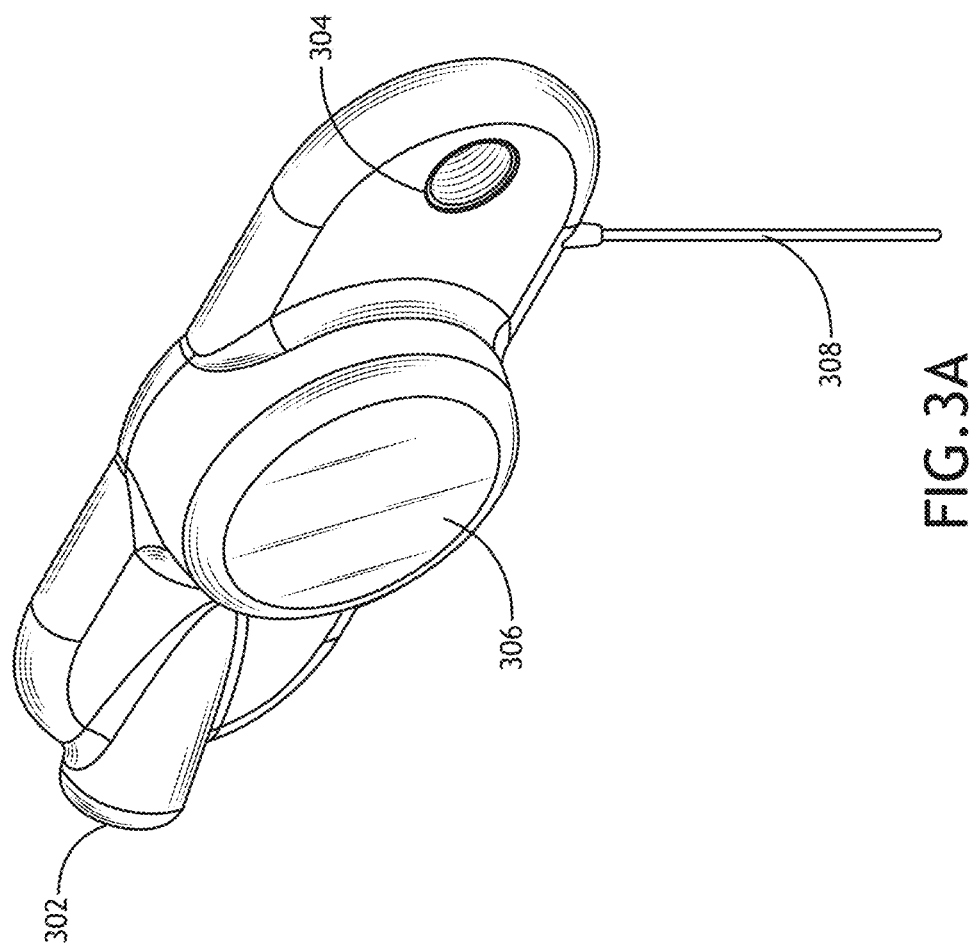
FIGS. 3A-3D illustrate schematic view of a tag assembly, in accordance with one or more embodiments of the present disclosure.
Figure 3B:
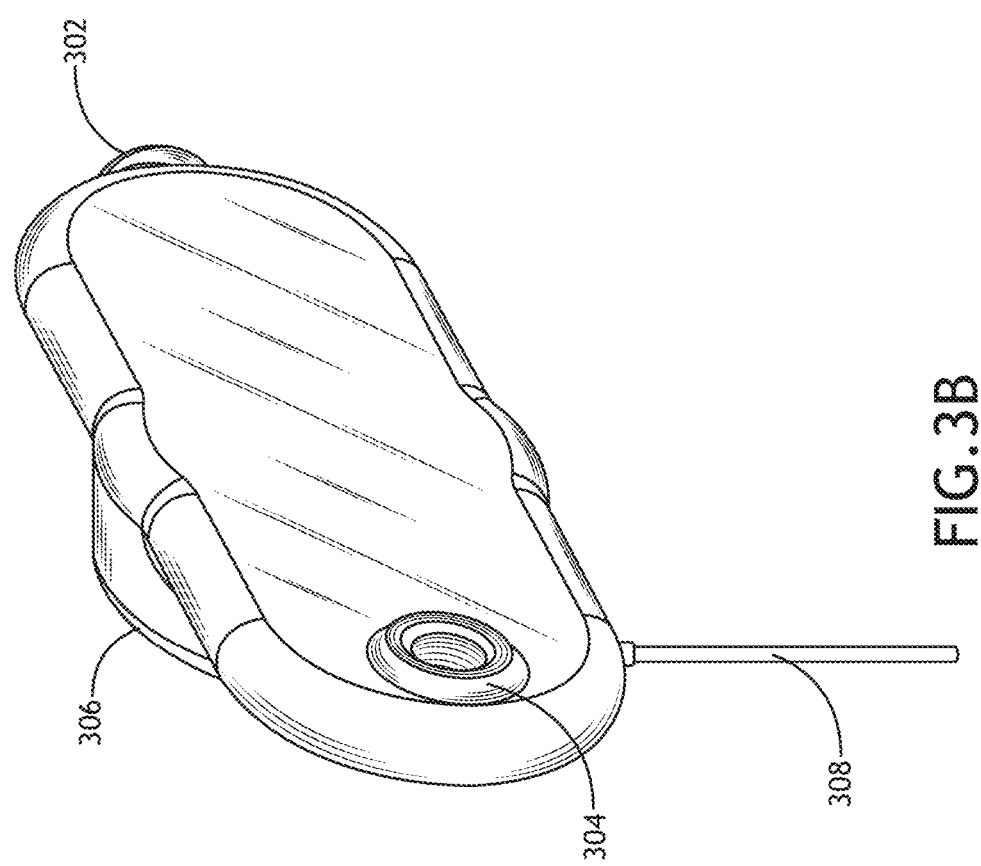
Figure 3C:
Figure 3D:
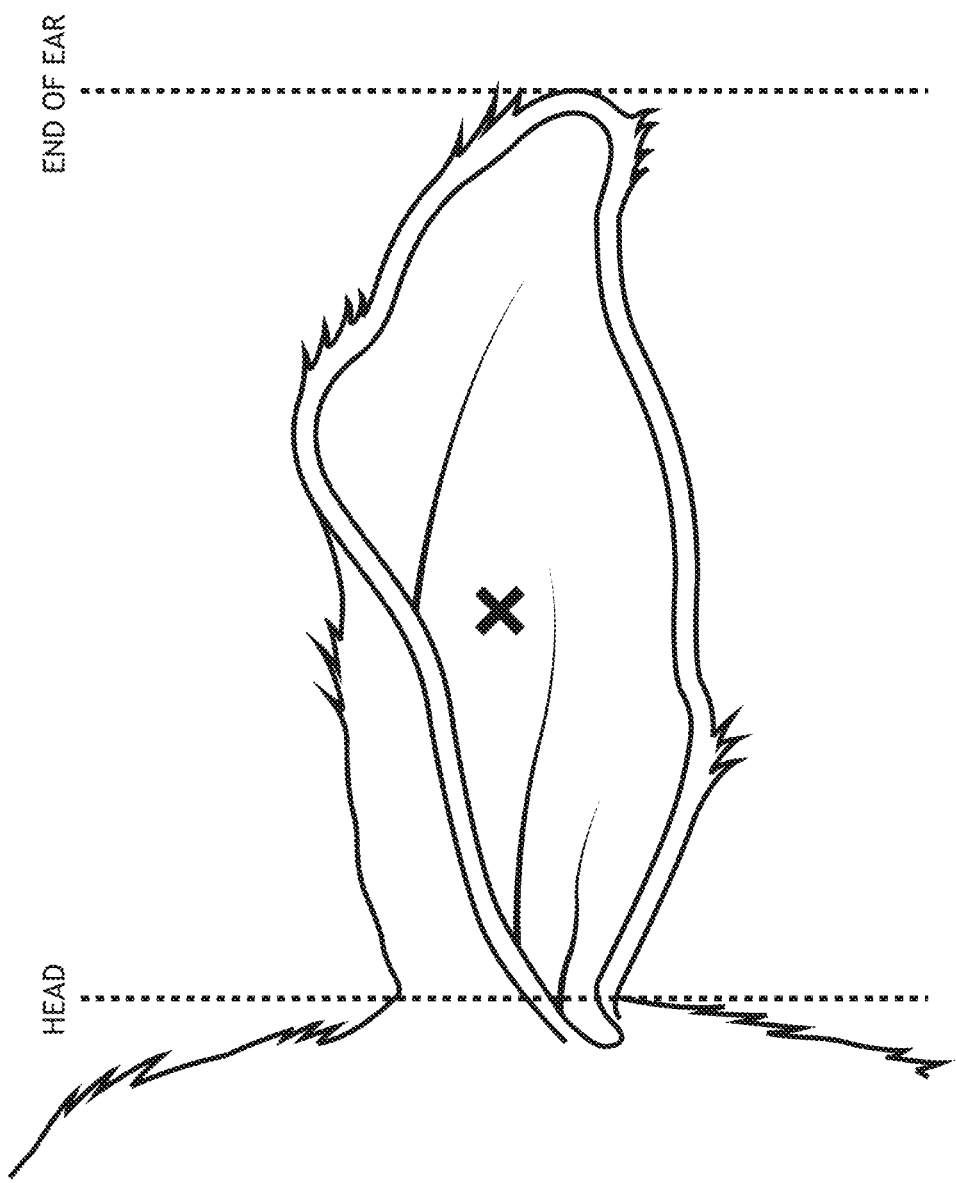

FIGS. 3A-3D illustrate a tag assembly 300, in accordance with an additional embodiment of the present disclosure. In one embodiment, the tag assembly 300 is shaped and sized so as to fit within an ear of a cow. As shown in FIGS. 3A-3B, the tag assembly 300 includes a sensor 302 (e.g., temperature sensor (e.g., thermopile)). It is noted that any of the sensory devices described previously herein may be integrated into the structure of the tag assembly 300. In addition, the tag assembly 300 includes an attachment pass through 304 (or hole) for securing the tag assembly 300 to the animal's ear. Further, the tag assembly 300 includes a battery 306. In addition, the tag assembly 300 includes an antenna 308. FIG. 3C depicts the tag assembly 300 as attached to the ear of the animal (e.g., cow). As shown in FIGS. 3C-3D, the tag assembly 300 is suitable for attaching to the ear at a position (marked by "X") that is approximately between the head of the cow and the end of the ear. In addition, the tag assembly 300 may be placed between the 2nd and 3rd cartilage ridges (as shown in FIG. 3D, at the inside edge of the middle third of the ear). In this regard, the tag assembly may be placed on the inner part of the middle 3rd of the ear with the antenna end of the tag assembly 300 situated at the outer edge of the ear. This will allow the tag to sit in the groove between the cartilage ridges, which will aid in maintaining a more constant temperature as well as allowing a sensor to measure the temperature of the inner ear canal itself.

Figure 4A:
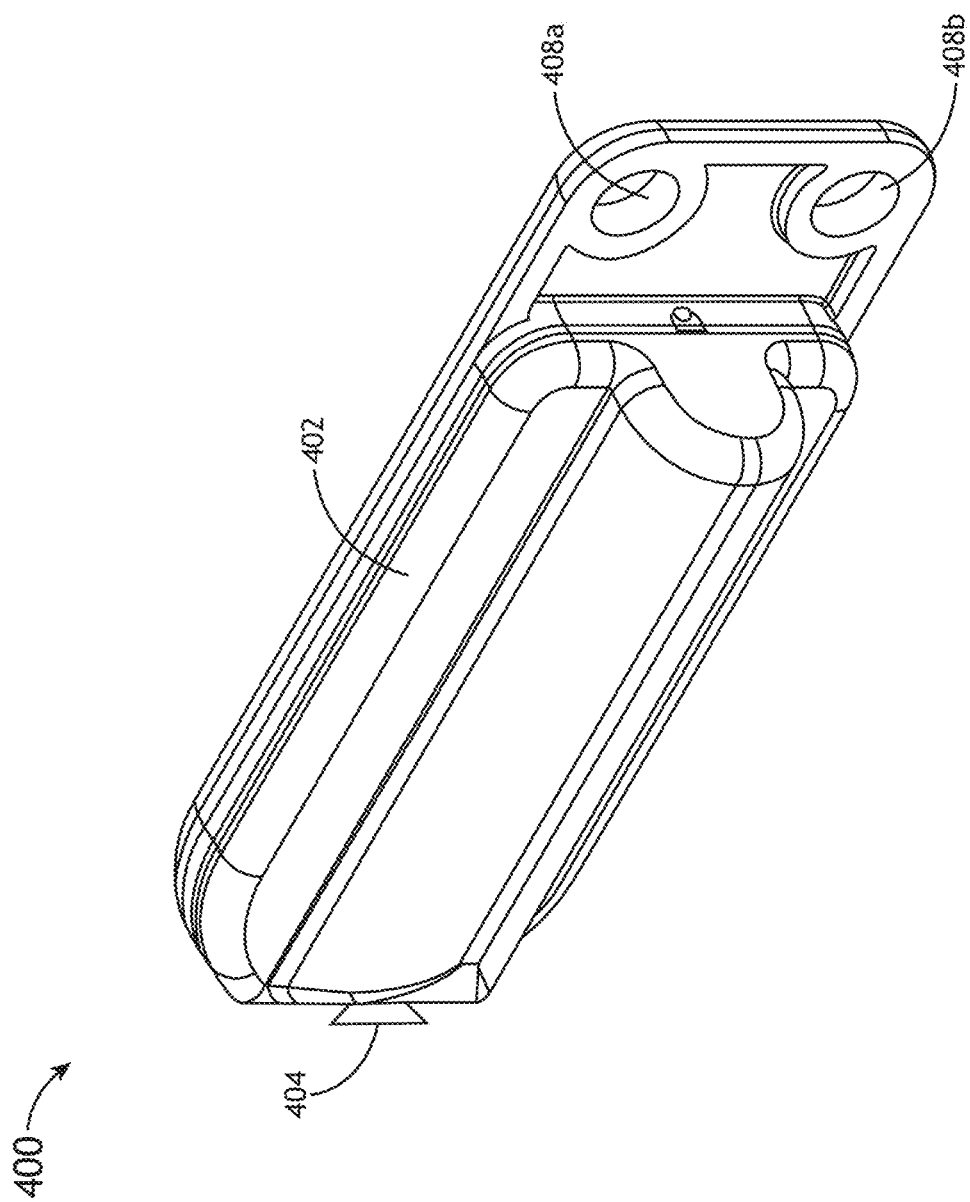
FIGS. 4A-4C illustrate schematic views of a tag assembly, in accordance with one or more embodiments of the present disclosure.
Figure 4B:
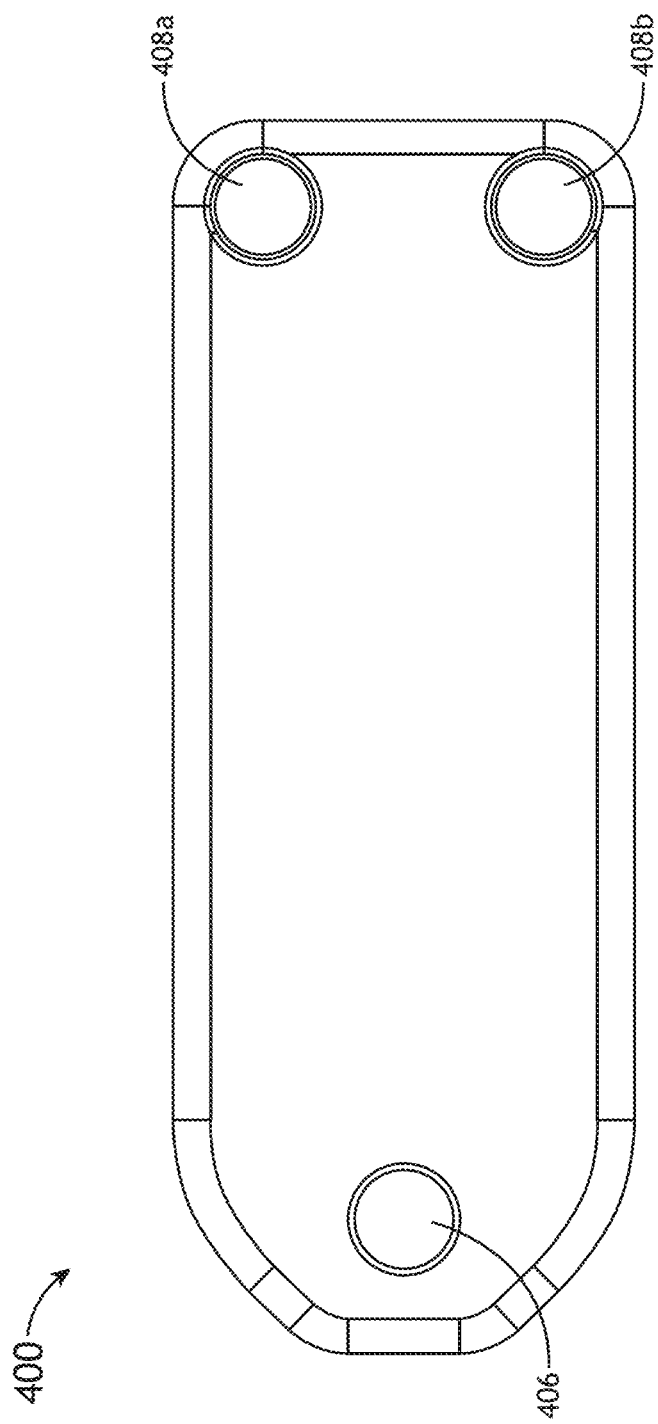
Figure 4C:
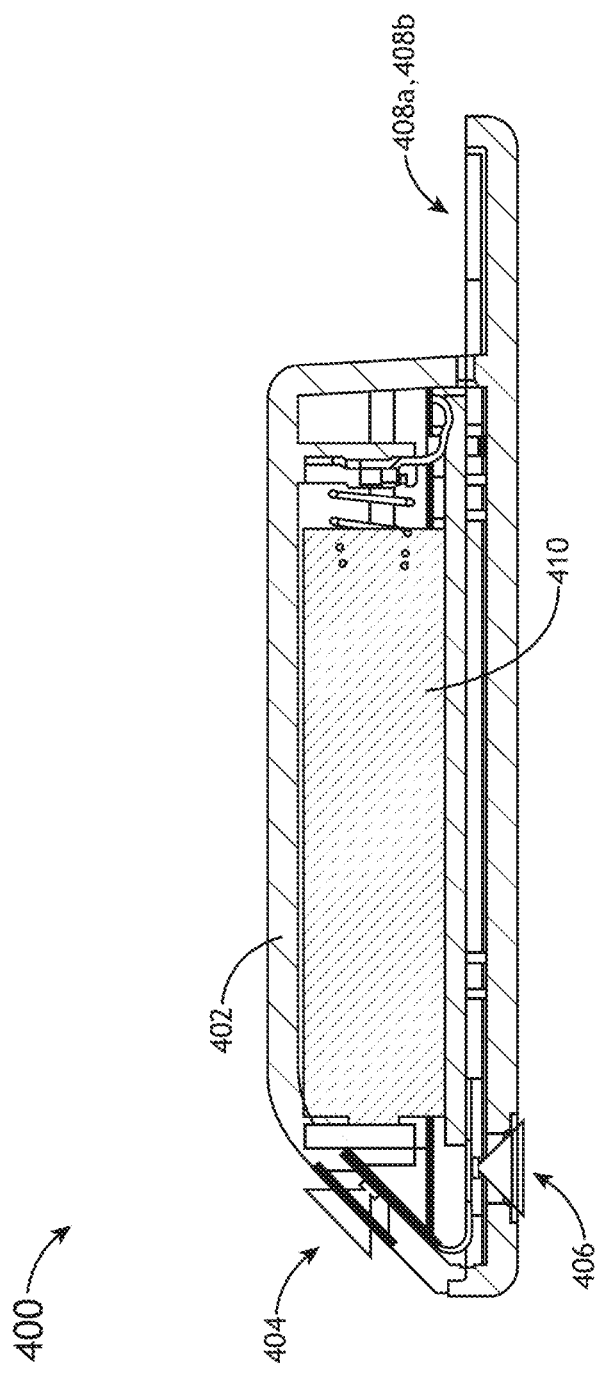

FIGS. 4A-4C illustrate multiple views of a tag assembly 400, in accordance with one embodiment of the present disclosure. FIG. 4A illustrates an angled top view of the tag assembly 400. FIG. 4B illustrates a bottom view of the tag assembly 400. FIG. 4C illustrates a cross-sectional view of tag assembly 400.

In one embodiment, the tag body 402 may be secured to a portion of the animal (e.g., ear of the animal) via one or more connection pass-throughs (or holes) 408a, 408b. It is noted that the number of connector pass-throughs of the tag assembly 400 defines the number of attachment points to the animal. It is further noted that the number and orientation of the one or more contact points may influence the stability of the tag assembly 400 on the animal. For example, the use of two or more punches aids in reducing rotation of the tag assembly 400 out of the animal's ear.

In another embodiment, the tag assembly 400 includes a first sensor 404 (e.g., first temperature sensor) and a second sensor 406 (e.g., second temperature sensor). For example, the first sensor 404 may be used to measure the ear canal temperature of the animal, while the second sensor 406 may be used to measure the temperature of the face of the ear of the animal. It is noted herein that the tag assembly 400 is not limited to the sensor configuration described above. Rather, the sensor configuration is provided merely for illustrative purposes. It is recognized herein that the two or more sensors of the tag assembly 400 may include any number and any type of sensor known in the art, including those described previously herein. In another embodiment, the tag assembly 400 includes a battery 410 (e.g., replaceable battery). It is further noted that the various components and embodiments described previously herein should be interpreted to extend to the embodiments of FIGS. 4A-4C unless otherwise noted.

Figure 5A:
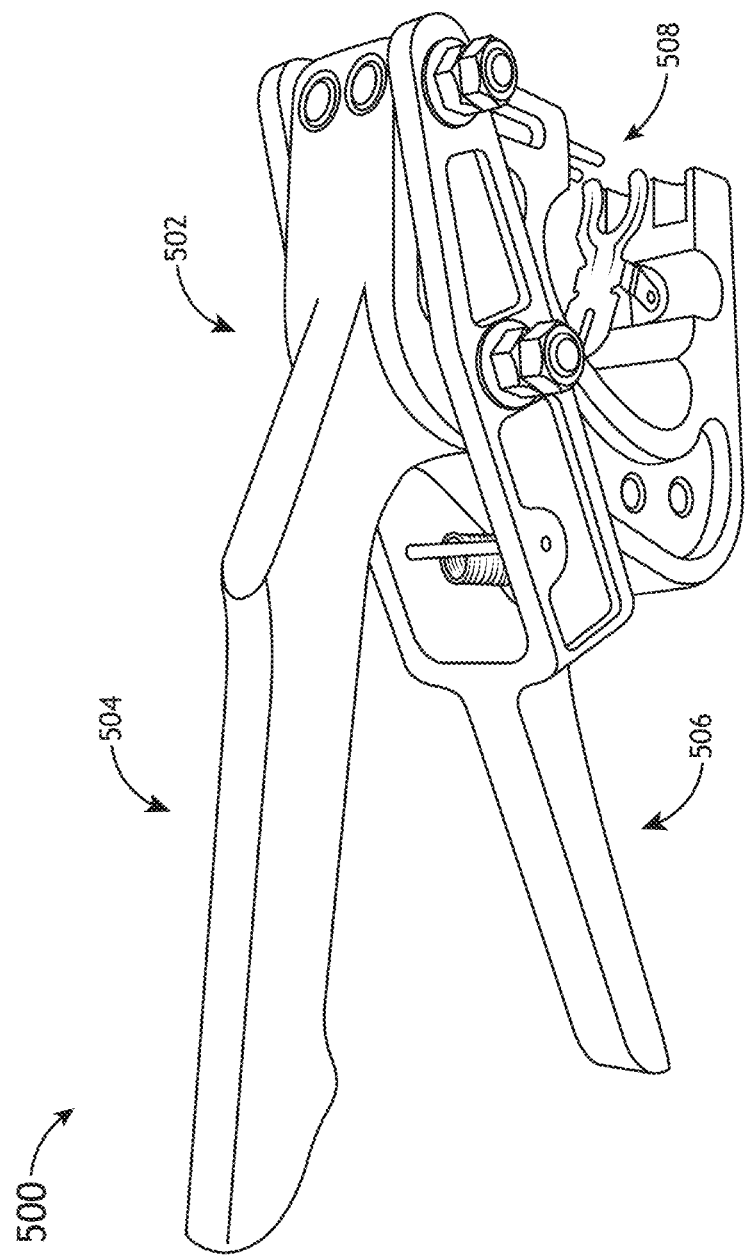
FIGS. 5A and 5B illustrate a crimper tool for attaching a tag assembly to an animal, in accordance with one or more embodiments of the present disclosure.
Figure 5B:
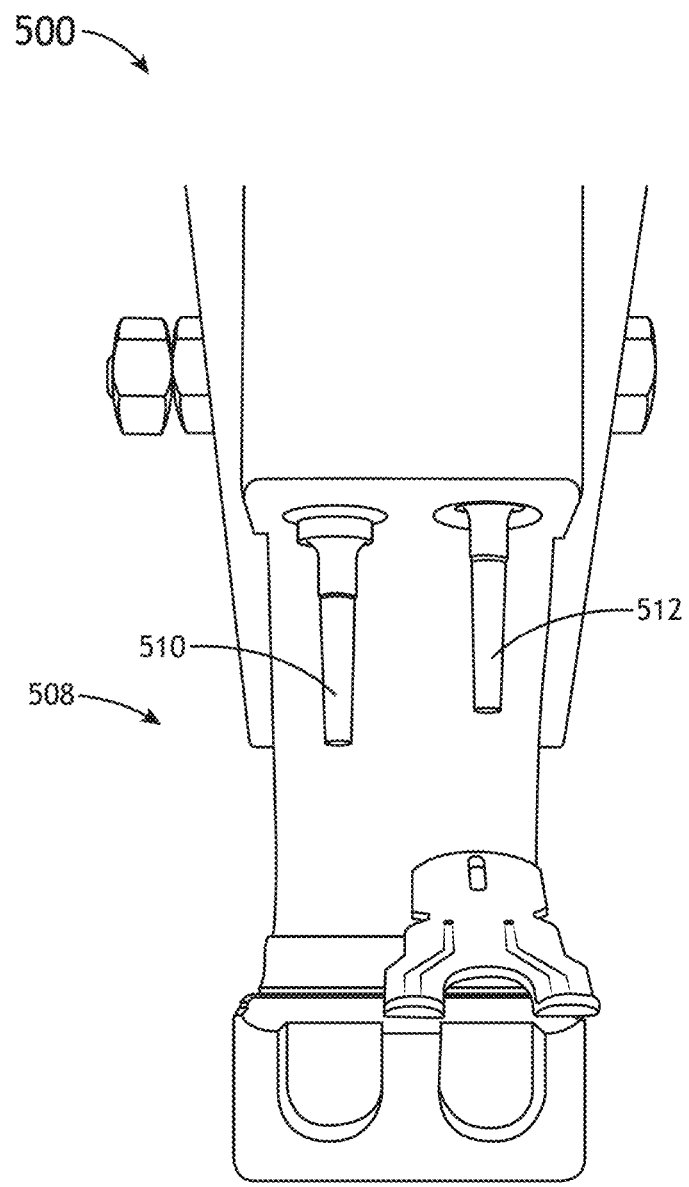

FIGS. 5A and 5B illustrate a crimper tool 500 for attaching a tag assembly to an animal, in accordance with one or more embodiments of the present disclosure. In one embodiment, the crimper tool 500 is structured so as to connect the tag assembly 400, depicted in FIGS. 4A-4C, to an ear of an animal via the one or more connection pass-throughs, or holes, 408a, 408b. In one embodiment, as shown in FIG. 5A, the crimper tool 500 includes a hinged body 502. In another embodiment, the hinged body 502 includes a first arm 504 and a second arm 506. In another embodiment, the crimper tool 500 includes a puncture assembly 508. In another embodiment, the punch assembly 508 includes two or more punches. For example, the punch assembly 508 may include, but is not limited to, a first punch 510 and a second punch 508. For example, the relative spacing of the first punch 510 and the second punch 512 may correspond with the spacing of the connection pass-throughs, or holes, 408a, 408b or tag assembly 400. It is noted herein that the crimper tool 500 is not limited to two punches or the arrangement depicted in FIGS. 5A and 5B. Rather, the punch configuration of FIGS. 5A and 5B are provided merely for illustrative purposes. For example, the punch assembly 508 may include any number of punches (e.g., two, three, four and so on) and may be arranged in any geometrical arranged so as to corresponding with the connection pass-throughs of the tag assembly 400.

It is noted that when operated a user presses the first arm 504 and second arm 506 together, which serves to drive the punches 510, 512 through the animal's ear. It is further noted that the first punch 510 and the second punch 512 have different lengths. A first punch 510 is longer than the second punch 512 so that the first punch 510 pierces a portion of an animal before the second punch 512 begins piercing the portion of the animal. In this manner, the punches 510, 512 serves to spread out the application of force to the animal's ear over time. Such a configuration serves to reduce the maximum amount of applied force relative to two punches of identical length, which alleviates stress on the animal and allows for easier application by the user.

Figure 6A:
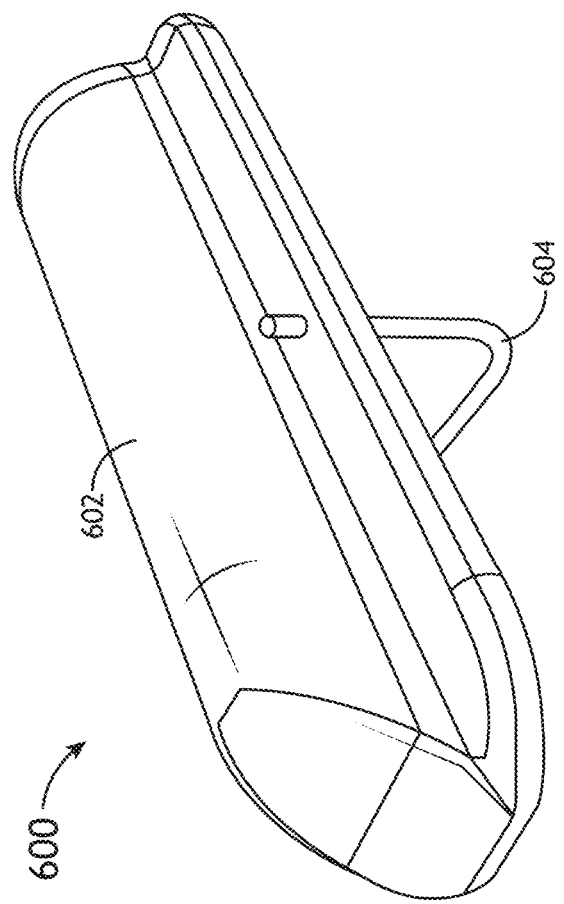
FIGS. 6A-6R illustrate multiple schematic views of a tag assembly, in accordance with one or more embodiments of the present disclosure.
Figure 6B:
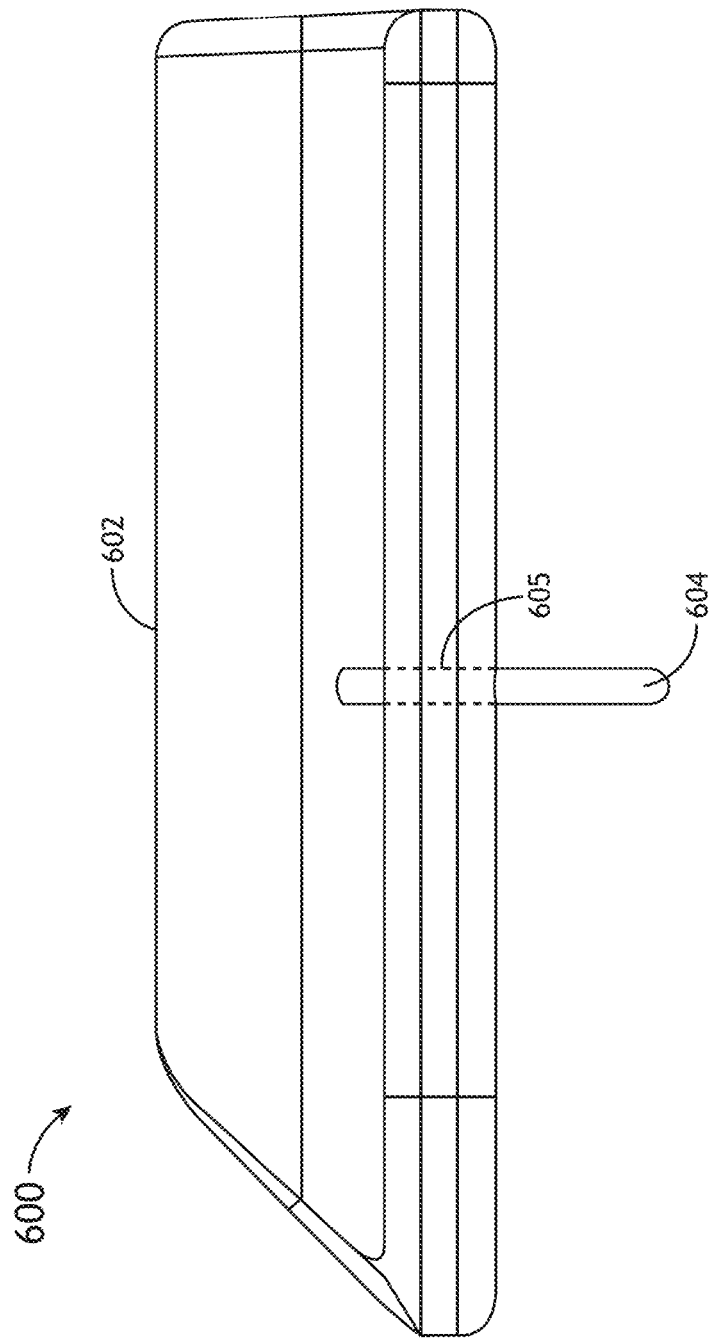
FIGS. 6S-6Y illustrate schematic views of a stapling tool for attaching a tag assembly to an animal, in accordance with one or more embodiments of the present disclosure.
Figure 6C:
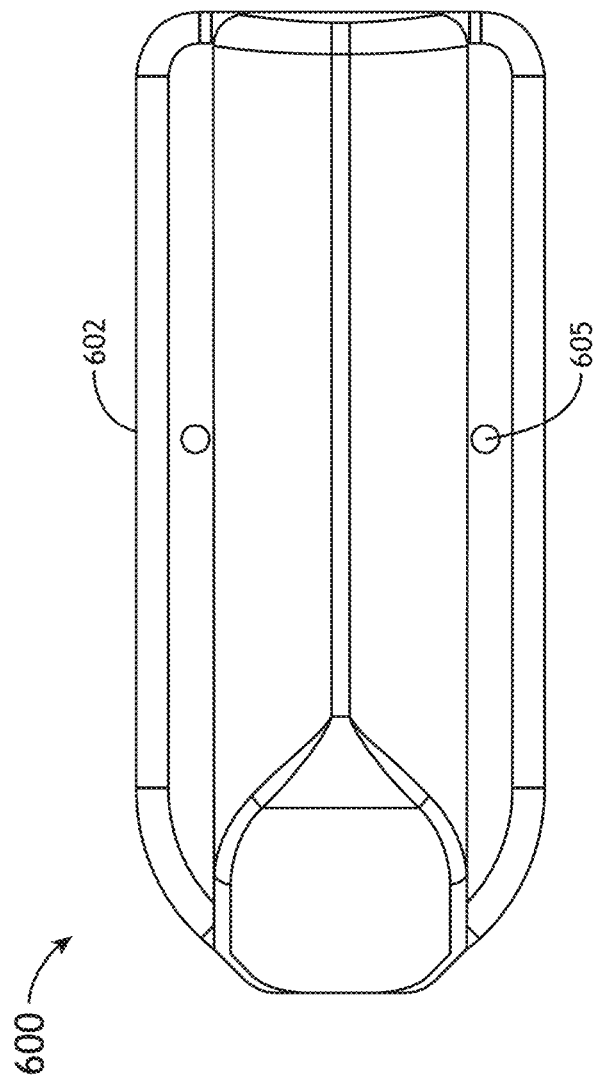

FIGS. 6A-6R illustrate multiple views of a tag assembly 600, in accordance with an additional embodiment of the present disclosure. It is noted that any of the devices (e.g., sensors, battery, processor, communication circuitry, antenna, memory and etc.) described previously herein may be integrated into the structure of the tag assembly 600. As shown in FIGS. 6A-6C, the tag body 602 of tag assembly 600 may be configured for being stapled to the ear of an animal with one or more staples 604. For example, as shown in FIGS. 6B and 6C, the tag body 602 includes two or more pass through holes 605 to allow one or more connections of one or more staples to secure the tag assembly 600 to an ear (or other portion) of the animal. In one embodiment, the two or more pass through holes 605 may include push nuts for securing the connecting portions of the one or more staples 604.

Figure 6D:
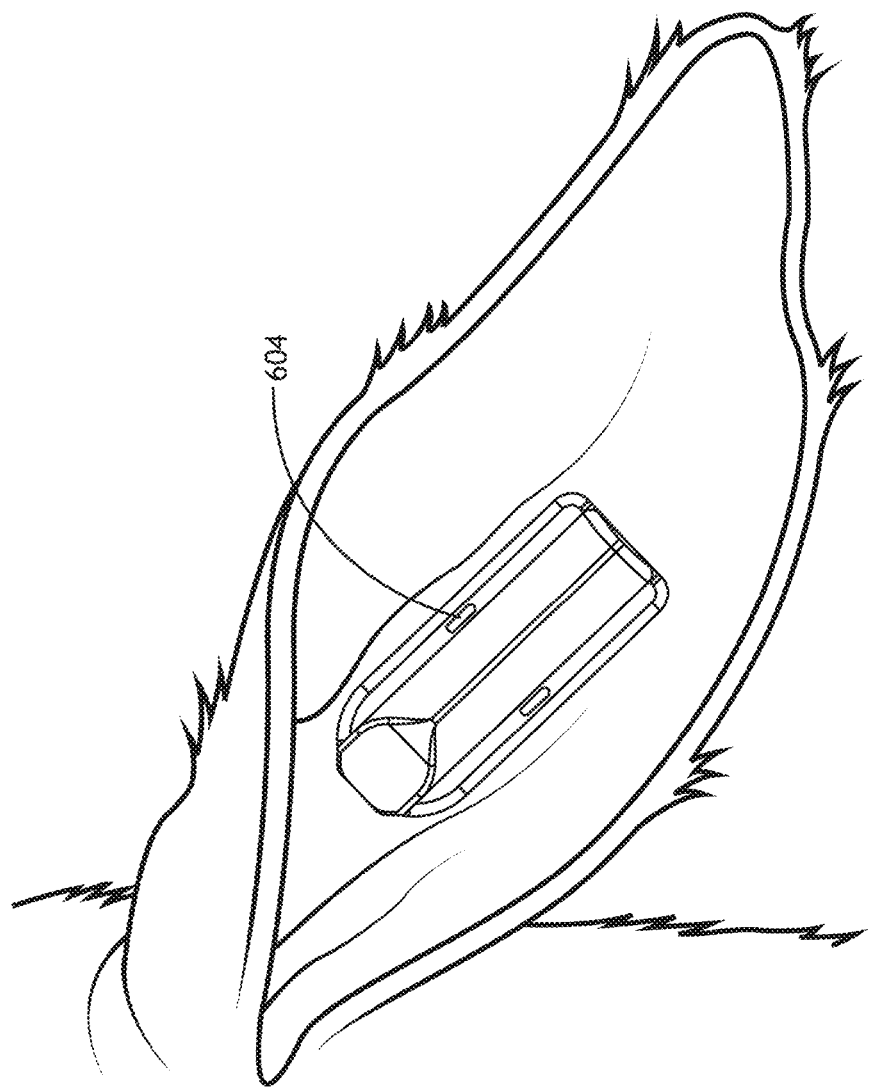
Figure 6E:
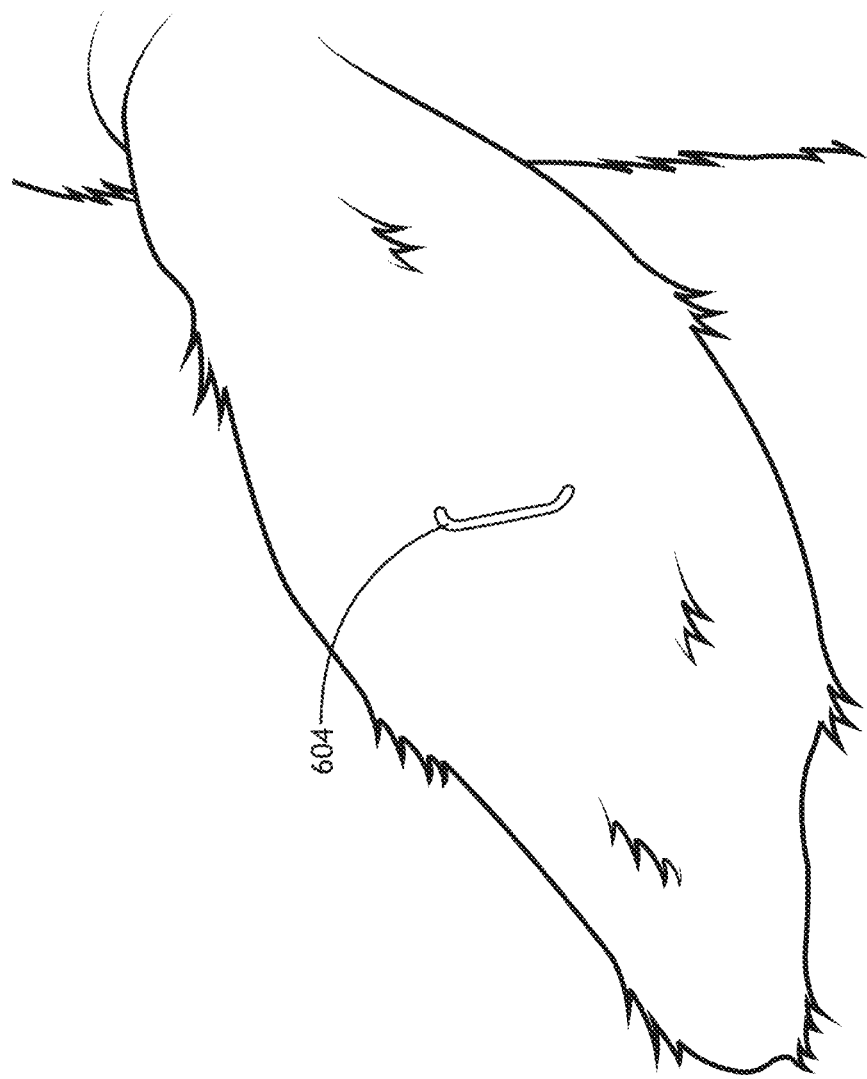

In one embodiment, as shown in FIG. 6D, the tag body 602 of tag assembly 600 is shaped and sized so as to fit within an ear (e.g., on inner portion of ear) of an animal, such as, but not limited to, a cow. FIG. 6E illustrates the backside of an ear of animal (e.g., cow), whereby a staple 604 is used to secure the tag assembly 600 within the canal of the animal's ear (as shown in FIG. 6D). While the examples provided in FIGS. 6A-6E illustrate a single staple, such a configuration is not a limitation on the present disclosure and it is recognized that the various tag assemblies of the present disclosure, such as, but not limited to, tag assembly 600 may be connected to an animal's ear (or other portion of their body) with any number of staples or other connection devices. As noted previously herein, the tag assembly 600 may be placed between the 2nd and 3rd cartilage ridges (as shown in FIG. 3D, at the inside edge of the middle third of the ear).

Figure 6F:
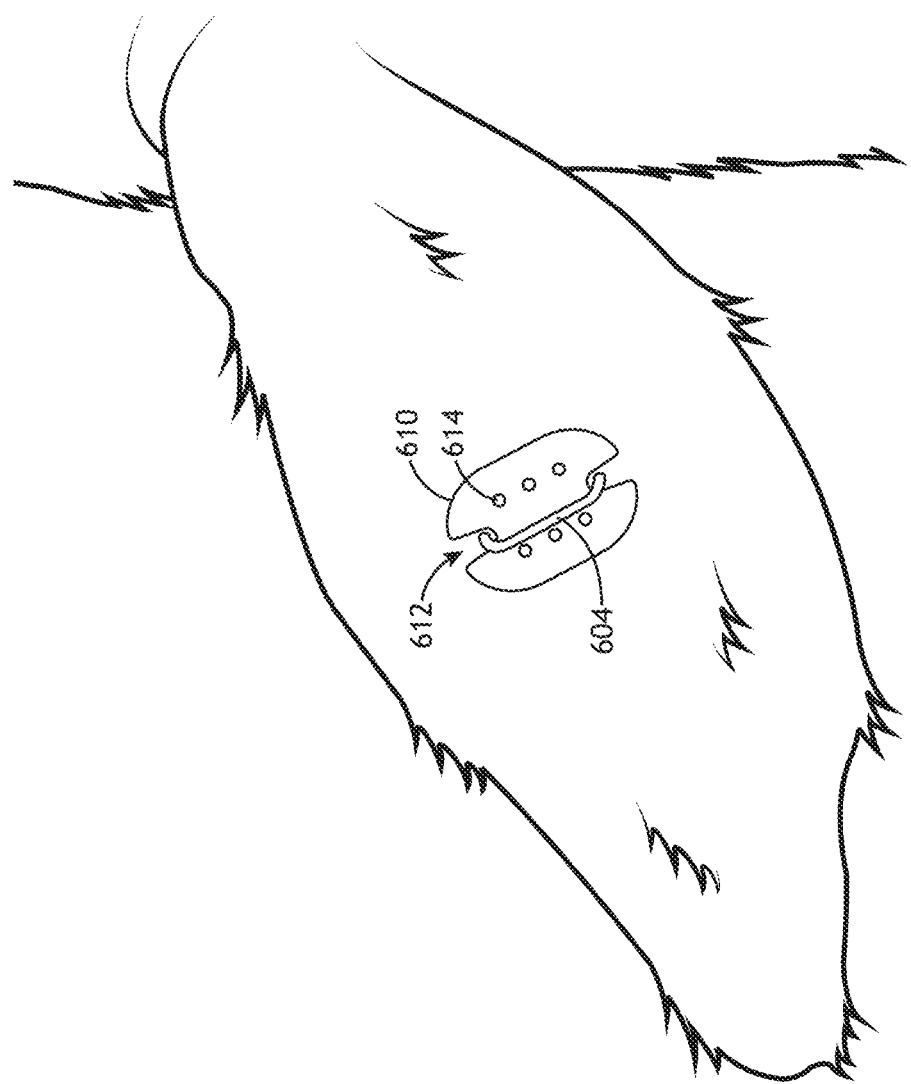
Figure 6J:
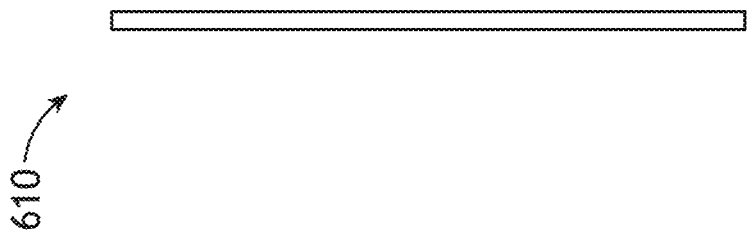
Figure 6I:
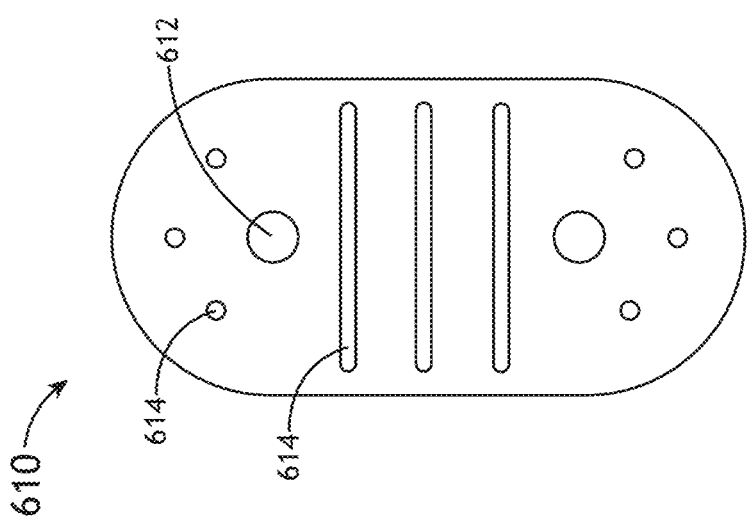
Figure 6N:
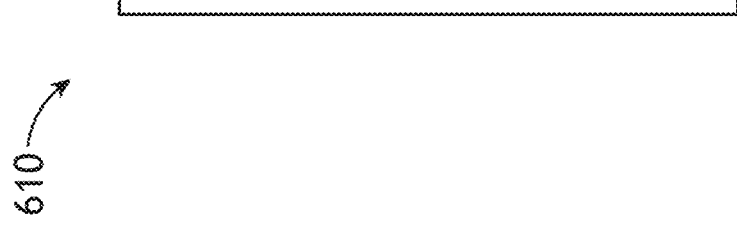
Figure 6M:
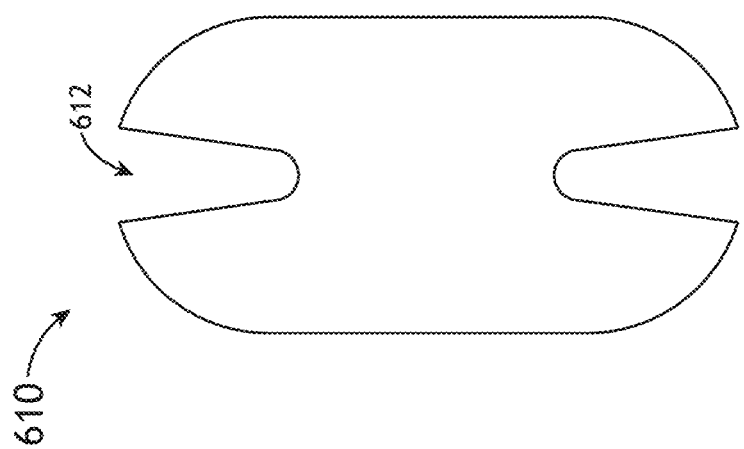

In another embodiment, as shown in FIG. 6F, the tag assembly 600 includes a backing layer 610. In one embodiment, the backing layer 610 may be positioned on the backside of an animal's ear and serves to provide structural support so as to limit damage and pain to the animal's ear cause by the staple 604. In one embodiment, the backing layer 610 includes two or more pass through openings 612. The pass through openings 612 allow the connecting portions of the staple 604 to pass through the body of the backing layer 610. In this regard, during application of the tag body 602 to the ear, a tag body 602 and backing layer 610 may be held to the animal's ear. Then, the connection portions of the staple 604 may pass through the pass through openings 612, through the ear and through the pass through holes 605 of the tag body 602. In another embodiment, the backing layer 610 may include one or more ventilation holes or openings 614. The one or more ventilation holes or openings may be shaped, sized and/or positioned so as to provide air flow to the back of the animal's ear.

The shape, size and configuration of the backing layer 610 is not limited to that illustrate in FIG. 6F, which is provided merely for illustrative purposes. The shape, size and/or configuration of the backing layer 610 may extend to any shape, size and/or configuration suitable for securing a tag body 102 to an ear of an animal, while reducing mechanical damage to the ear caused by the staple 604. FIGS. 6G-6R illustrate a variety of shapes, sizes and configurations of backing layers 610 suitable for implementation in the various embodiments of the present disclosure. The backing layer 610 may formed from any suitable material known in the art, such as, but not limited to, plastic, rubber or like material.

In one embodiment, as shown in FIGS. 6G-6L, the backing layer 610 may include closed pass through openings 612 (or pass through holes). In another embodiment, as shown in FIGS. 6M-6R, the backing layer 610 may include open pass through openings.

It is further noted that the backing layer 610 may include any number, size and arrangement the ventilation openings 614 of the backing layer 610 and is not limited to the arrangements of ventilation openings depicted in FIGS. 6G-6R.

Figure 6S:
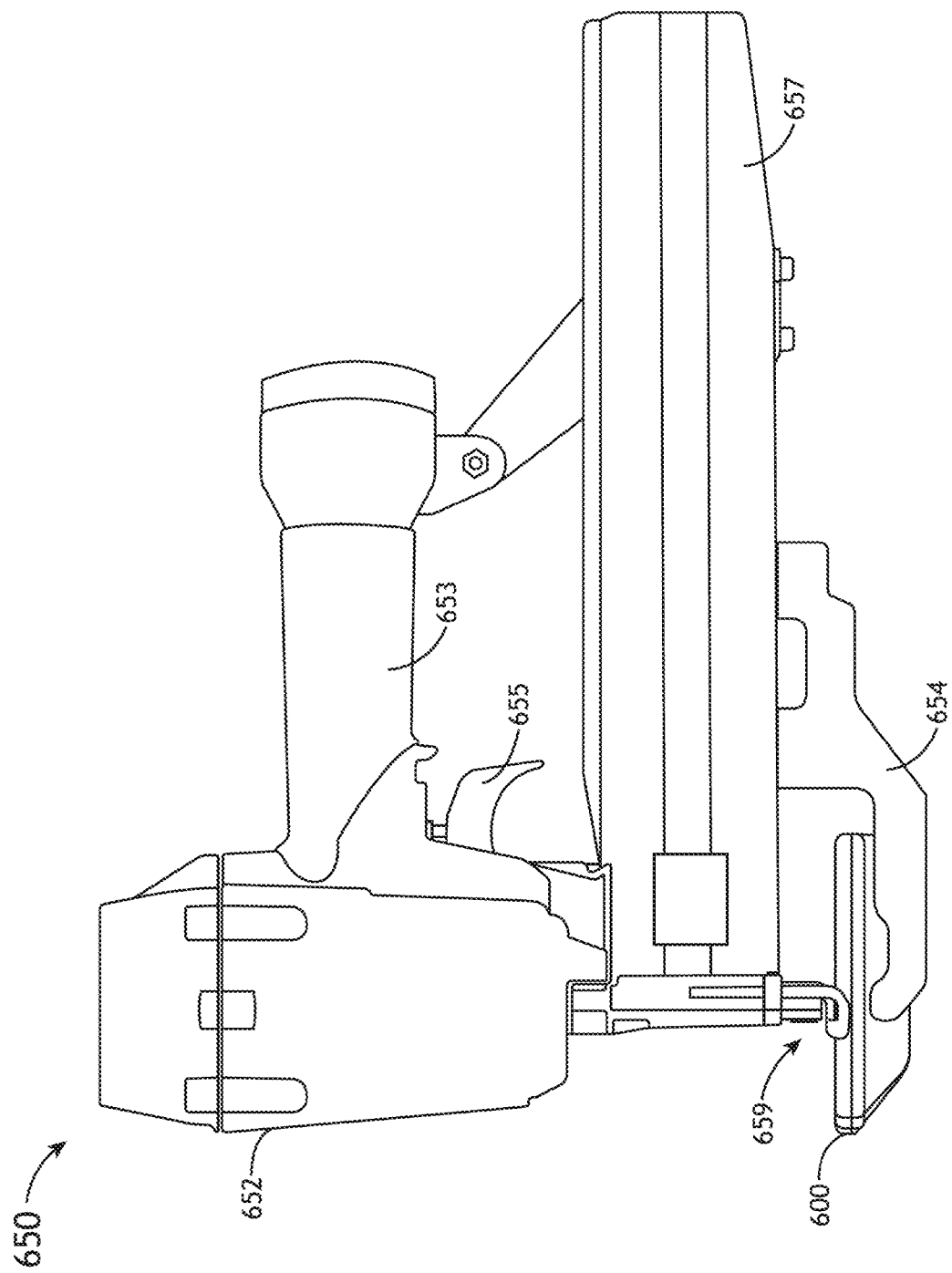

FIGS. 6S-6Y illustrate various views of a stapling tool 650 for attaching a tag assembly, such as, but not limited to, tag assembly 600, to an animal, in accordance with one or more embodiments of the present disclosure. In one embodiment, the stapling tool 650 is structured so as to connect the tag assembly 600 (or any other tag assembly), depicted in FIG. 6A, to an ear of an animal. In one embodiment, the connecting portions of a staple may be forced through the base portion of the tag assembly 600 to form the one or more holes 605. In this regard, at least the base of the tag assembly 600 may be formed from a material with which the connecting portions of a staple may pass through, while also providing structural integrity so as to maintain connection to the animal's ear. For instance, at least the base of the tag assembly 600 may be formed from a plastic, rubber or like material. In another embodiment, the holes 605 of the tag assembly 600 may be pre-formed. In one embodiment, as shown in FIG. 6F, the stapling tool 650 includes a stapling unit 652 (e.g., stapler). It is noted that the stapling unit 652 may include any stapling unit or stapler known in the art. For example, as shown in FIG. 6S, the stapling unit 652 may include a stapler mechanism 659 or device for forcing one or more staples 604 through the animal's ear and securing the tag assembly 600 to the animal's ear by bending the end portions of the staple (e.g., bent staple in FIG. 6D). For instance, upon pulling trigger 655, the stapler mechanism 659 may force a staple 604 through the animal's ear and a portion of the tag assembly 600 so as to secure the tag assembly 600 to the animal's ear. Further, as shown in FIG. 6S, the stapling unit 652 may include a staple supply unit 657 (e.g., staple tray located beneath handle 653 of stapling unit 652).

Figure 6T:
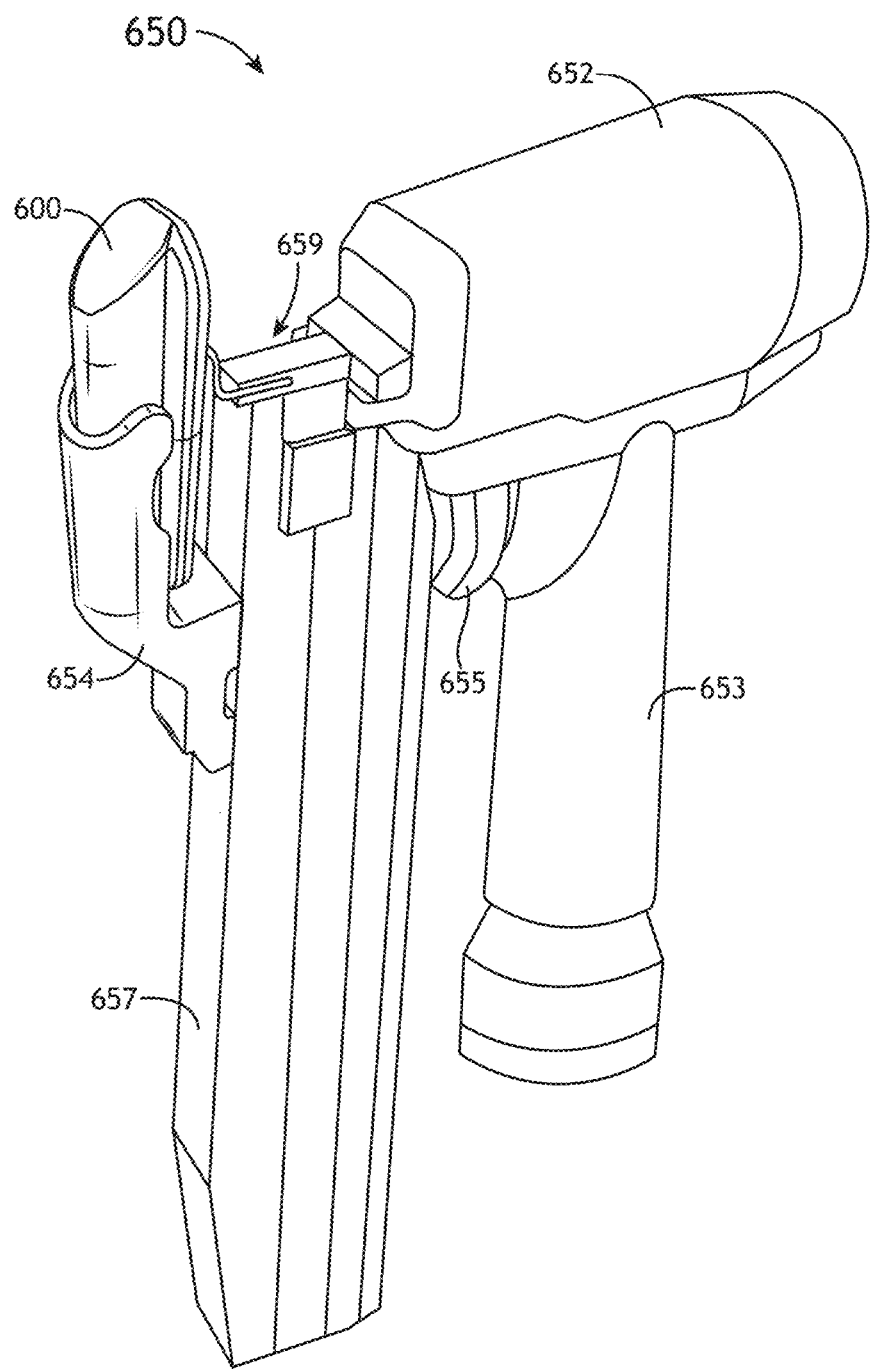

In another embodiment, as shown in FIG. 6T, the stapling tool 650 includes a tag securing bracket 654. The bracket 654 may be shaped so as to conform to the shape of the tag body of the selected tag assembly 600. Further, the tag securing bracket 654 serves to secure or hold the body of the tag assembly 600 in place, while the stapling mechanism 659 drives a staple through the animal's ear and through the base portion of the tag assembly 600. For example, during application of a tag assembly 600 to an ear of animal, the animal's ear may be positioned between the tag assembly 600 held in bracket 654 and the stapling mechanism 659. Further, the bracket 654 may provide an opposing portion or face that serves to bend the end of the staple 604 after it is forced through the animal's ear and the base of the tag assembly 600.

Figure 6U:
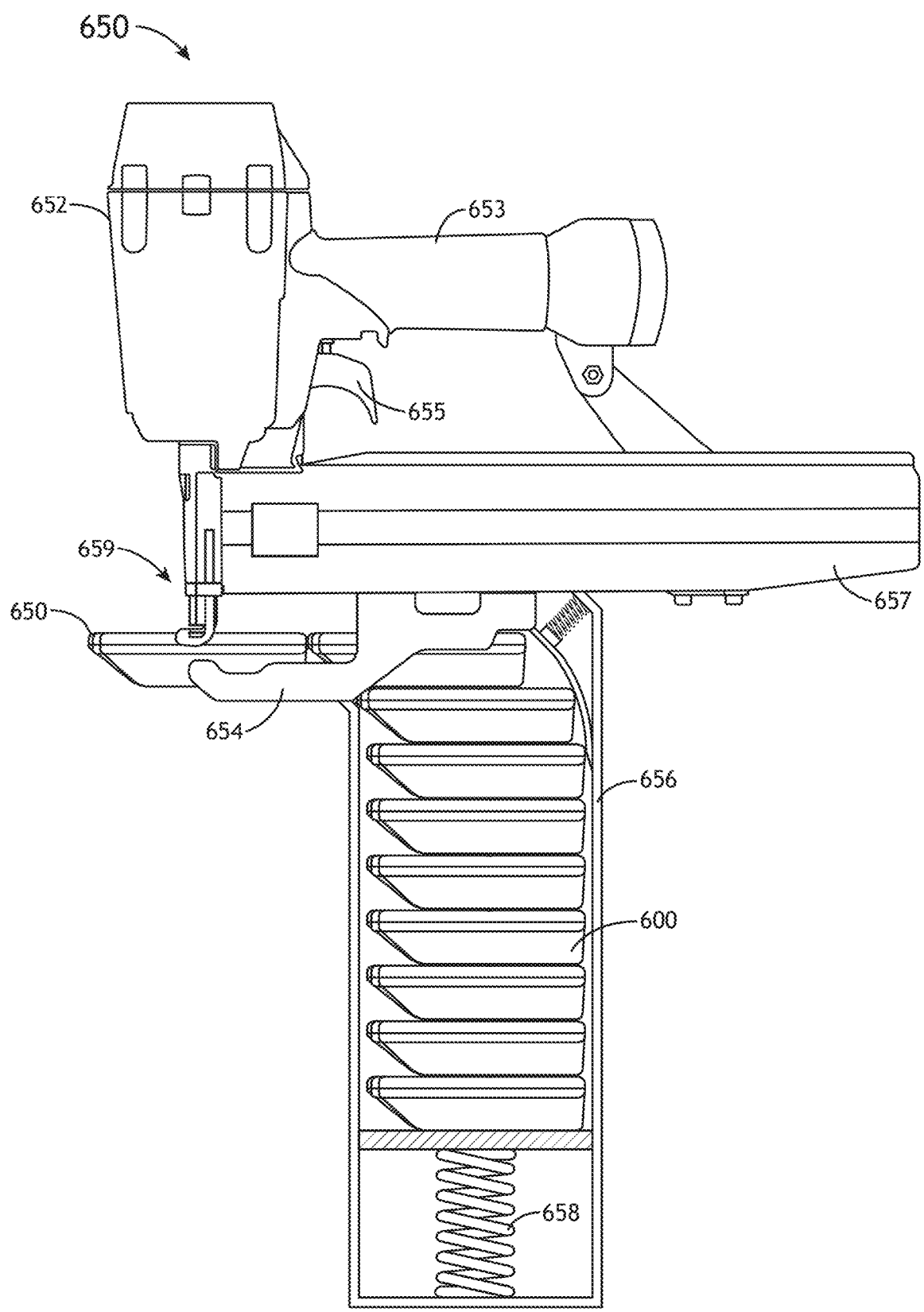
Figure 6V:
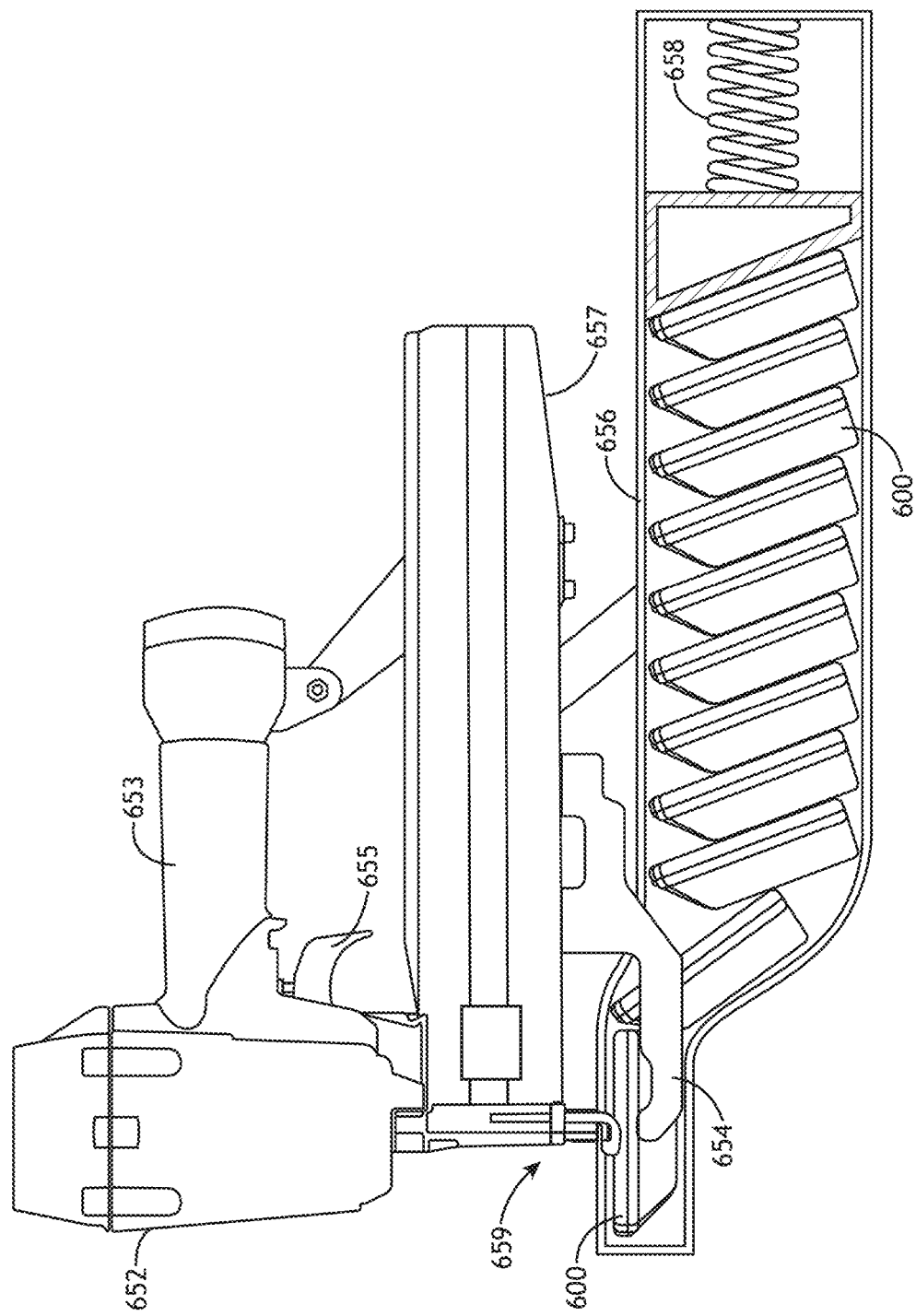
Figure 6X:
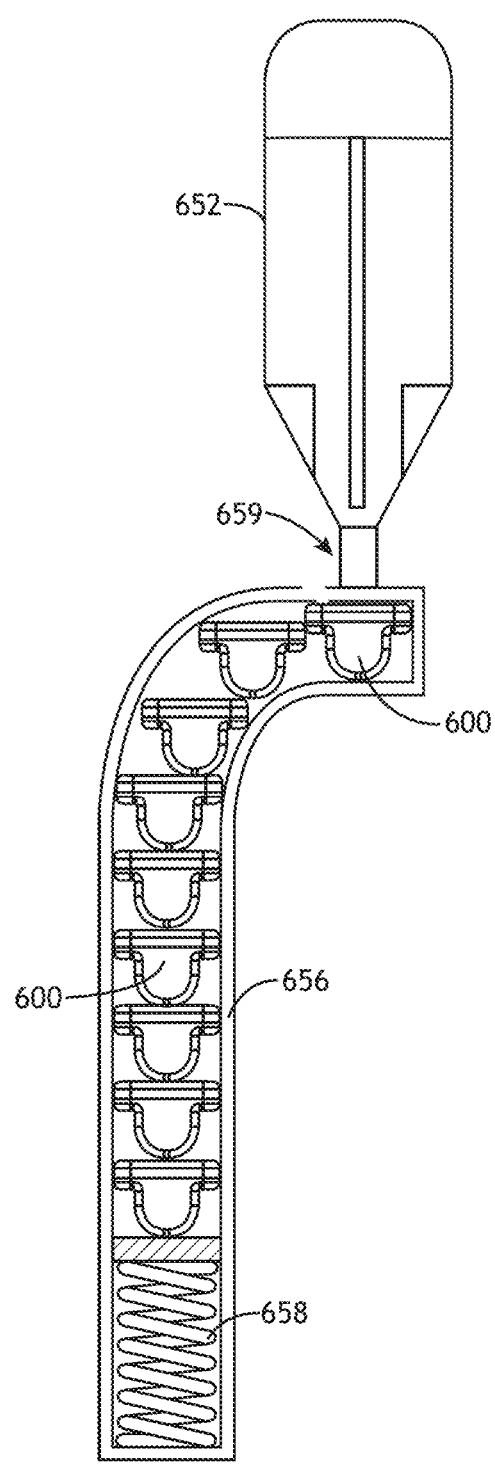
Figure 6Y:
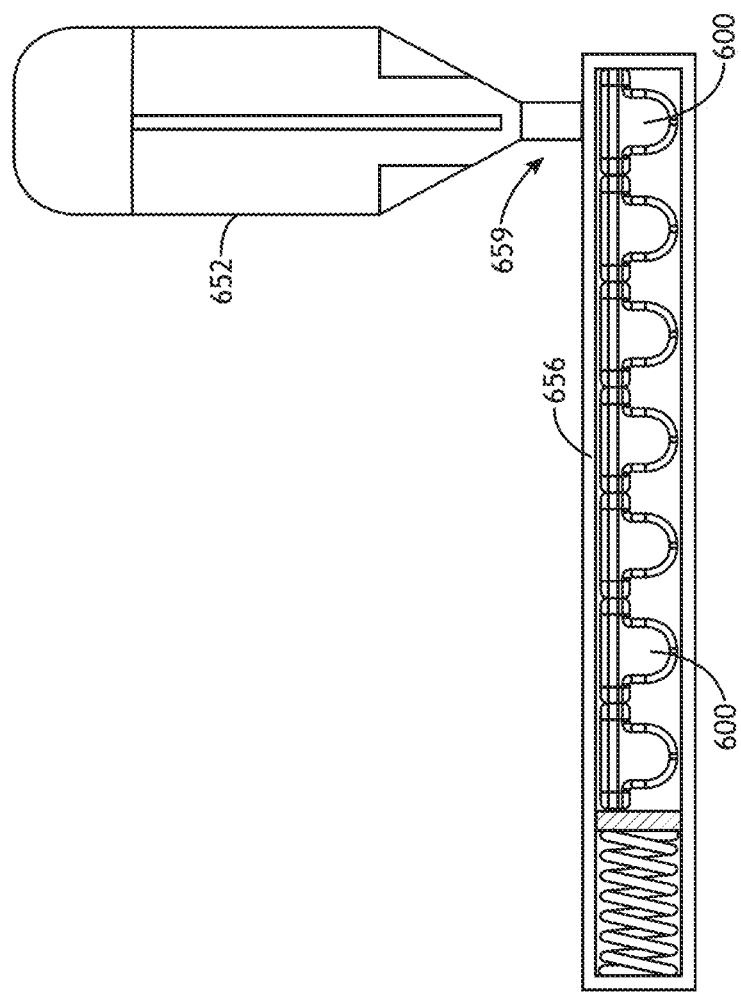

In another embodiment, as shown in FIGS. 6U-6Y, the stapling tool 650 includes a tag assembly magazine 656 for holding multiple tag assemblies 600. For example, as shown in FIG. 6U, the tag assembly magazine may include a spring 658 for pushing the tag assemblies 600 into position for application. In this regard, once a first tag assembly 600 is applied to an animal's ear, the spring 658 pushes the tag assemblies 600 up so the next tag assembly moves into position for tagging. The use of magazine 656 allows for the tagging of multiple animals in rapid succession. The tag assembly magazine 656 may be configured in any manner suitable manner. For example, as shown in FIG. 6U, the tag assembly magazine 656 is arranged in a vertical configuration. By way of another example, as shown in FIGS. 6V-6W, the tag assembly 656 may be arranged in a horizontal configuration. By way of another example, as shown in the end view of FIG. 6X, the tag assembly 656 may be arranged in a side-loading vertical configuration. By way of another example, as shown in the end view of FIG. 6Y, the tag assembly 656 may arranged in a side-loading horizontal configuration. It is noted herein that the present disclosure is not limited to the magazine configurations provide above, which are provided merely for illustrative purposes. For example, the tag assembly magazine may be arranged in a drum or circular configuration.

Figure 7A:
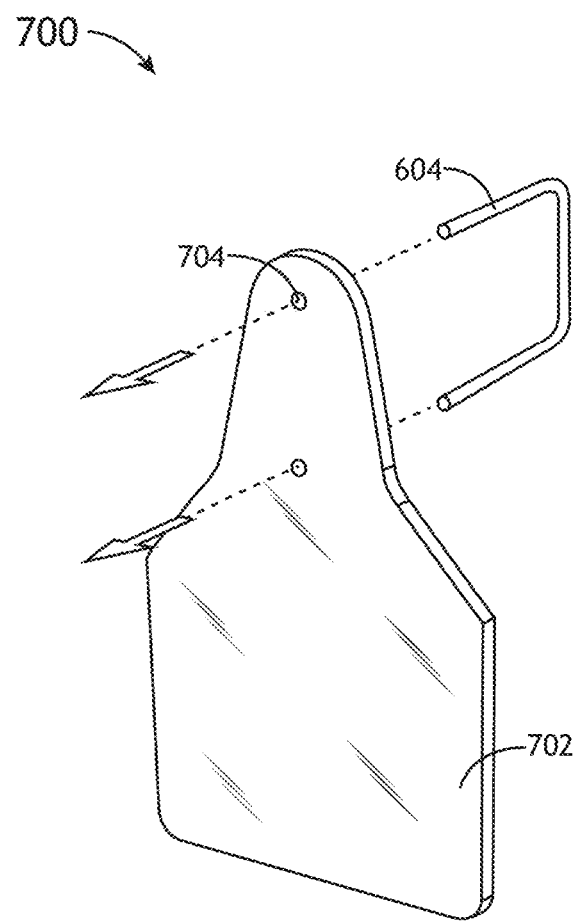
FIG. 7A illustrates a schematic view of a passive tag, in accordance with one or more embodiments of the present disclosure.

It is noted herein that the stapling tool 650 of the present disclosure is not limited to the application of tag assembly 600 or any other tag assembly described previously herein. It is recognized herein that the stapling tool 650 may be used to connect any tag or tag assembly known in the art to a portion (e.g., ear) of an animal with one or more staples. FIG. 7A illustrates a schematic view 700 of a passive tag 702. In one embodiment, the stapling tool 650 may be used to connect the passive tag 702 to a portion of the animal via staple 604. In this regard, the connecting portions (e.g., parallel straight portions) of the stable 604 are forced through a portion of the passive tag 702 to form holes 704. As noted previously herein, the bracket 654 (shown in FIGS. 6F-6J) may bend the portions of the staple, which serves to secure the passive tag 702 to the animal.

Figure 7B:
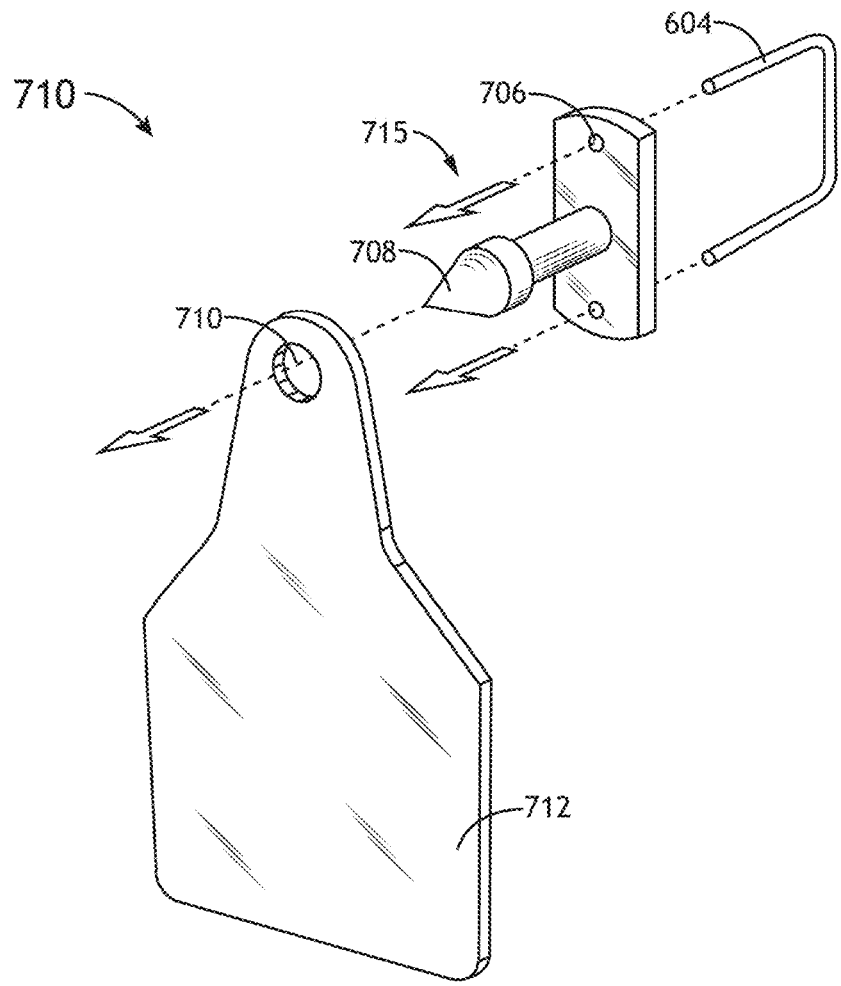
FIG. 7B illustrates a schematic view of a retrofitted passive tag, in accordance with one or more embodiments of the present disclosure.

FIG. 7B illustrates a schematic view 710 of a retrofitted passive tag 712. In one embodiment, an adapter assembly 715 may be used to allow for stapling of the tag 712 to an animal. For example, the adapter assembly 715 may include a connector 708 that passes through the pass-through hole 710. Such a configuration then provides a connecting surface for receiving staple 604. For example, the staple tool 650 may drive the staple 604 through the connecting surface of the adapter assembly 715, thereby forming holes 706. In this regard, the ear of the animal may be placed between the connecting surface of the adapter assembly 715 and the stapling mechanism 659 (shown in FIGS. 6S-6Y) so that the staple 604 secures the retrofitted passive tag 712 to the animal's ear.

All of the embodiments described herein may include storing results of one or more steps in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. A system for monitoring one or more characteristics in an animal population, comprising:
   a concentrator communicatively couplable to a plurality of animal tag assemblies and configured to acquire one or more animal characteristics from the plurality of animal tag assemblies, wherein each animal tag assembly is configured for being disposed on a member of the animal population, each animal tag assembly including one or more sensors configured to measure one or more animal characteristics of the member of the animal population, wherein the concentrator is configured to execute a communication protocol to acquire data from at least some of the plurality of animal tag assemblies within a repeating set of global data periods, wherein the concentrator is configured to:
   transmit a radio-frequency beacon signal at a beginning of each global data period of the repeating set of global data periods; and
   receive data corresponding to at least some of the one or more animal characteristics of the members of the animal population from at least some of the plurality of animal tag assemblies within allotted data timeslots synchronized to the beacon signal, wherein a particular animal tag assembly of the plurality of animal tag assemblies is configured to operate in a transmission mode for transmitting data or a search mode for searching for the beacon signal, wherein a particular animal tag assembly is configured to perform the following steps for each global data period when in the transmission mode:
   turn on when the beacon signal is expected for a current global data period of the repeating set of global data periods to detect the beacon signal;
   determine whether the beacon signal for the current global data period is detected;
   transmit data corresponding to at least some of the one or more animal characteristics of a respective member of the animal population in an allotted data timeslot within the current global data period synchronized to the beacon signal of the current global data period when the beacon signal has been detected for the current global data period or within a selected number of previous global data periods; and
   enter a search mode when the beacon signal has not been detected for the current global data period or within the selected number of the global data periods; and
   wherein the particular animal tag assembly is configured to search for the beacon signal without transmitting data when in the search mode and enter the transmission mode when the beacon signal is detected; and
   a server communicatively coupled to the concentrator via a network, wherein the controller includes one or more processors configured to execute a set of program instructions stored in memory and configured to cause the remote server to:
   receive the acquired one or more animal characteristics associated with the data from the plurality of animal tag assemblies from the concentrator;
   determine a health state of one or more of the members of the animal population based on at least the received one or more animal characteristics; and
   report the determined health state to one or more user devices.

2. The system of claim 1, wherein the particular animal tag assembly is configured to periodically switch a data radio of the particular tag assembly between an on-state and an off-state to search for the beacon signal while in the search mode.

3. The system of claim 2, wherein the particular animal tag assembly is configured to transmit a provisioning packet to the concentrator to receive the allotted data timeslot, wherein the concentrator is configured to transmit the allotted data timeslot to the particular tag in response to receiving the provisioning packet.

4. The system of claim 3, wherein the particular tag is configured to transmit one or more signals indicative of the one or more animal characteristics to the concentrator in the allotted data timeslot.

5. The system of claim 1, wherein the plurality of animal tag assemblies include a first animal tag assembly and at least a second animal tag assembly, wherein the first animal tag assembly is configured for being disposed on a first member of the animal population and the at least a second animal tag assembly is configured for being disposed on at least a second member of the animal population.

6. The system of claim 5, wherein the first animal tag assembly includes one or more sensors configured to measure one or more animal characteristics of the first member of the animal population and the at least a second animal tag assembly includes one or more sensors configured to measure one or more animal characteristics of the at least a second member of the animal population.

7. The system of claim 1, wherein the one or more sensors comprise:
one or more temperature sensors.

8. The system of claim 7, wherein the one or more temperature sensors comprise:
at least one of an infrared temperature sensor, a thermocouple, or a thermistor.

9. The system of claim 1, wherein the one or more sensors comprise:
one or more heart rate sensors.

10. The system of claim 1, wherein the one or more sensors comprise:
one or more accelerometers, one or magnetometers, one or more gyroscopes sensors, or one or more location sensors.

11. The system of claim 1, wherein the one or more sensors comprise:
one or more inertial measurement units.

12. The system of claim 1, wherein the one or more sensors comprise a plurality of sensors.

13. The system of claim 12, wherein the plurality of sensors comprises a first temperature sensor and a second temperature sensor.

14. The system of claim 13, wherein the first temperature sensor and the second temperature sensor are configured to perform a relative temperature measurement of a portion of an animal.

15. The system of claim 1, wherein at least some of the animal tag assemblies comprise:
animal ear tag assemblies.

16. The system of claim 1, wherein the determining a health state of one or more members of the animal population based on the received one or more animal characteristics comprises:
comparing the acquired one or more animal characteristics to a set of standardized characteristics to determine a health state of one or more of the members of the animal population.

17. The system of claim 1, wherein the determining a health state of one or more members of the animal population based on the received one or more animal characteristics comprises:
performing a differential analysis procedure to determine a health state of one or more of the members of the animal population.

18. The system of claim 1, wherein the one or more animal characteristics comprise:
at least one of a physiological characteristic or a behavioral characteristic.

19. The system of claim 18, wherein the physiological characteristic comprises:
at least one of a temperature or a heart rate.

20. The system of claim 18, wherein the behavioral characteristic comprises:
at least one of a position characteristic, an activity characteristic, or a posture characteristic.

21. The system of claim 20, wherein the posture characteristic comprises:
a head tilt measurement.

22. The system claim 1, wherein the animal population comprises:
at least one of a population of livestock, a population of horses, a population of pet animals, a population of zoo animals, a population of wild animals, or a population of humans.

23. The system of claim 1, wherein the one or more user devices comprise:
a computing device.

24. The system of claim 23, wherein the computing device comprise:
at least one of a desktop computer, a laptop, a smartphone, a tablet, or a wearable device.

25. A system for monitoring one or more characteristics in an animal population, comprising:
a plurality of animal tag assemblies, each animal tag assembly configured for being disposed on a member of the animal population, each of the animal tag assemblies including one or more sensors configured to measure one or more animal characteristics of the member of the animal population;
a concentrator communicatively couplable to at least some of the plurality of animal tag assemblies and configured to acquire one or more animal characteristics from at least some of the plurality of animal tag assemblies, wherein the concentrator is configured to execute a communication protocol to acquire data from at least some of the plurality of animal tag assemblies within a repeating set of global data periods, wherein the concentrator is configured to:
transmit a radio-frequency beacon signal at a beginning of each global data period; and
receive data corresponding to at least some of the one or more animal characteristics of the members of the animal population from at least some of the plurality of animal tag assemblies within allotted data timeslots synchronized to the beacon signal, wherein a particular animal tag assembly of the plurality of animal tag assemblies is configured to operate in a transmission mode for transmitting data or a search mode for searching for the beacon signal, wherein a particular animal tag assembly is configured to perform the following steps for each global data period when in the transmission mode:

turn on when the beacon signal is expected from the concentrator for a current global data period of the repeating set of global data periods;

determine whether the beacon signal for the current global data period is detected;

transmit data corresponding to at least some of the one or more animal characteristics of a respective member of the animal population in an allotted data timeslot within the current global data period synchronized to the beacon signal of the current global data period when the beacon signal has been detected for the current global data period or within a selected number of previous global data periods; and enter a search mode when the beacon signal has not been detected for the current global data period or within the selected number of the global data periods; and wherein the particular animal tag assembly is configured to search for the beacon signal without transmitting data when in the search mode and enter the transmission mode when the beacon signal is detected; and a server communicatively coupled to the concentrator via a network, wherein the controller includes one or more processors configured to execute a set of program instructions stored in memory and configured to cause the remote server to:

receive the acquired one or more animal characteristics associated with the data from the plurality of animal tag assemblies from the concentrator;

determine a health state of one or more of the members of the animal population based on at least the received one or more animal characteristics; and report the determined health state to one or more user devices.

26. An animal tag assembly for monitoring one or more characteristics in an animal population, comprising:

an animal tag body;

one or more sensors disposed on the animal tag body, wherein the animal tag body is configured for placement on a member of the animal population to acquire one or more animal characteristics from the member of the animal population;

one or more processors; and a data radio, wherein the data radio is configured to transmit radio-frequency data corresponding to at least some of the one or more animal characteristics to one or more concentrators in at least some of a repeating set of global data periods via a communication protocol, wherein the communication protocol includes a transmission mode for transmitting data or a search mode for searching for a beacon signal, wherein the animal tag assembly is configured to perform the following steps for each global data period when in the transmission mode:

turn on when a beacon signal is expected from at least one of the one or more concentrators for a current global data period to detect the beacon signal, wherein the at least one of the one or more concentrators transmits the beacon signal at a beginning of each global data period of the repeating set of global data periods;

determine whether the beacon signal for the current global data period is detected;

transmit the data in an allotted data timeslot within the current global data period synchronized to the beacon signal of the current global data period when the beacon signal has been detected for the current global data period or within a selected number of previous global data periods; and enter a search mode when the beacon signal has not been detected for the current global data period or within the selected number of the global data periods; and wherein the animal tag assembly is configured to search for the beacon signal without transmitting data when in the search mode and enter the transmission mode when the beacon signal is detected.

27. The animal tag assembly of claim 26, wherein the one or more processors are configured to periodically switch the data radio between an on-state and an off-state while in the search mode.

28. The animal tag assembly of claim 27, wherein the one or more processors are configured to transmit a provisioning packet to the concentrator to receive the allotted data timeslot, wherein the concentrator is configured to transmit the allotted data timeslot to the animal tag assembly in response to receiving the provisioning packet.

29. The animal tag assembly of claim 26, wherein the one or more sensors comprise:

one or more temperature sensors.

30. The animal tag assembly of claim 29, wherein the one or more temperature sensors comprise:

at least one of an infrared temperature sensor, a thermocouple, or a thermistor.

31. The animal tag assembly of claim 26, wherein the one or more sensors comprise:

one or more heart rate sensors.

32. The animal tag assembly of claim 26, wherein the one or more sensors comprise:

one or more accelerometers, one or magnetometers, one or more gyroscopes sensors, or one or more location sensors.

33. The animal tag assembly of claim 26, wherein the one or more sensors comprise:

one or more inertial measurement units.

34. The animal tag assembly of claim 26, wherein the one or more sensors comprise a plurality of sensors.

35. The animal tag assembly of claim 34, wherein the plurality of sensors comprises a first temperature sensor and a second temperature sensor.

36. The animal tag assembly of claim 26, wherein the animal tag body is configured for placement on an ear of the member of the animal population.

37. The animal tag assembly of claim 36, wherein at least a portion of the animal tag body is shaped to fit between cartilage ridges in the ear.

38. The animal tag assembly of claim 36, wherein at least a portion of the animal tag body is configured for placement in an ear canal of the member of the animal population.

39. The animal tag assembly of claim 38, wherein the one or more sensors include a temperature sensor arranged within the animal tag body to point into the ear canal, wherein the temperature sensor is configured to measure an inner ear temperature of the member of the animal population.

40. The animal tag assembly of claim 38, wherein the one or more sensors include a temperature sensor to determine an ambient temperature of the ear canal of the member of the animal population.

* * * * *